United States Patent
Pasquero et al.

(10) Patent No.: US 9,910,588 B2
(45) Date of Patent: Mar. 6, 2018

(54) TOUCHSCREEN KEYBOARD PROVIDING WORD PREDICTIONS IN PARTITIONS OF THE TOUCHSCREEN KEYBOARD IN PROXIMATE ASSOCIATION WITH CANDIDATE LETTERS

(75) Inventors: Jerome Pasquero, Kitchener (CA); Donald Somerset Mckenzie, Waterloo (CA); Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 23 days.

(21) Appl. No.: 13/525,576

(22) Filed: Jun. 18, 2012

(65) Prior Publication Data

US 2013/0222249 A1 Aug. 29, 2013

Related U.S. Application Data

(60) Provisional application No. 61/603,043, filed on Feb. 24, 2012.

(51) Int. Cl.
| | | |
|---|---|---|
| *G06F 3/0482* | (2013.01) | |
| *G06F 3/0488* | (2013.01) | |
| *G06F 17/27* | (2006.01) | |

(52) U.S. Cl.
CPC ........ *G06F 3/04886* (2013.01); *G06F 17/276* (2013.01); *G06F 3/0482* (2013.01)

(58) Field of Classification Search
CPC ... G06F 3/04886; G06F 17/276; G06F 3/0482
USPC ...................................................... 715/773
See application file for complete search history.

(56) References Cited

U.S. PATENT DOCUMENTS

| | | |
|---|---|---|
| 3,872,433 A | 3/1975 | Holmes et al. |
| 4,408,302 A | 10/1983 | Fessel et al. |
| 5,261,009 A | 11/1993 | Bokser |
| 5,523,775 A | 6/1996 | Capps |
| 5,664,127 A | 9/1997 | Anderson et al. |
| 5,832,528 A | 11/1998 | Kwatinetz et al. |
| 5,963,671 A | 10/1999 | Comerford et al. |
| 6,002,390 A | 12/1999 | Masui |
| 6,064,340 A | 5/2000 | Martin et al. |

(Continued)

FOREIGN PATENT DOCUMENTS

| | | |
|---|---|---|
| CA | 2688204 A1 | 7/2010 |
| CA | 2812457 A1 | 10/2013 |

(Continued)

OTHER PUBLICATIONS

Canadian Office dated Aug. 8, 2012, issued in Canadian Application No. 2,688,204 (3 pages).

(Continued)

*Primary Examiner* — Kieu Vu
*Assistant Examiner* — Blaine Basom
(74) *Attorney, Agent, or Firm* — Fish & Richardson P.C.

(57) ABSTRACT

A method including receiving an input of a character from a virtual keyboard displayed on a display, generating a set of predicted input characters based on the input character, and displaying the generated set of characters in partitions of the virtual keyboard in proximate association with candidate letters is disclosed. An electronic device and a keyboard configured to perform the method are also disclosed.

19 Claims, 42 Drawing Sheets

(56) References Cited

U.S. PATENT DOCUMENTS

| | | |
|---|---|---|
| 6,094,197 A | 7/2000 | Buxton et al. |
| 6,223,059 B1 | 4/2001 | Haestrup |
| 6,226,299 B1 | 5/2001 | Henson |
| 6,351,634 B1 | 2/2002 | Shin |
| 6,421,453 B1 | 7/2002 | Kanevsky et al. |
| 6,573,844 B1 | 6/2003 | Venolia et al. |
| 6,621,424 B1 | 9/2003 | Brand |
| 6,646,572 B1 | 11/2003 | Brand |
| 6,801,190 B1 | 10/2004 | Robinson et al. |
| 7,061,403 B2 | 6/2006 | Fux |
| 7,098,896 B2 | 8/2006 | Kushler et al. |
| 7,107,204 B1 | 9/2006 | Liu et al. |
| 7,216,588 B2 | 5/2007 | Suess |
| 7,259,752 B1 | 8/2007 | Simmons |
| 7,277,088 B2 | 10/2007 | Robinson et al. |
| 7,292,226 B2 | 11/2007 | Matsuura et al. |
| 7,304,638 B2 | 12/2007 | Murphy |
| 7,318,019 B1 | 1/2008 | Baker et al. |
| 7,382,358 B2 | 6/2008 | Kushler et al. |
| 7,394,346 B2 | 7/2008 | Bodin |
| 7,443,316 B2 | 10/2008 | Lim |
| 7,479,949 B2 | 1/2009 | Jobs et al. |
| 7,487,461 B2 | 2/2009 | Zhai et al. |
| 7,526,316 B2 | 4/2009 | Shimizu |
| 7,530,031 B2 | 5/2009 | Iwamura et al. |
| 7,539,472 B2 * | 5/2009 | Sloo ............... 455/151.1 |
| 7,661,068 B2 | 2/2010 | Lund |
| 7,671,765 B2 | 3/2010 | Fux |
| 7,692,629 B2 | 4/2010 | Baudisch et al. |
| 7,694,231 B2 | 4/2010 | Kocienda et al. |
| 7,698,127 B2 | 4/2010 | Trower, II et al. |
| 7,886,233 B2 | 2/2011 | Rainisto et al. |
| 7,934,156 B2 | 4/2011 | Forstall et al. |
| 8,023,930 B2 | 9/2011 | Won |
| 8,042,056 B2 | 10/2011 | Wheeler et al. |
| 8,059,101 B2 | 11/2011 | Westerman et al. |
| 8,065,624 B2 * | 11/2011 | Morin ............... G06F 3/0237 715/773 |
| 8,201,087 B2 | 6/2012 | Kay et al. |
| 8,225,203 B2 | 7/2012 | Unruh |
| 8,232,973 B2 * | 7/2012 | Kocienda ............ G06F 3/0237 345/168 |
| 8,276,099 B2 | 9/2012 | Yost |
| 8,289,283 B2 | 10/2012 | Kida et al. |
| 8,294,680 B2 | 10/2012 | Karlsson |
| 8,326,358 B2 | 12/2012 | Runstedler et al. |
| 8,490,008 B2 | 7/2013 | Griffin et al. |
| 8,516,367 B2 | 8/2013 | Archer |
| 8,516,386 B2 | 8/2013 | Adam et al. |
| 8,542,206 B2 | 9/2013 | Westerman et al. |
| 8,671,357 B2 * | 3/2014 | Spetalnick ........... G06F 17/276 345/156 |
| 9,152,319 B2 | 10/2015 | Pai |
| 2002/0057256 A1 | 5/2002 | Flack |
| 2002/0080186 A1 | 6/2002 | Frederiksen |
| 2002/0097270 A1 | 7/2002 | Keely et al. |
| 2002/0122029 A1 | 9/2002 | Murphy |
| 2002/0154037 A1 | 10/2002 | Houston |
| 2002/0180797 A1 | 12/2002 | Bachmann |
| 2003/0182279 A1 | 9/2003 | Willows |
| 2004/0111475 A1 | 6/2004 | Schultz |
| 2004/0135818 A1 | 7/2004 | Thomson et al. |
| 2004/0140956 A1 | 7/2004 | Kushler et al. |
| 2004/0153963 A1 | 8/2004 | Simpson et al. |
| 2004/0168131 A1 | 8/2004 | Blumberg |
| 2004/0201576 A1 | 10/2004 | Shimada et al. |
| 2005/0017954 A1 | 1/2005 | Kay et al. |
| 2005/0024341 A1 | 2/2005 | Gillespie et al. |
| 2005/0039137 A1 | 2/2005 | Bellwood et al. |
| 2005/0052425 A1 | 3/2005 | Zadesky et al. |
| 2005/0093826 A1 | 5/2005 | Huh |
| 2005/0099397 A1 | 5/2005 | Ono |
| 2005/0162407 A1 | 7/2005 | Sakurai et al. |
| 2005/0195173 A1 | 9/2005 | McKay |
| 2005/0244208 A1 | 11/2005 | Suess |
| 2005/0275632 A1 | 12/2005 | Pu et al. |
| 2005/0283358 A1 | 12/2005 | Stephanick et al. |
| 2006/0022947 A1 | 2/2006 | Griffin et al. |
| 2006/0026521 A1 | 2/2006 | Hotelling et al. |
| 2006/0033724 A1 | 2/2006 | Chaudhri et al. |
| 2006/0053387 A1 | 3/2006 | Ording |
| 2006/0176283 A1 | 8/2006 | Suraqui |
| 2006/0209040 A1 | 9/2006 | Garside et al. |
| 2006/0239562 A1 | 10/2006 | Bhattacharyay et al. |
| 2006/0253793 A1 | 11/2006 | Zhai et al. |
| 2006/0265648 A1 | 11/2006 | Rainisto et al. |
| 2006/0265668 A1 | 11/2006 | Rainisto |
| 2006/0279548 A1 | 12/2006 | Geaghan |
| 2006/0285163 A1 | 12/2006 | Han et al. |
| 2007/0015534 A1 | 1/2007 | Shimizu |
| 2007/0040813 A1 | 2/2007 | Kushler et al. |
| 2007/0046641 A1 | 3/2007 | Lim |
| 2007/0061753 A1 | 3/2007 | Ng et al. |
| 2007/0074131 A1 | 3/2007 | Assadollahi |
| 2007/0150842 A1 | 6/2007 | Chaudhri et al. |
| 2007/0152978 A1 | 7/2007 | Kocienda et al. |
| 2007/0152979 A1 | 7/2007 | Jobs et al. |
| 2007/0156394 A1 | 7/2007 | Banerjee et al. |
| 2007/0157085 A1 | 7/2007 | Peters |
| 2007/0229476 A1 | 10/2007 | Huh |
| 2007/0256029 A1 | 11/2007 | Maxwell |
| 2007/0260981 A1 | 11/2007 | Kim et al. |
| 2007/0263932 A1 | 11/2007 | Bernardin et al. |
| 2008/0016457 A1 | 1/2008 | Tabuchi et al. |
| 2008/0033713 A1 | 2/2008 | Broström |
| 2008/0100581 A1 | 5/2008 | Fux |
| 2008/0122796 A1 | 5/2008 | Jobs et al. |
| 2008/0126387 A1 | 5/2008 | Blinnikka |
| 2008/0136587 A1 | 6/2008 | Orr |
| 2008/0141125 A1 | 6/2008 | Ghassabian |
| 2008/0158020 A1 * | 7/2008 | Griffin ............... G06F 3/04886 341/22 |
| 2008/0165202 A1 | 7/2008 | Brodersen et al. |
| 2008/0168366 A1 | 7/2008 | Kocienda et al. |
| 2008/0184360 A1 | 7/2008 | Kornilovsky et al. |
| 2008/0189605 A1 | 8/2008 | Kay et al. |
| 2008/0195388 A1 | 8/2008 | Bower et al. |
| 2008/0231610 A1 | 9/2008 | Hotelling et al. |
| 2008/0259040 A1 | 10/2008 | Ording et al. |
| 2008/0266261 A1 | 10/2008 | Idzik |
| 2008/0266263 A1 | 10/2008 | Motaparti |
| 2008/0273013 A1 | 11/2008 | Levine et al. |
| 2008/0281583 A1 | 11/2008 | Slothouber et al. |
| 2008/0304890 A1 | 12/2008 | Shin et al. |
| 2008/0309644 A1 | 12/2008 | Arimoto |
| 2008/0316183 A1 | 12/2008 | Westerman et al. |
| 2008/0318635 A1 | 12/2008 | Yoon et al. |
| 2009/0002326 A1 | 1/2009 | Pihlaja |
| 2009/0006991 A1 | 1/2009 | Lindberg et al. |
| 2009/0007001 A1 | 1/2009 | Morin et al. |
| 2009/0025089 A1 | 1/2009 | Martin et al. |
| 2009/0058823 A1 | 3/2009 | Kocienda |
| 2009/0058830 A1 | 3/2009 | Herz et al. |
| 2009/0066668 A1 | 3/2009 | Kim et al. |
| 2009/0077464 A1 | 3/2009 | Goldsmith et al. |
| 2009/0085881 A1 | 4/2009 | Keam |
| 2009/0094562 A1 | 4/2009 | Jeong et al. |
| 2009/0125848 A1 | 5/2009 | Keohane et al. |
| 2009/0132576 A1 | 5/2009 | Miller et al. |
| 2009/0144667 A1 | 6/2009 | Christoffersson et al. |
| 2009/0150785 A1 | 6/2009 | Asami et al. |
| 2009/0160800 A1 | 6/2009 | Liu et al. |
| 2009/0167700 A1 | 7/2009 | Westerman et al. |
| 2009/0174667 A1 | 7/2009 | Kocienda et al. |
| 2009/0193334 A1 * | 7/2009 | Assadollahi .......... G06F 17/276 715/261 |
| 2009/0213081 A1 | 8/2009 | Case, Jr. |
| 2009/0228792 A1 | 9/2009 | Van Os et al. |
| 2009/0228842 A1 | 9/2009 | Westerman et al. |
| 2009/0237361 A1 | 9/2009 | Mosby et al. |
| 2009/0240949 A9 | 9/2009 | Kitchens et al. |
| 2009/0247112 A1 | 10/2009 | Lundy et al. |
| 2009/0251410 A1 | 10/2009 | Mori et al. |
| 2009/0254818 A1 | 10/2009 | Jania et al. |

(56) References Cited

U.S. PATENT DOCUMENTS

| | | |
|---|---|---|
| 2009/0259962 A1 | 10/2009 | Beale |
| 2009/0265669 A1 | 10/2009 | Kida et al. |
| 2009/0267909 A1 | 10/2009 | Chen et al. |
| 2009/0284471 A1 | 11/2009 | Longe et al. |
| 2009/0295737 A1 | 12/2009 | Goldsmith et al. |
| 2009/0307768 A1 | 12/2009 | Zhang et al. |
| 2009/0313693 A1 | 12/2009 | Rogers |
| 2010/0020033 A1 | 1/2010 | Nwosu |
| 2010/0020036 A1 | 1/2010 | Hui et al. |
| 2010/0026650 A1 | 2/2010 | Srivastava et al. |
| 2010/0045705 A1 | 2/2010 | Vertegaal et al. |
| 2010/0050121 A1 | 2/2010 | Shin |
| 2010/0052880 A1 | 3/2010 | Laitinen |
| 2010/0070908 A1 | 3/2010 | Mori et al. |
| 2010/0079413 A1 | 4/2010 | Kawashima et al. |
| 2010/0095238 A1 | 4/2010 | Baudet |
| 2010/0097321 A1 | 4/2010 | Son et al. |
| 2010/0115402 A1 | 5/2010 | Knaven et al. |
| 2010/0127991 A1 | 5/2010 | Yee |
| 2010/0131900 A1 | 5/2010 | Spetalnick |
| 2010/0141590 A1 | 6/2010 | Markiewicz et al. |
| 2010/0156813 A1 | 6/2010 | Duarte et al. |
| 2010/0156818 A1 | 6/2010 | Burrough et al. |
| 2010/0161538 A1 | 6/2010 | Kennedy, Jr. et al. |
| 2010/0192086 A1* | 7/2010 | Kocienda et al. ............ 715/773 |
| 2010/0197352 A1 | 8/2010 | Runstedler et al. |
| 2010/0199176 A1 | 8/2010 | Chronqvist |
| 2010/0225599 A1* | 9/2010 | Danielsson et al. ......... 345/173 |
| 2010/0235726 A1 | 9/2010 | Ording et al. |
| 2010/0253620 A1 | 10/2010 | Singhal |
| 2010/0257478 A1 | 10/2010 | Longe et al. |
| 2010/0257490 A1 | 10/2010 | Lyon et al. |
| 2010/0259482 A1 | 10/2010 | Ball |
| 2010/0259561 A1 | 10/2010 | Forutanpour et al. |
| 2010/0265181 A1 | 10/2010 | Shore |
| 2010/0269040 A1 | 10/2010 | Lee |
| 2010/0277424 A1 | 11/2010 | Chang et al. |
| 2010/0287486 A1 | 11/2010 | Coddington |
| 2010/0289749 A1 | 11/2010 | Ahn |
| 2010/0292984 A1 | 11/2010 | Huang et al. |
| 2010/0293475 A1 | 11/2010 | Nottingham et al. |
| 2010/0295801 A1 | 11/2010 | Bestle et al. |
| 2010/0313127 A1 | 12/2010 | Gosper et al. |
| 2010/0313158 A1 | 12/2010 | Lee et al. |
| 2010/0315266 A1 | 12/2010 | Gunawardana et al. |
| 2010/0325721 A1 | 12/2010 | Bandyopadhyay et al. |
| 2010/0333027 A1 | 12/2010 | Martensson et al. |
| 2011/0010655 A1 | 1/2011 | Dostie et al. |
| 2011/0018812 A1 | 1/2011 | Baird |
| 2011/0029862 A1 | 2/2011 | Scott et al. |
| 2011/0035696 A1 | 2/2011 | Elazari et al. |
| 2011/0041056 A1 | 2/2011 | Griffin et al. |
| 2011/0043455 A1 | 2/2011 | Roth et al. |
| 2011/0050594 A1 | 3/2011 | Kim et al. |
| 2011/0060984 A1 | 3/2011 | Lee |
| 2011/0061017 A1 | 3/2011 | Ullrich et al. |
| 2011/0061029 A1 | 3/2011 | Yeh et al. |
| 2011/0063231 A1 | 3/2011 | Jakobs et al. |
| 2011/0074704 A1 | 3/2011 | Causey et al. |
| 2011/0078563 A1 | 3/2011 | Archer |
| 2011/0078613 A1 | 3/2011 | Bangalore |
| 2011/0086674 A1 | 4/2011 | Rider et al. |
| 2011/0090151 A1 | 4/2011 | Huang et al. |
| 2011/0099505 A1 | 4/2011 | Dahl |
| 2011/0099506 A1* | 4/2011 | Gargi et al. .................. 715/773 |
| 2011/0119623 A1 | 5/2011 | Kim |
| 2011/0148572 A1 | 6/2011 | Ku |
| 2011/0171617 A1 | 7/2011 | Yeh et al. |
| 2011/0179355 A1 | 7/2011 | Karlsson |
| 2011/0193797 A1 | 8/2011 | Unruh |
| 2011/0197128 A1 | 8/2011 | Assadollahi |
| 2011/0201387 A1 | 8/2011 | Paek et al. |
| 2011/0202835 A1 | 8/2011 | Jakobsson et al. |
| 2011/0202876 A1 | 8/2011 | Badger et al. |
| 2011/0205160 A1 | 8/2011 | Song et al. |
| 2011/0209087 A1 | 8/2011 | Guyot-Sionnest |
| 2011/0233407 A1 | 9/2011 | Wu et al. |
| 2011/0239153 A1 | 9/2011 | Carter et al. |
| 2011/0242138 A1 | 10/2011 | Tribble |
| 2011/0248945 A1 | 10/2011 | Higashitani |
| 2011/0249076 A1 | 10/2011 | Zhou et al. |
| 2011/0256848 A1 | 10/2011 | Bok et al. |
| 2011/0285656 A1 | 11/2011 | Yaksick et al. |
| 2011/0291940 A1 | 12/2011 | Ghassabian |
| 2011/0302518 A1 | 12/2011 | Zhang |
| 2011/0305494 A1 | 12/2011 | Kang |
| 2012/0005576 A1 | 1/2012 | Assadollahi |
| 2012/0023447 A1 | 1/2012 | Hoshino et al. |
| 2012/0029910 A1 | 2/2012 | Medlock et al. |
| 2012/0030566 A1 | 2/2012 | Victor |
| 2012/0030623 A1 | 2/2012 | Hoellwarth |
| 2012/0030624 A1 | 2/2012 | Migos |
| 2012/0036469 A1* | 2/2012 | Suraqui ............... G06F 3/04883 715/773 |
| 2012/0053887 A1 | 3/2012 | Nurmi |
| 2012/0062465 A1 | 3/2012 | Spetalnick |
| 2012/0062494 A1 | 3/2012 | Hsieh et al. |
| 2012/0068937 A1 | 3/2012 | Backlund et al. |
| 2012/0079373 A1 | 3/2012 | Kocienda et al. |
| 2012/0084734 A1 | 4/2012 | Wilairat |
| 2012/0092278 A1 | 4/2012 | Yamano |
| 2012/0102401 A1 | 4/2012 | Ijas et al. |
| 2012/0110518 A1 | 5/2012 | Chan et al. |
| 2012/0117506 A1 | 5/2012 | Koch et al. |
| 2012/0119997 A1 | 5/2012 | Gutowitz |
| 2012/0149477 A1 | 6/2012 | Park et al. |
| 2012/0159317 A1 | 6/2012 | Di Cocco et al. |
| 2012/0162081 A1 | 6/2012 | Stark |
| 2012/0166696 A1 | 6/2012 | Kallio et al. |
| 2012/0167009 A1 | 6/2012 | Davidson et al. |
| 2012/0200514 A1 | 8/2012 | Allen |
| 2012/0223959 A1 | 9/2012 | Lengeling |
| 2012/0249595 A1 | 10/2012 | Feinstein |
| 2012/0284673 A1 | 11/2012 | Lamb et al. |
| 2012/0306772 A1 | 12/2012 | Tan et al. |
| 2012/0311437 A1 | 12/2012 | Weeldreyer et al. |
| 2013/0007606 A1 | 1/2013 | Dolene |
| 2013/0019172 A1 | 1/2013 | Kotler et al. |
| 2013/0036388 A1 | 2/2013 | Kirkpatrick |
| 2013/0046544 A1 | 2/2013 | Kay et al. |
| 2013/0050222 A1 | 2/2013 | Moran et al. |
| 2013/0061317 A1 | 3/2013 | Runstedler et al. |
| 2013/0063356 A1 | 3/2013 | Martisauskas |
| 2013/0067382 A1 | 3/2013 | Townsend et al. |
| 2013/0067411 A1 | 3/2013 | Kataoka et al. |
| 2013/0080962 A1 | 3/2013 | Razzaghi |
| 2013/0104068 A1 | 4/2013 | Murphy et al. |
| 2013/0120266 A1 | 5/2013 | Griffin et al. |
| 2013/0120267 A1 | 5/2013 | Pasquero et al. |
| 2013/0120268 A1 | 5/2013 | Griffin et al. |
| 2013/0125034 A1 | 5/2013 | Griffin et al. |
| 2013/0125036 A1 | 5/2013 | Griffin et al. |
| 2013/0125037 A1 | 5/2013 | Pasquero et al. |
| 2013/0176228 A1 | 7/2013 | Griffin et al. |
| 2013/0187858 A1 | 7/2013 | Griffin et al. |
| 2013/0187868 A1 | 7/2013 | Griffin et al. |
| 2013/0222249 A1 | 8/2013 | Pasquero et al. |
| 2013/0222255 A1 | 8/2013 | Pasquero et al. |
| 2013/0222256 A1 | 8/2013 | Pasquero et al. |
| 2013/0246329 A1 | 9/2013 | Pasquero et al. |
| 2013/0263038 A1 | 10/2013 | Griffin et al. |
| 2013/0271375 A1 | 10/2013 | Griffin et al. |
| 2013/0271385 A1 | 10/2013 | Griffin et al. |
| 2013/0275923 A1 | 10/2013 | Griffin et al. |
| 2013/0285913 A1 | 10/2013 | Griffin et al. |
| 2013/0285916 A1 | 10/2013 | Griffin et al. |
| 2013/0285927 A1 | 10/2013 | Pasquero et al. |
| 2013/0285928 A1 | 10/2013 | Thorsander |
| 2013/0285930 A1 | 10/2013 | Thorsander et al. |
| 2013/0290906 A1 | 10/2013 | Thorsander |
| 2013/0314331 A1 | 11/2013 | Rydenhag et al. |
| 2013/0342452 A1 | 12/2013 | Kuo et al. |
| 2014/0002363 A1 | 1/2014 | Griffin et al. |
| 2014/0062886 A1 | 3/2014 | Pasquero et al. |

(56) References Cited

U.S. PATENT DOCUMENTS

| | | | |
|---|---|---|---|
| 2014/0062923 A1 | 3/2014 | Thorsander et al. |
| 2014/0063067 A1 | 3/2014 | Compton et al. |
| 2014/0067372 A1 | 3/2014 | Pasquero et al. |
| 2014/0108992 A1 | 4/2014 | Bi et al. |
| 2014/0164977 A1 | 6/2014 | Spetalnick |
| 2014/0179283 A1 | 6/2014 | Kwon et al. |

FOREIGN PATENT DOCUMENTS

| | | |
|---|---|---|
| CA | 2813393 A1 | 10/2013 |
| CA | 2819839 A1 | 12/2013 |
| CA | 2820997 A1 | 1/2014 |
| CN | 101021762 A | 8/2007 |
| EP | 0844571 A2 | 5/1998 |
| EP | 0880090 A2 | 11/1998 |
| EP | 0880090 A3 | 11/1998 |
| EP | 1847917 A2 | 10/2007 |
| EP | 1847917 A3 | 10/2007 |
| EP | 1850217 A2 | 10/2007 |
| EP | 1909161 A1 | 4/2008 |
| EP | 1939715 A1 | 7/2008 |
| EP | 1942398 A1 | 7/2008 |
| EP | 2077491 A1 | 7/2009 |
| EP | 2109046 A1 | 10/2009 |
| EP | 2128750 A2 | 12/2009 |
| EP | 2146271 A2 | 1/2010 |
| EP | 2184686 A1 | 5/2010 |
| EP | 2214118 A1 | 8/2010 |
| EP | 2256614 A1 | 12/2010 |
| EP | 2282252 A1 | 2/2011 |
| EP | 2293168 A1 | 3/2011 |
| EP | 2320312 A1 | 5/2011 |
| EP | 2336851 A2 | 6/2011 |
| EP | 2381384 A1 | 10/2011 |
| EP | 2386976 A1 | 11/2011 |
| EP | 2402846 A2 | 1/2012 |
| EP | 2420925 A2 | 2/2012 |
| EP | 2431842 A2 | 3/2012 |
| EP | 2400426 B1 | 3/2013 |
| EP | 2618248 A1 | 7/2013 |
| EP | 2631758 A1 | 8/2013 |
| EP | 2653955 A1 | 10/2013 |
| EP | 2660696 A1 | 11/2013 |
| EP | 2660697 | 11/2013 |
| EP | 2660697 A1 | 11/2013 |
| EP | 2660727 A1 | 11/2013 |
| EP | 26606699 A1 | 11/2013 |
| EP | 2703955 A1 | 3/2014 |
| EP | 2703956 A1 | 3/2014 |
| EP | 2703957 A1 | 3/2014 |
| JP | 2011-197782 A | 10/2011 |
| JP | 2012-068963 A | 4/2012 |
| KP | KR20120030652 A | 3/2012 |
| WO | WO03/029950 A2 | 4/2003 |
| WO | WO03/054681 A1 | 7/2003 |
| WO | WO2004/001560 A1 | 12/2003 |
| WO | 2005/064587 A2 | 7/2005 |
| WO | WO2006/100509 A2 | 9/2006 |
| WO | WO2007/068505 A1 | 6/2007 |
| WO | WO2007/076210 A1 | 7/2007 |
| WO | WO2007/134433 A1 | 11/2007 |
| WO | 2008/030974 A1 | 3/2008 |
| WO | WO2008/057785 A2 | 5/2008 |
| WO | 2008/085741 A2 | 7/2008 |
| WO | WO2009/019546 A2 | 2/2009 |
| WO | 2010/035585 A1 | 4/2010 |
| WO | WO2010/035574 A1 | 4/2010 |
| WO | WO 2010035574 A1 * | 4/2010 |
| WO | WO2010/099835 A1 | 9/2010 |
| WO | WO2010/112841 A1 | 10/2010 |
| WO | WO2011/073992 A2 | 6/2011 |
| WO | 2011/098925 A1 | 8/2011 |
| WO | WO2011/098925 A1 | 8/2011 |
| WO | WO2011/113057 A1 | 9/2011 |
| WO | WO2012/043932 A1 | 4/2012 |
| WO | 2013/163718 A1 | 11/2013 |
| WO | 2013/164013 A1 | 11/2013 |

OTHER PUBLICATIONS

Canadian Office Action dated Mar. 27, 2013, issued Canadian Application No. 2,737,314, (3 pages).
Distinctive Touch: Gesture-based lightweight identification for touchscreen displays, Electronic Max, Dec. 7, 2004, http://courses.media.mit.edu/2004fall/mas622j/04.projects/students/VanKleek/; accessed online Apr. 27, 2009, pp. 1-11.
Enable or Disable SureType with a RIM BlackBerry Pearl Using Handheld Software, version 4.x, "http://www.wireless.att.com/support_static_files/KB/KB72601.html", at least as early as Feb. 8, 2008 (3 pages).
European Examination Report dated Apr. 5, 2013, issued in European Application No. 12180190.6 (7 pages).
European Examination Report dated Aug. 22, 2013, issued in European Application No. 12166520.2, (4 pages).
European Examination Report dated Aug. 22, 2013, issued in European Application No. 12173818.1, (6 pages).
European Examination Report dated Dec. 9, 2013, issued in European Application No. 12172458.7, (4 pages).
Extended European Search Report dated Aug. 27, 2012, issued in European Application No. 12169649.6 (7 pages).
Extended European Search Report dated Dec. 21, 2012, issued in European Application No. 12173818.4, (8 pages).
Extended European Search Report dated Jun. 26, 2013, issued in European Application No. 12184574.7 (10 pages).
Extended European Search Report dated May 6, 2009, issued in European Application No. 09151723.5 (7 pages).
Extended European Search Report dated Nov. 28, 2011, issued in European Application No. 11180985.1 (4 pages).
Final Office Action dated Apr. 25, 2013, issued in U.S. Appl. No. 13/564,697 (11 pages).
Final Office Action dated Dec. 13, 2013, issued in U.S. Appl. No. 13/572,232 (30 pages).
Final Office Action dated Feb. 10, 2014, issued in U.S. Appl. No. 13/485,723 (19 pages).
Final Office Action dated Jul. 25, 2013, issued in U.S. Appl. No. 13/560,796 (19 pages).
Final Office Action dated Jul. 30, 2013, issued in U.S. Appl. No. 13/459,301 (27 pages).
Final Office Action dated Jul. 9, 2013, issued in U.S. Appl. No. 13/564,070 (26 pages).
Final Office Action dated May 10, 2013, issued in U.S. Appl. No. 13/459,301 (16 pages).
Final Office Action dated May 15, 2013, issued in U.S. Appl. No. 13/563,182 (21 pages).
Final Office Action dated May 2, 2013, issued in U.S. Appl. No. 13/564,687 (17 pages).
Final Office Action dated May 29, 2012, issued in U.S. Appl. No. 12/362,536 (16 pages).
Final Office Action dated Oct. 26, 2011, issued in U.S. Appl. No. 12/362,536 (21 pages).
Notice of Allowance dated Aug. 12, 2013, issued in U.S. Appl. No. 13/564,687 (10 pages).
Notice of Allowance dated Oct. 11, 2013, issued in U.S. Appl. No. 13/563,943 (20 pages).
Office Action dated Dec. 6, 2013, issued in U.S. Appl. No. 13/564,697 (22 pages).
Office Action dated Jan. 31, 2014, issued in U.S. Appl. No. 13/534,101(38 pages).
Office Action dated Jun. 8, 2011, issued in U.S. Appl. No. 12/362,536 (19 pages).
Office Action dated May 30, 2013, issued in U.S. Appl. No. 13/572,232 (49 pages).
Office Action dated Nov. 22, 2013, issued in U.S. Appl. No. 13/447,704 (47 pages).
Office Action dated Oct. 17, 2013, issued in U.S. Appl. No. 13/485,723 (28 pages).

(56) References Cited

OTHER PUBLICATIONS

Through the Magic Window—Magic Window word processor for the Apple II, Artsci Publishing, 1980, http://www.artscipub.com/history/magicwindow, accessed May 21, 2013 (5 pages).
Touchpal (combination of two sources: first, youtube video on touchpal at url: http://www.youtube.com/watch?v=eJUWFEXxJal, dated on Dec. 1, 2011, with screen captures shown below; second, TimesofIndia website article on touchpal at url: http://articles.timesofindia.indiatimes.com/2012-01-29/computing/30673975_1_swype-android-market-qwerty (3 pages)).
U.S. Appl. No. 13/459,301, filed Apr. 30, 2012, (87 pages).
U.S. Appl. No. 13/459,716, filed Apr. 30, 2012, (63 pages).
U.S. Appl. No. 13/459,761, filed Apr. 30, 2012, (35 pages).
U.S. Appl. No. 13/459,872, filed Apr. 30, 2012, (35 pages).
U.S. Appl. No. 13/459,980, filed Apr. 30, 2012, (35 pages).
U.S. Appl. No. 13/481,171, filed May 25, 2012, (24 pages).
U.S. Appl. No. 13/529,182, filed Jun. 21, 2012, (24 pages).
U.S. Appl. No. 13/534,101, filed Jun. 27, 2012, (85 pages).
U.S. Appl. No. 13/601,864, filed Aug. 31, 2012, (23 pages).
U.S. Appl. No. 13/601,898, filed Aug. 31, 2012, (28 pages).
"Features Included in the T-Mobile G1", http://www.t-mobileg1.com/T-Mobile-G1-Features.pdf, 2009.
"Windows Mobile Café—Software (Freeware): Touchpal, Let's Try Tabbing Up to 300 Chars/Min", Nov. 4, 2007, retrieved from URL:http://windows-mobile-cafe.blogspot.nl/2007/11/software-freeware-touchpal-lets-try.html, accessed online Jan. 18, 2013 (2 pages).
BlackBerry Seeker—Freeware—Pattern Lock v1.0.7, http://www.blackberryseeker.com/applications/preview/Pattern-Lock-v107.aspx, Jul. 28, 2009.
Chong et al., Exploring the Use of Discrete Gestures for Authentication, IFIP International Federation for Information Processing, 2009.
Conveniently select text, images, annotations, etc. in a PDF or any other text format on a touch based mobile/tablet device, IP.com Journal, Mar. 1, 2011, XP013142665, (10 pages).
DROID X by Motorola © 2010 Screen shots.
DROID X by Motorola © 2010 User Manual (72 pages).
European Partial Search Report dated Jan. 16, 2013, issued in European Application No. 12182612.7 (5 pages).
European Partial Search Report dated Mar. 7, 2013, issued in European Application No. 12184574.7 (5 pages).
European Partial Search Report dated Sep. 16, 2010, issued in European Application No. 10160590.5 (5 pages).
Extended European Search Report dated Aug. 24, 2012, issued in European Application No. 12166115.1 (5 pages).
Extended European Search Report dated Aug. 24, 2012, issued in European Application No. 12172458.7 (6 pages).
Extended European Search Report dated Aug. 31, 2012, issued in European Application No. 12166170.6 (7 pages).
Extended European Search Report dated Feb. 28, 2011, issued in European Application No. 10160590.5 (10 pages).
Extended European Search Report dated Feb. 28, 2013, issued in European Application No. 12182610.1 (7 pages).
Extended European Search Report dated Jan. 25, 2013, issued in European Application No. 12166520.2 (8 pages).
Extended European Search Report dated Mar. 8, 2013, issued in European Application No. 12182611.9 (8 pages).
Extended European Search Report dated Nov. 22, 2012, issued in European Application No. 12172892.7 (7 pages).
Extended European Search Report dated Oct. 9, 2012, issued in European Application No. 12166244.9 (6 pages).
Extended European Search Report dated Sep. 10, 2012, issued in European Application No. 12166246.4 (6 pages).
Extended European Search Report dated Sep. 10, 2012, issued in European Application No. 12166247.2 (8 pages).
Extended European Search Report dated Sep. 21, 2012, issued in European Application No. 12164240.9 (6 pages).
Extended European Search Report dated Sep. 25, 2012, issued in European Application No. 11192713.3 (7 pages).
Extended European Search Report dated Sep. 25, 2012, issued in European Application No. 12176453.4 (7 pages).
Extended European Search Report dated Sep. 25, 2012, issued in European Application No. 12180190.6 (8 pages).
Extended European Search Report dated Sep. 3, 2012, issued in European Application No. 12164300.1 (7 pages).
Final Office Action dated Apr. 4, 2013, issued in U.S. Appl. No. 13/447,835 (20 pages).
Final Office Action dated Feb. 1, 2013, issued in U.S. Appl. No. 13/563,943 (17 pages).
Final Office Action dated Feb. 28, 2013, issued in U.S. Appl. No. 13/524,678 (21 pages).
Final Office Action dated Jan. 18, 2013, issued in U.S. Appl. No. 13/482,705 (18 pages).
Final Office Action dated Mar. 15, 2013, issued in U.S. Appl. No. 13/572,232 (36 pages).
Google Mobile Help—Editing text, http://supportgoogle.com/mobile/bin/answer.py?hl=en&answer=168926, date of access: Jun. 6, 2012 (2 pages).
GSMArena—Samsung announce s5600 & s5230 full touch midrange phones, http://www.gsmarena.com/samsung_announce_s5600_and_s5230full_touch_midrange_phones-news-825.php, Mar. 10, 2009.
Hardware Sphere—Samsung s5600 & s5230 Touchscreen phones, http://hardwaresphere.com/2009/03/09/samsung-s5600-s5230-touchscreen-phones/, Mar. 9, 2009.
iPhone J.D. Typing Letters or Symbols That Are Not on the iPhone Keyboard dated Mar. 19, 2010, accessed "http://www.iphonejd.com/iphone_jd2010/03/typing-letters-or-symbols-that-are-not-on-the-iphone-keyboard.html" on Feb. 26, 2013 (3 pages).
iPhone User Guide—For iPhone OS 3.1 Software, 2009 (217 pages).
Madhvanath, Sriganesh, HP-Gesture based computing interfaces, Mar. 2008.
Manual del usuario Samsung Moment™ with Google™, dated May 20, 2012 (224 pages).
Merrett, Andy, "iPhone OS 3.0: How to cut, copy and paste text and images", http://www.iphonic.tv/2009/06/iphone_os_30_how_to_cut_copy_a.html, Jun. 18, 2009, XP002684215, (8 pages).
Mobile Tech News—Samsung launches new Gesture Lock touchscreen handsets, http://www.mobiletechnews.com/info/2009/03/11/124559.html, Mar. 11, 2009.
Notice of Allowance dated Mar. 15, 2013, issued in U.S. Appl. No. 13/373,356 (25 pages).
Office Action dated Aug. 7, 2012, issued in U.S. Appl. No. 13/482,705 (10 pages).
Office Action dated Dec. 28, 2012, issued in U.S. Appl. No. 13/459,301 (22 pages).
Office Action dated Jan. 22, 2013, issued in U.S. Appl. No. 13/564,687 (19 pages).
Office Action dated Jan. 29, 2013, issued in U.S. Appl. No. 13/563,182 (19 pages).
Office Action dated Jan. 7, 2013, issued in U.S. Appl. No. 13/564,070 (21 pages).
Office Action dated Jan. 7, 2013, issued in U.S. Appl. No. 13/564,697 (19 pages).
Office Action dated Jul. 20, 2012, issued in U.S. Appl. No. 12/764,298 (38 pages).
Office Action dated Mar. 12, 2013, issued in U.S. Appl. No. 13/560,796 (22 pages).
Office Action dated Nov. 14, 2012, issued in U.S. Appl. No. 13/572,232 (24 pages).
Office Action dated Nov. 16, 2012, issued in U.S. Appl. No. 13/554,583 (21 pages).
Office Action dated Nov. 8, 2012, issued in U.S. Appl. No. 13/373,356 (18 pages).
Office Action dated Oct. 15, 2012, issued in U.S. Appl. No. 13/560,270 (15 pages).
Office Action dated Oct. 17, 2012, issued in U.S. Appl. No. 13/563,943 (17 pages).
Office Action dated Oct. 18, 2012, issued in U.S. Appl. No. 13/563,182 (12 pages).

(56) References Cited

OTHER PUBLICATIONS

Office Action dated Oct. 23, 2012, issued in U.S. Appl. No. 12/764,298 (41 pages).
Office Action dated Oct. 25, 2012, issued in U.S. Appl. No. 13/459,732 (15 pages).
Office Action dated Oct. 26, 2012, issued in U.S. Appl. No. 13/554,436 (22 pages).
Office Action dated Oct. 5, 2012, issued in U.S. Appl. No. 13/447,835 (20 pages).
Office Action dated Sep. 10, 2012, issued in U.S. Appl. No. 13/524,678 (12 pages).
Office Action dated Sep. 28, 2012, issued in U.S. Appl. No. 13/494,794 (14 pages).
PCT International Search Report and Written Opinion dated Jan. 24, 2013, issued in International No. PCT/CA2012/050274 (9 pages).
PCT International Search Report and Written Opinion dated Jun. 14, 2012, issued in International Application No. PCT/IB2011/003273 (8 pages).
PCT International Search Report and Written Opinion dated Nov. 7, 2012, issued in International Application No. PCT/CA2012/050362 (9 pages).
PCT International Search Report and Written Opinion dated Nov. 8, 2012, issued in International Application No. PCT/CA2012/050405 (12 pages).
PCT International Search Report and Written Opinion dated Oct. 12, 2012, issued in International Application No. PCT/EP2012/057944 (10 pages).
PCT International Search Report and Written Opinion dated Sep. 10, 2012, issued in International Application No. PCT/EP2012/057945 (11 pages).
Sprint Support Tutorial Set the Screen Lock Pattern—Samsung Moment, http://supportsprint.com/support/tutorial/Set_the_Screen_Lock_Pattern_Samsung_Moment/10887-171, date of access: May 31, 2012 (9 pages).
Sprint Support Tutorial Unlock a Forgotten Lock Pattern—Samsung Moment, http://support.sprint.com/support/tutorial/Unlock_a_Forgotten_Lock_Pattern_Samsung_Moment/10887-339, date of access: May 31, 2012 (7 pages).
Support—Sprint Cell Phones SPH-M900—Samsung Cell Phones, http://www.samsung.com/us/support/owners/product/SPH-M900?tabContent-content2, date of access: May 31, 2012 (1 page).
Swype Product Features, accessed online at http://www.swype.com/about/specifications/ on Feb. 25, 2013 (2 pages).
T-Mobile Forum—Help & How to—Hidden Pattern, http://forums.t- mobile.com/tmbl/board/message?board.id=Android3&message.id=3511&query.id=52231#M3511, Oct. 23, 2008.
T-Mobile Forum—Help & How to—Screen Unlock Pattern, http://forums.t-mobile.com/tmbl/board/message?board.id=Android3&message.id=6015&query.id=50827#M6015, Oct. 22, 2008.
T-Mobile launches the highly anticipated T-Mobile G1, Oct. 22, 2008.
U.S. Appl. No. 13/601,736, filed Aug. 31, 2012 (44 pages).
U.S. Appl. No. 13/616,423, filed Sep. 14, 2012 (30 pages).
U.S. Appl. No. 13/773,812, filed Feb. 22, 2013 (94 pages).
User Guide Samsung Moment(TM) with Google(TM), dated Dec. 4, 2009 (122 pages).
User Guide Samsung Moment(TM) with Google(TM), dated Mar. 2, 2010 (218 pages).
Wang, Feng, et al., "Detecting and Leveraging Finger Orientation for Interaction with Direct-Touch Surfaces", UIST '09, Oct. 4-7, 2009, Victoria, British Columbia, Canada (10 pages).
Office Action dated Jun. 2, 2014, by the Canadian Patent Office in corresponding Application No. 2,812,033 (3 pages).
European Examination Report dated Jun. 3, 2014, in corresponding EP Application 12 172 458.7 (5 pp.).
Canadian Office Action dated Jul. 17, 2014, issued in Canadian Application No. 2,813,393, (4 pages).
Canadian Office Action dated Jul. 3, 2014, issued in Canadian Application No. 2,821,784, (3 pages).
Canadian Office Action dated Jul. 8, 2014, issued in Canadian Application No. 2,793,629, (4 pages).
Canadian Office Action dated Jun. 12, 2014, issued in Canadian Application No. 2,818,720, (3 pages).
Canadian Office Action dated Jun. 12, 2014, issued in Canadian Application No. 2,821,772, (2 pages).
Canadian Office Action dated Jun. 19, 2014, issued in Canadian Application No. 2,821,814, (3 pages).
Canadian Office Action dated Jun. 2, 2014, issued in Canadian Application No. 2,812,033, (3 pages).
Canadian Office Action dated Jun. 25, 2014, issued in Canadian Application No. 2,812,457, (5 pages).
Canadian Office Action dated Jun. 30, 2014, issued in Canadian Application No. 2,819,839, (3 pages).
Canadian Office Action dated May 13, 2014, issued in Canadian Application No. 2,789,827, (4 pages).
Canadian Office Action dated May 5, 2014, issued in Canadian Application No. 2,803,192, (4 pages).
Canadian Office Action dated Sep. 8, 2014, issued in Canadian Application No. 2,794,063, (2 pages).
European Examination Report dated Apr. 11, 2014, issued in European Application No. 12182612.7, (5 pages).
European Examination Report dated Apr. 16, 2014, issued in European Application No. 11192713.3, (7 pages).
European Examination Report dated Jun. 2, 2014, issued in European Application No. 12166142.5, (4 pages).
European Examination Report dated Jun. 3, 2014, issued in European Application No. 12172458.7, (5 pages).
European Examination Report dated Mar. 12, 2014, issued in European Application No. 12169649.6, (7 pages).
Final Office Action dated Apr. 11, 2014, issued in U.S. Appl. No. 13/447,704, (15 pages).
Final Office Action dated Aug. 29, 2014, issued in U.S. Appl. No. 13/485,723, (18 pages).
Final Office Action dated Jul. 2, 2014, issued in U.S. Appl. No. 13/534,101, (15 pages).
Final Office Action dated Jul. 24, 2014, issued in U.S. Appl. No. 13/616,423, (21 pages).
Final Office Action dated Jul. 28, 2014, issued in U.S. Appl. No. 13/569,000, (13 pages).
Final Office Action dated Mar. 26, 2014, issued in U.S. Appl. No. 13/564,697, (9 pages).
Final Office Action dated Oct. 14, 2014, issued in U.S. Appl. No. 13/572,232, (32 pages).
Final Office Action dated Oct. 17, 2014, issued in U.S. Appl. No. 13/459,301, (18 pages).
Final Office Action dated Sep. 15, 2014, issued in U.S. Appl. No. 13/601,736, (19 pages).
Final Office Action dated Sep. 18, 2014, issued in U.S. Appl. No. 13/524,678, (10 pages).
Final Office Action dated Sep. 24, 2014, issued in U.S. Appl. No. 13/481,171, (12 pages).
Final Office Action dated Sep. 25, 2014, issued in U.S. Appl. No. 13/564,697, (6 pages).
German Office Action dated Sep. 1, 2014, issued in German Application No. 112012000299.7-51, (6 pages).
Office Action dated Apr. 11, 2014, issued in U.S. Appl. No. 13/481,171, (12 pages).
Office Action dated Apr. 11, 2014, issued in U.S. Appl. No. 13/572,232, (38 pages).
Office Action dated Apr. 18, 2014, issued in U.S. Appl. No. 13/524,678, (12 pages).
Office Action dated Apr. 21, 2014, issued in U.S. Appl. No. 13/601,736, (19 pages).
Office Action dated Jun. 11, 2014, issued in U.S. Appl. No. 13/563,182, (8 pages).
Office Action dated Jun. 18, 2014, issued in U.S. Appl. No. 13/601,898, (12 pages).
Office Action dated Mar. 12, 2014, issued in U.S. Appl. No. 13/616,423, (19 pages).
Office Action dated Mar. 14, 2014, issued in U.S. Appl. No. 13/569,000, (10 pages).

(56) References Cited

OTHER PUBLICATIONS

Office Action dated Mar. 26, 2014, issued in U.S. Appl. No. 13/548,469, (11 pages).
Office Action dated May 15, 2014, issued in U.S. Appl. No. 13/482,705, (12 pages).
Office Action dated May 2, 2014, issued in U.S. Appl. No. 13/459,301, (19 pages).
Office Action dated May 21, 2014, issued in U.S. Appl. No. 13/485,723, (18 pages).
Office Action dated Oct. 16, 2014, issued in U.S. Appl. No. 13/529,182, (14 pages).
Office Action dated Sep. 18, 2014, issued in U.S. Appl. No. 13/588,803, (8 pages).
Office Action dated Sep. 8, 2014, issued in U.S. Appl. No. 13/601,864, (9 pages).
European Search Report in European Application No. 12169649.6, dated Aug. 27, 2012, 7 pages.
European Search Report in European Application No. 12173818.1, dated Dec. 21, 2012, 8 pages.
United States Office Action in U.S. Appl. No. 13/459,872, dated Oct. 31, 2014, 20 pages.
United States Office Action in U.S. Appl. No. 13/548,469, dated Oct. 23, 2014, 9 pages.
International Preliminary Report dated Patentability in International Application No. PCT/IB2011/003273, dated May 13, 2014, 5 pages.
Office Action issued in Canadian Application No. 2,793,629 dated Jul. 5, 2016.
Office Action issued in related Canadian application No. 2,819,839 dated Mar. 29, 2016.
Office Action issued in Chinese Application No. 201280003919.5 dated Oct. 8, 2016.
Office Action issued in Canadian Application No. 2794063 dated Nov. 25, 2016.
Summons to Attend Oral Proceedings issued in European Application No. 12173818.1 on Nov. 28, 2016.
Office Action issued in Canadian Application No. 2,812,033 dated Dec. 6, 2016.
Office Action issued in German Application No. 112012000189.3 dated Dec. 7, 2016 (no translation available).
Office Action issued in Chinese Application No. 201280003919.5 dated Mar. 15, 2016.
Office Action issued in Canadian Application No. 2,813,393 dated Aug. 25, 2016.
Office Action issued in Canadian Application No. 2813393 dated Jun. 19, 2017; 5 pages.
Invitation Pursuant to Article 94(3) and Rule 71(1) EPC issued in European Application No. 12173818.1 on Mar. 10, 2017; 4 pages.
Office Action issued in Canadian Application No. 2,812,033 dated Oct. 17, 2017; 4 pages.
Extended Search Report issued in European Application No. 12191058.2 dated Sep. 27, 2017; 7 pages.

* cited by examiner

TOUCHSCREEN KEYBOARD PROVIDING WORD PREDICTIONS IN PARTITIONS OF THE TOUCHSCREEN KEYBOARD IN PROXIMATE ASSOCIATION WITH CANDIDATE LETTERS

RELATED APPLICATION DATA

The present application claims priority to and the benefit of provisional U.S. patent application Ser. No. 61/603,043, filed Feb. 24, 2012, which is incorporated herein by reference in its entirety. The present disclosure also relates to commonly owned U.S. patent application Ser. No. 13/373,356, filed Nov. 10, 2011, which is incorporated herein by reference in its entirety.

TECHNICAL FIELD

The present disclosure relates generally to input methodologies for electronic devices, such as handheld electronic devices, and more particularly, to methods for receiving predictive text input and generation of a set of characters for electronic devices.

BACKGROUND

Increasingly, electronic devices, such as computers, netbooks, cellular phones, smart phones, personal digital assistants, tablets, etc., have touchscreens that allow a user to input characters into an application, such as a word processor or email application. Character input on touchscreens can be a cumbersome task due to, for example, the small touchscreen area, particularly where a user needs to input a long message.

DESCRIPTION OF EXAMPLE EMBODIMENTS

Figure 1:
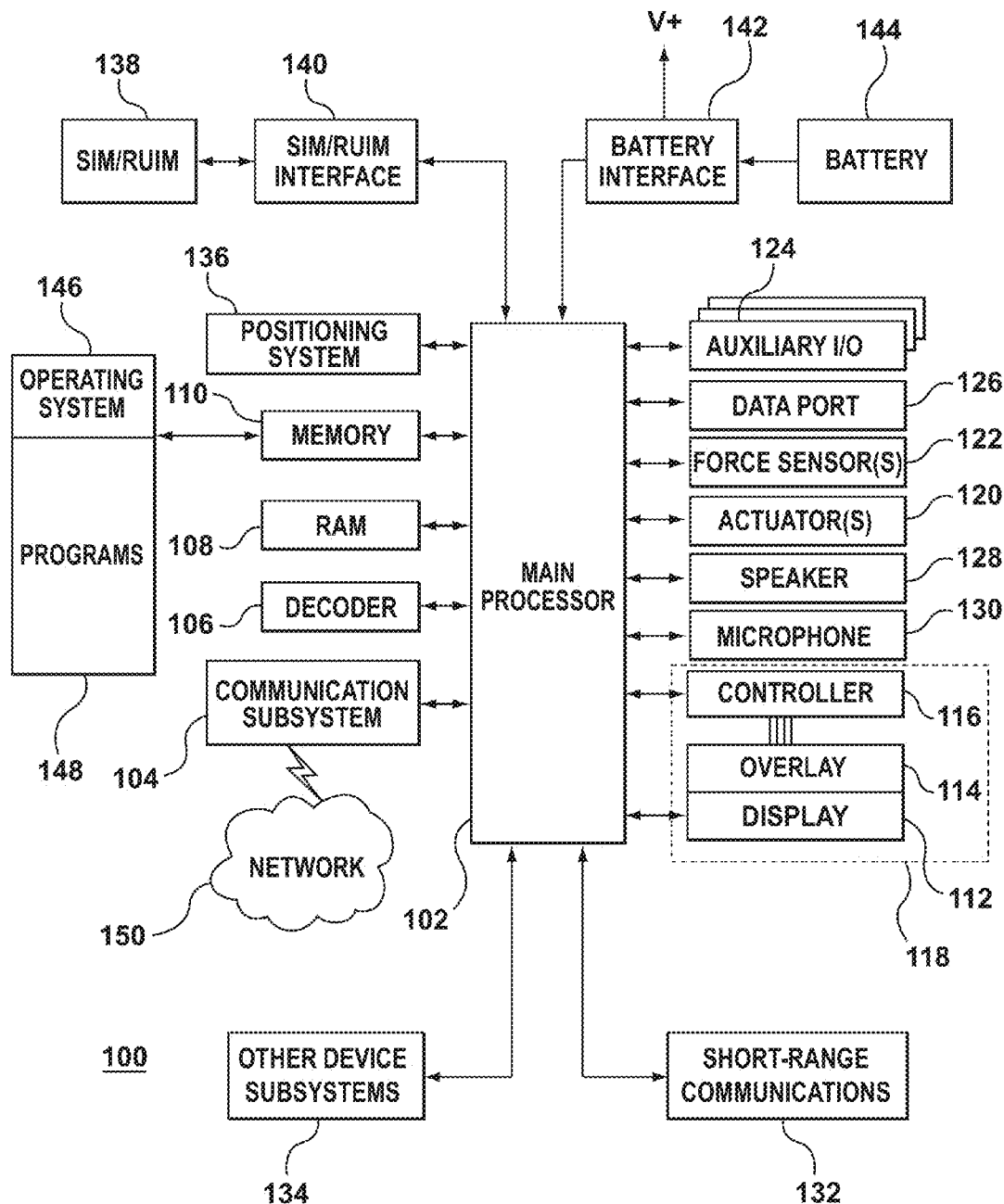
FIG. 1 is an example block diagram of an electronic device, consistent with embodiments disclosed herein.

Reference will now be made in detail to various embodiments, examples of which are illustrated in the accompanying drawings. Wherever possible, the same reference numbers will be used throughout the drawings to refer to the same or like parts.

The present disclosure relates to an electronic device, including wired communication devices (for example, a laptop computer having a touchscreen) and mobile or handheld wireless communication devices such as cellular phones, smartphones, wireless organizers, personal digital assistants, wirelessly enabled notebook computers, tablets, and similar devices. The electronic device can also be an electronic device without wireless communication capabilities, such as a handheld electronic game device, digital photograph album, digital camera, or other device.

Basic predictive text input solutions have been introduced for assisting with input on an electronic device. These solutions include predicting which word a user is entering and offering a suggestion for completing the word. But these solutions can have limitations, often requiring the user to input most or all of the characters in a word before the solution suggests the word the user is trying to input. Even then, a user often has to divert focus from the keyboard to view and consider the suggested word displayed elsewhere on the display of the electronic device, and thereafter, look back at the keyboard to continue typing. Refocusing of one's eyes relative to the keyboard while inputting information in an electronic device, particularly when composing large texts, can strain the eyes and be cumbersome, distracting, and otherwise inefficient. Moreover, processing cycles are lost and display power wasted as the processor is idling while the user is focusing attention to the input area, and then back at the virtual keyboard.

The efficiency of predictive text input solutions, from the perspective of both device resources and user experience, sometimes depends on the particular user and the nature of the interaction of the particular user with the touchscreen. Virtual keyboard usage patterns can be broadly categorized as being of two types: "rapid" and "precise". Rapid typists are typically fast two-thumb typists which rely on auto-correction. This usage pattern corresponds most closely with experienced, frequent touchscreen users. Precise typists are typically careful typists who are inclined to use a single finger point to tap keys in the virtual keyboard, and often choose predictions as an input accelerator rather than auto-correction. This usage pattern corresponds most closely with novice/new touchscreen users as well as potentially one-handed (thumb) use situations.

Accordingly, example embodiments described herein permit the user of an electronic device to input characters without diverting attention from the keyboard and subsequently refocusing. Example embodiments described herein also seek to accommodate different user types, such as rapid typists and precise typists, and the different efficiency challenges presented by the different user types.

Use of the indefinite article "a" or "an" in the specification and the claims is meant to include one or more than one of the feature that it introduces, unless otherwise indicated. Thus, the term "a set of characters" as used in "generating a set of characters" can include the generation of one or more than one set of characters. Similarly, use of the definite article "the", or "said," particularly after a feature has been introduced with the indefinite article, is meant to include one or more than one of the feature to which it refers (unless otherwise indicated). Therefore, the term "the generated set of characters" as used in "displaying the generated set of characters" includes displaying one or more generated set of characters. References to orientation contained herein, such as horizontal and vertical, are relative to the screen orientation of a graphical user interface rather than any physical orientation.

In one embodiment, a method is provided that comprises receiving an input of a character from a virtual keyboard displayed on a display; generating one or more sets of predicted input characters based on the input character; and displaying one or more of the generated sets of predicted input characters within the virtual keyboard at a location proximate to a key corresponding to a subsequent candidate input character in the one or more generated sets of predicted input characters.

In another embodiment, an electronic device is provided that comprises a processor and a display coupled to the processor. The processor can be configured to perform the method.

In another embodiment, a keyboard provided on a display of an electronic device is provided. The keyboard can include a plurality of keys, each key corresponding to one or more different characters of a plurality of characters. In response to receiving an input of a character, the keyboard is configured to perform the method.

These example embodiments, as well as those described below permit the user of an electronic device to input a set of characters without diverting attention from the virtual keyboard and subsequently refocusing. Predicting and providing various options that the user is likely contemplating, and doing so at appropriate locations on the keyboard, allows the focus to remain on the keyboard, which enhances efficiency, accuracy, and speed of character input.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. User-interaction with a graphical user interface (GUI), such as a virtual keyboard rendered and displayed on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters are inputted when the user touches the touchscreen at a location associated with said character.

Touchscreen 118 is connected to and controlled by main processor 102. Accordingly, detection of a touch event and/or determining the location of the touch event can be performed by main processor 102 of electronic device 100. A touch event includes in some embodiments, a tap by a finger, a swipe by a finger, a swipe by a stylus, a long press by finger or stylus, or a press by a finger for a predetermined period of time, and the like.

While specific embodiments of a touchscreen have been described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Main processor 102 can also interact with a positioning system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

Main processor 102 can also interact with an orientation sensor 197 for sensing the orientation of the device. In some examples, the orientation sensor 197 may be one or more accelerometers. In some examples, the orientation sensor may detect acceleration along multiple orthogonal axes. Main processor 102 can also interact with one or more proximity sensors 198 for detecting the proximity of nearby objects. In some examples, the proximity sensor may be one or more infrared emitter/sensor pairs. The main processor 102 can also interact with an ambient light sensor 199 for detecting the intensity and/or color temperature of ambient light.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, or web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2:
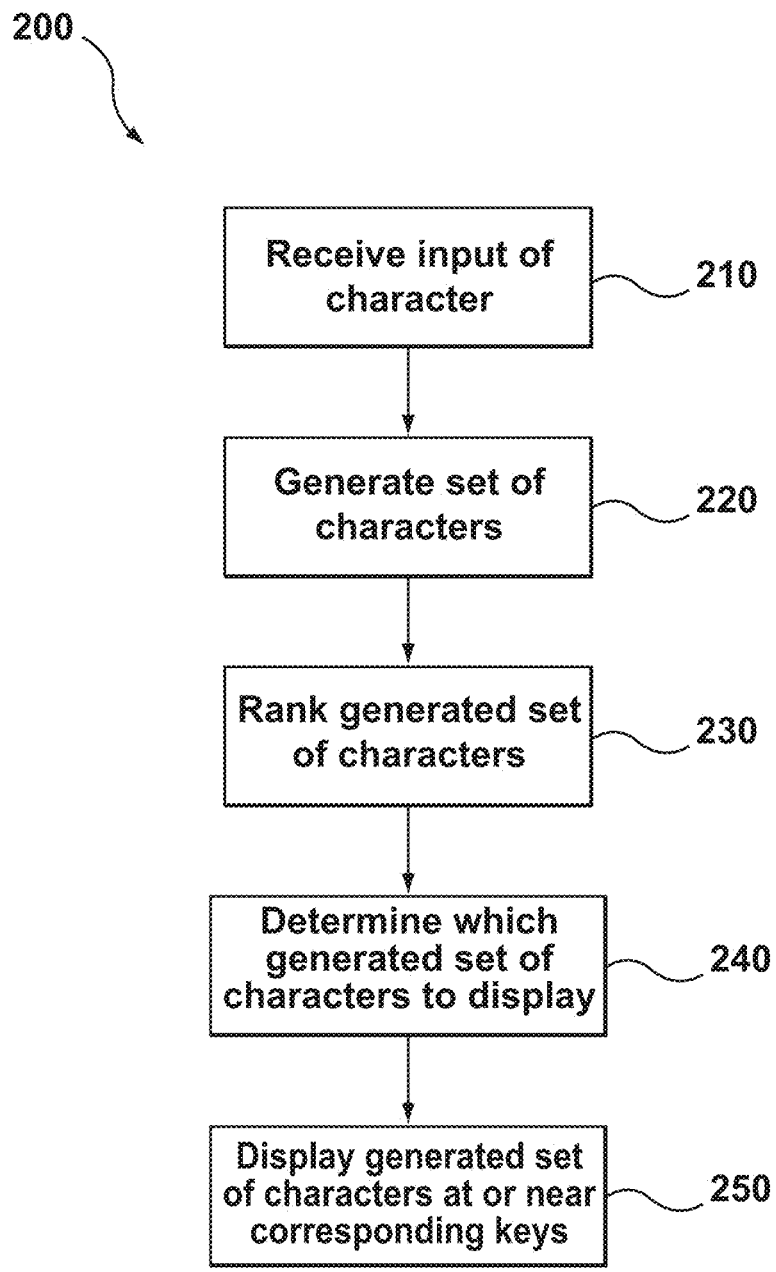
FIG. 2 is a flowchart illustrating an example method for predicting a selected set of characters, consistent with embodiments disclosed herein.

FIG. 2 is a flowchart illustrating an example method 200 for predicting a set of characters, consistent with example embodiments disclosed herein. As used herein, a predictor (such as a predictive algorithm, program or firmware) includes a set of instructions that when executed by a processor (for example, main processor 102), can be used to disambiguate for example, received ambiguous text input and provide various options, such as a set of characters (for example, words or phrases, acronyms, names, slang, colloquialisms, abbreviations, or any combination thereof) that a user might be contemplating. A predictor can also receive otherwise unambiguous text input and predict a set of characters potentially contemplated by the user based on several factors, such as context, frequency of use, and others as appreciated by those skilled in the field. The predictor may predict a set of characters which completes a received text input (known as auto-completion), correct received text input (known as auto-correction), or a combination thereof (e.g., completing the text input while correcting previously entered text input).

For example, in the predictor is a program 148 residing in memory 110 of electronic device 100. Accordingly, method 200 includes a predictor for generating a set of characters corresponding to a subsequent candidate input character based on inputted characters. It can be appreciated that while the example embodiments described herein are directed to a predictor program executed by a processor, the predictor can be executed by a virtual keyboard controller.

Method 200 begins at block 210, where the processor receives an input of one or more characters from a virtual keyboard displayed on a touchscreen. As used herein, however, a character can be any alphanumeric character, such as a letter, a number, a symbol, a punctuation mark, and the like. The inputted character can be displayed in an input field (for example, input field 330 further described below in FIGS. 3-9) that displays the character the user inputs using the virtual keyboard.

At block 220, the processor generates one or more sets of characters such as words or phrases, acronyms, names, slang, colloquialisms, abbreviations, or any combination thereof based on the input received in block 210. The set of characters includes, for example, a set of characters that are stored in a dictionary (for example, a word or an acronym) of a memory of the electronic device, a set of characters that were previously inputted by user (for example, a name or acronym), a set of characters based on a hierarchy or tree structure, a combination thereof, or any set of characters that are selected by a processor based on defined arrangement.

In some embodiments, the processor can use contextual data for generating a set of characters. Contextual data considers the context of characters in the input field. Contextual data can include information about, for example, set of characters previously inputted by the user, grammatical attributes of the characters inputted in the input field (for example, whether a noun or a verb is needed as the next set of characters in a sentence), or any combination thereof. For example, if the set of characters "the" has already been inputted into display, the processor can use the contextual data to determine that a noun—instead of a verb—will be the next set of characters after "the". Likewise, if the set of characters "Guy Lafleur played in the National Hockey" was inputted, based on the context, the processor can determine the subsequent set of characters is likely "League". Using the contextual data, the processor can also determine whether an inputted character was incorrect. For example, the processor can determine that the inputted character was supposed to be a "w" instead of an "a", given the proximity of these characters on a QWERTY virtual keyboard.

Processor 102 can also include an affix as part of the set of characters, such as an adverb ending, an adjective ending, different verb tenses, and the like, or any other change to make a complete set of characters. Processor 102 can also use the received input to generate affixes, such as plural endings or plural forms. Any known predictive technique or software can be used to process the received input and the contextual data in generating set of characters at block 220.

In some example embodiments, the set of characters generated at block 220 can begin with the same character received as input at block 210. For example, if the characters "pl" have been received as input using a virtual keyboard, these characters will be received by the processor as the input. In these embodiments, the set of characters generated at block 220 would all begin with "pl", such as "please" or "plot." There is no limit on the length of a generated set of characters. Regarding affixes, if the user has input the characters "child", for example, the affixes generated at block 220 could include "-ren", to make the set of characters "children", or "-ish", to make the set of characters "childish".

In some example embodiments, the set of characters generated at block 220 can simply include the same characters received as input at block 210. For example, if the received input is an "x," the processor may generate "example" or "xylophone" as the set of characters. Such sets of characters can be generated using the contextual data.

In another example embodiment, if input has not been received or a delimiter (such as a <SPACE>) has been used, the generated set of characters can be placed on subsequent candidate input characters that correspond to the first letter of the generated set of characters.

Next, at block 230, the generated set of characters from block 220 can be ranked. The rankings reflect the likelihood that a candidate set of characters might have been intended by the user, or might be chosen by a user compared to another candidate set of characters.

In some embodiments, contextual data can be included in the ranking at block 230. In some embodiments, the electronic device can be configured to rank nouns or adjectives higher based on the previous inputted set of characters. If the inputted set of characters is suggestive of a noun or adjective, the processor, using the contextual data, can rank the nouns or adjectives corresponding to what the user is typing higher at block 230. In an additional embodiment, set of characters including adjective affixes (such as "-ish" or "-ful"), phrases, plurals, or combinations thereof can also be ranked. Contextual data can increase the likelihood that the higher ranked generated set of characters is intended by a user. In some embodiments, contextual data can include information about which programs or applications are currently running or being used by a user. For example, if the user is running an email application, then set of characters associated with that user's email system, such as set of characters from the user's contact list, can be used to determine the ranking. N-grams, including unigrams, bigrams, trigrams, and the like, can be also used in the ranking of the sets of characters. Alternatively, the geolocation of the electronic device or user can be used in the ranking process. If, for example, the electronic device recognizes that a user is located at his/her office, then sets of characters generally associated with work can be ranked higher in the list. If, on the other hand, the device determines a user is at the beach, then sets of characters generally associated with the beach can be ranked higher in the list.

At block 240, the processor determines which of the set of characters to display based on the ranking. For example, higher ranked sets of characters are more likely to be determined that they should be displayed. A ranker (such as a ranking algorithm, program or firmware) includes a set of instructions that when executed by a processor (for example, main processor 102), can be executed to determine ranking in this regard. In some embodiments, the ranker is a program 146 residing in memory 110 of electronic device 100.

At block 250, the determined set of characters is displayed at a location on the keyboard corresponding to a subsequent candidate input character, predicted as the next character in a word that the user might input. For instance, if a user inputs "pl", the word "please" would be displayed on the key for the letter "e"—the subsequent candidate input character for that word. Similarly, the word "plus" would also be displayed on the key for the letter "u"—another subsequent candidate input character. The subsequent candidate input character can be any alphanumeric character, such as a letter, number, symbol, punctuation mark, and the like.

In some embodiments, the generated set of characters is displayed at or near keys on the virtual keyboard associated with the subsequent candidate input characters. Its placement at or near a key can depend, for instance, on the size of the word or the number of nearby subsequent candidate input characters and the size of their associated set of characters.

The set of characters can be displayed in a manner that will attract the user's attention. In some embodiments, a displayed set of character's appearance can be enhanced or changed in a way that makes the set more readily visible to the user. For example, displayed sets of characters can be displayed with backlighting, highlighting, underlining, bolding, italicizing, using combinations thereof, or in any other way for making the displayed set of characters more visible.

When identifying the set of characters for display at block 240, the processor can limit the displayed set of characters to the top few or choose among the higher ranked sets of characters. For example, if two sets of characters are both ranked high, and these sets of characters would otherwise be displayed at the same key, the electronic device could be configured to display only the highest ranked generated set of characters. In other embodiments, both sets of characters could be displayed at or around the same key, or one set of characters is displayed at one key while the second set of characters is displayed at another key. In some example embodiments, the processor can take into account the display size to limit the number of generated sets of characters.

In some embodiments, the ranking could be used to choose between two or more sets of characters that, when displayed on adjacent subsequent candidate input characters, would overlap with each other (e.g., because of their respective lengths). In such a scenario, the electronic device could be configured to display the higher ranked set of characters on the keyboard. For example, if the set of characters "establishment" is ranked first in a list generated at block 240 after the letter "E" is inputted, "establishment" could be displayed at the "S" key. When displayed on a virtual keyboard, however, its length might occupy some space on the "A" key and the "D" key, potentially blocking a set of characters that would be displayed on or around those keys. At block 240, it could be determined that "establishment" would be displayed fully, and no other set of characters would be placed at the "A" or "D" keys ahead of the first ranked set of characters "establishment." An alternative to displaying only the top ranked set of characters would be to use abbreviations or recognized shortened forms of the set of characters, effectively permitting a long set of characters to be displayed within or mostly within the boundaries of a single key simultaneously with other sets of characters on adjacent keys of a virtual keyboard.

FIGS. 3-9 illustrate a series of example front views of the touchscreen 118 having a virtual keyboard 320, consistent with example embodiments disclosed herein. Starting with FIG. 3A, touchscreen 118 includes a virtual keyboard 320 that is touch-active. The position of the virtual keyboard 320 is variable such that virtual keyboard 320 can be placed at any location on touchscreen 118. Touchscreen 118 could be configured to detect the location and possibly pressure of one or more objects at the same time. Touchscreen 118 includes two areas: (1) an input field 330 that displays characters after a user has inputted those characters and (2) the virtual keyboard 320 that receives the input from the user. As described throughout this disclosure, a virtual keyboard displays a set of characters at a location on the keyboard corresponding to a subsequent candidate input character that might be received as input from the user.

The examples and embodiments illustrated in FIGS. 3-9 can be implemented with any set of characters, such as words, phrases, acronyms, names, slang, colloquialisms, abbreviations, or any combination thereof.

Figure 3A:
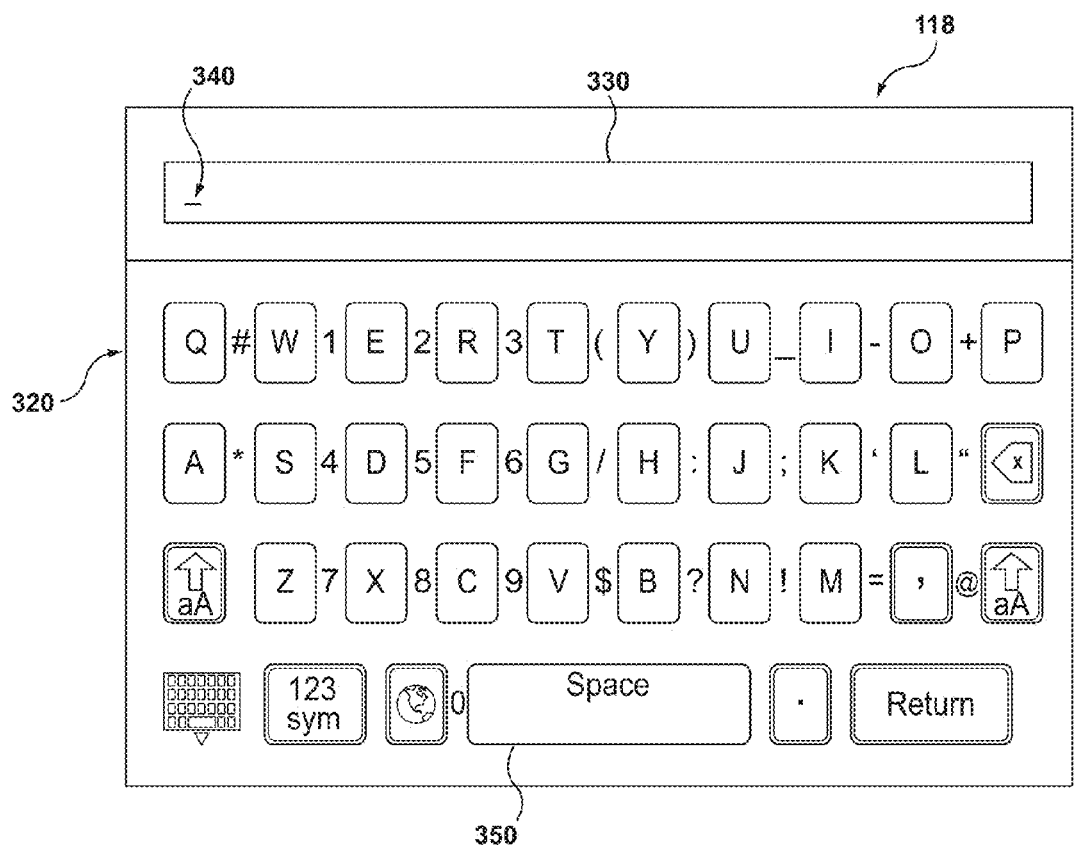
FIGS. 3A, 3B, 3C, and 3D show example front views of a touchscreen, consistent with embodiments disclosed herein.

As shown in FIG. 3A, touchscreen 118 displays a standard QWERTY virtual keyboard 320; however, any conventional key configuration can be displayed for use in the device, such as AZERTY, QWERTZ, or a layout based on the International Telecommunication Union (ITU) standard (ITU E.161) having "ABC" on key 2, "DEF" on key 3, and so on. Virtual keyboard 320 includes space key 350 as well as other keys that can provide different inputs, such as punctuation, letters, numbers, enter or return keys, and function keys. While virtual keyboard 320 is shown as having a square shape, it can have any other shape (such as an arch).

As shown in FIG. 3A, touchscreen 118 displays input field 330, which displays the characters the user inputs using virtual keyboard 320. Input field 330 includes a cursor 340, which can be an underscore (as shown) or any other shape, such as a vertical line. Cursor 340 represents the character space where a next inputted character, selected character, or selected set of characters will be inserted.

Figure 3B:
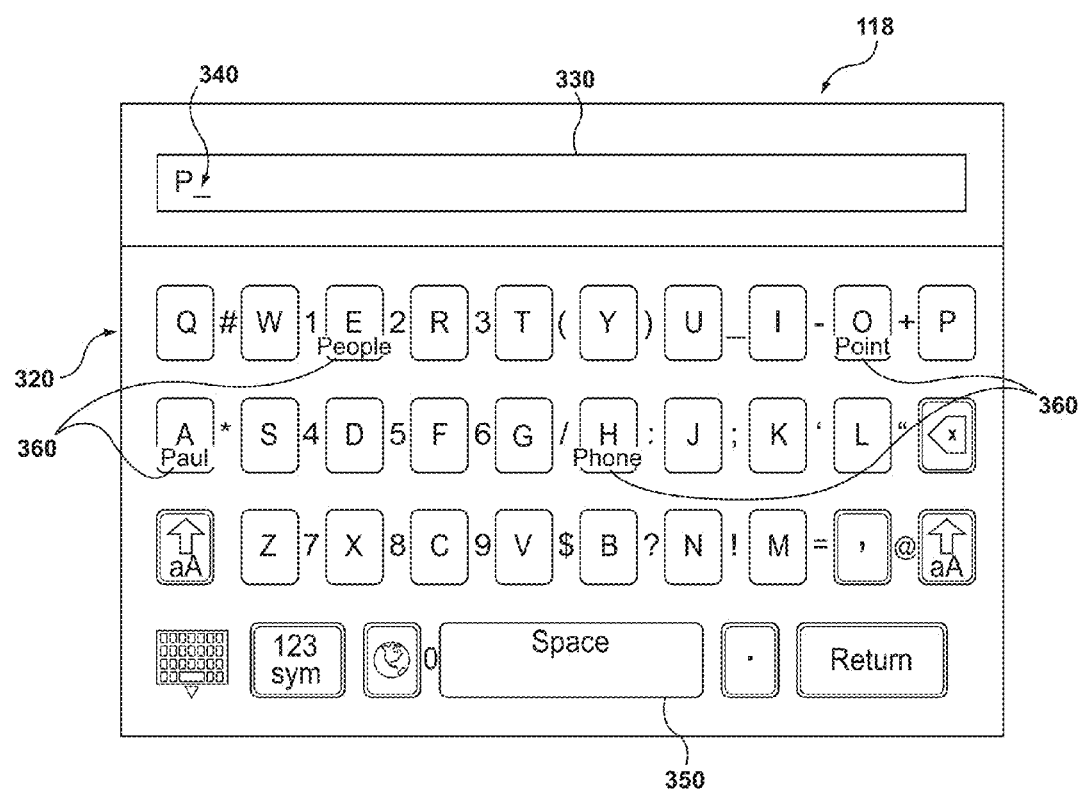

As shown in FIG. 3B, when a user inputs a character (in this example, "P"), this character is displayed in input field 330 and cursor 340 moves to the character space where the next inputted character or word will be inserted. After the character is inputted, a predictor (such as, a predictive algorithm or a circuit) can generate set of characters 360 (for this embodiment) that all begin with the character "P", or characters if more than one character is input. The generated set of characters are displayed at a location on the keyboard corresponding to a subsequent candidate input character that might be received as input from the user. As mentioned, generated set of characters 360 can be displayed at or near the key corresponding to the subsequent candidate input characters (for example, under the respective A, E, H, and O keys of the virtual keyboard 320). Indeed, slightly shifting the display location of the generated set of characters can address overcrowding of subsequent candidate input characters, effectively permitting more set of characters to be displayed.

In the example shown in FIG. 3B, "P" is received as input and a predictor generates several set of characters 360, which are displayed at keys corresponding to each generated set of characters' subsequent candidate input character. As shown in FIG. 3B, "People" is placed at the "E" key because the next letter after "P" of "People" is "E"; "Paul" will be place at the "A" key because the next letter after "P" of "Paul" is "A"; "Phone" will be placed at the "H" key because the next letter after "P" of "Phone" is "H"; and so on. It should be noted that any of the letters in the set of characters can be upper case or lower case.

Figure 3C:
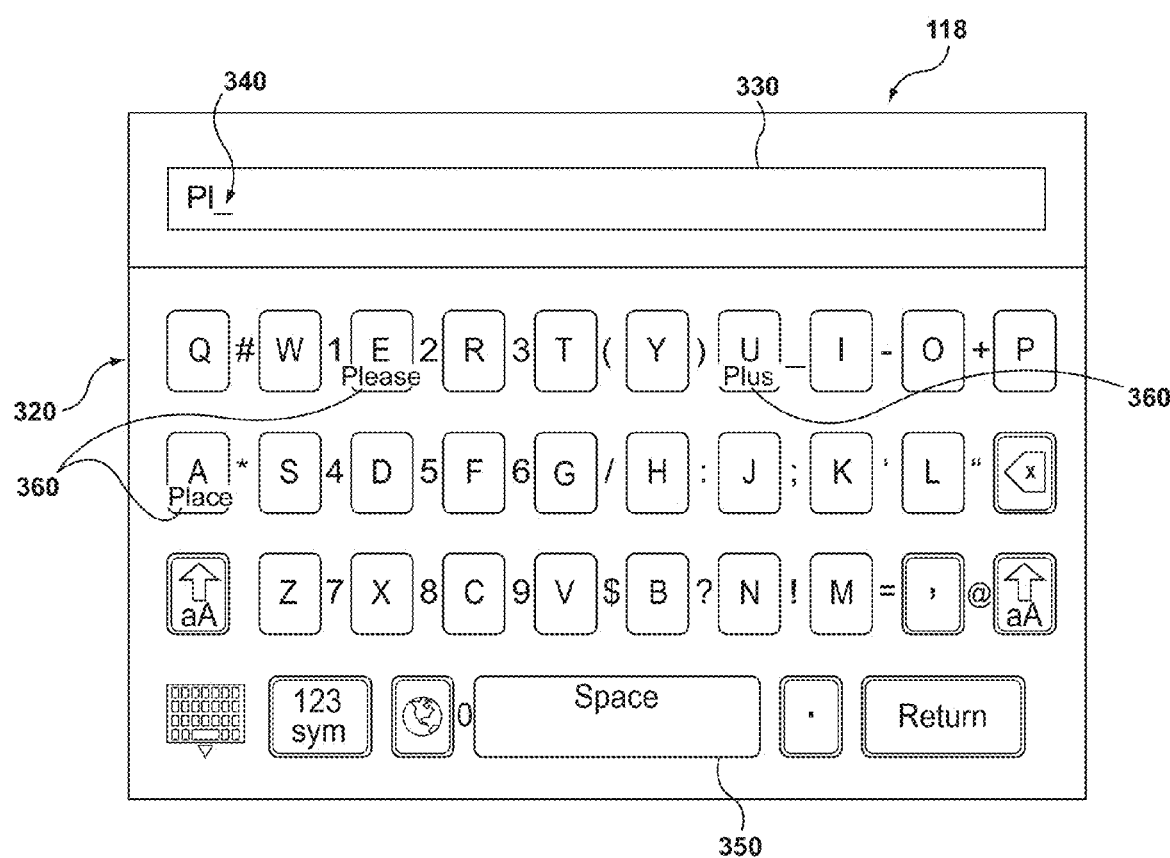

In the embodiment shown in FIG. 3C, "L" is next input received by touchscreen, and a predictor determines several generated set of characters 360, which are displayed at a key corresponding to subsequent candidate input characters (for example, under the respective A, E, and U keys of the virtual keyboard 320), for the current position of cursor 340, which is in the third character position, as shown in input field 330. In another embodiment, a generated set of characters 360 can be presented such as to include the subsequent candidate input character. For example, the set of characters "Please" can be displayed so that the characters "Pl" are displayed before the "E" character on the "E" key, and the characters "ase" can be placed after the "E" character on the "E" key. Further, in this or other embodiments, the displayed "E" can be presented in a manner that differs from the "Pl" and "ase", thereby enabling the user to still recognize it as the "E" key while also making it readily visible so that the user can either input the generated set of characters "Please" or input the character "E". The "E" can be capitalized or in lowercase. In other embodiments, an affix can be displayed at the key. Using the example of the set of characters "Please" above, the "ase" could be displayed at the "E" key so the set of characters fragment "-ease" or "-Ease" would appear.

If the user inputs a generated set of characters, that set of characters is placed in input field 330. This can be seen in FIG. 3D, where the user has inputted generated set of characters "Please," resulting in its placement in the input field. A space is inserted after the set of characters if the user wants to input a new set of characters. A user could input a generated set of characters in various ways, including in a way that differs from a manner of inputting a character key. For example, to input a generated set of characters, a user could use a finger or stylus to swipe the generated set of characters. As used herein, swiping includes swiping the set of characters itself or swiping or touching near the set of characters. For the latter embodiment, the device can detect a swipe or touch near a set of characters, be it a generated set of characters or a predicted set of characters (to be described below), and through the use of a predictor, determine the set of characters the user intended to input. In another embodiment, the user could press a key for a predetermined period of time, such as a long press. That key can be, for example, the key corresponding to the subsequent candidate input character of the set of characters. So, if the set of characters "Please" is intended to be inputted instead of "E", the electronic device 100 can be configured to require that the "E" key be pressed for a predetermined period of time to trigger the input of "Please".

Figure 3D:
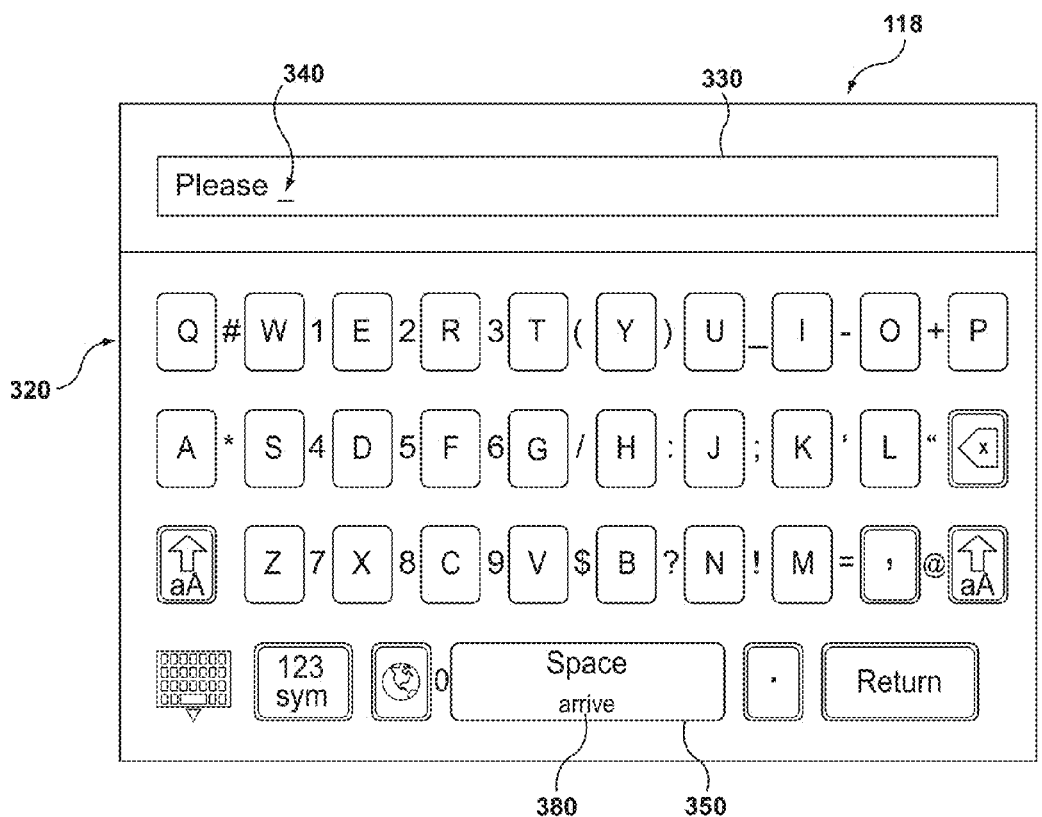

After a generated set of characters 360 has been determined, as shown in FIG. 3D, a predicted set of characters 380 can be displayed, shown here at space key 350. Predicted set of characters 380 can differ from generated set of characters 360 (as shown in FIGS. 3A-3C) and is the system's attempt to predict the next set of characters a user might be contemplating. A predictor is used to determine predicted set of characters 380. As with displayed generated set of characters 360, predicted set of characters 380 can be received as input in any number of ways, including receiving a swiping of the predicted set of characters with a finger or stylus or receiving a pressing of a key (such as the space key or another designated key) for a predetermined period of time (long press).

Figure 4A:
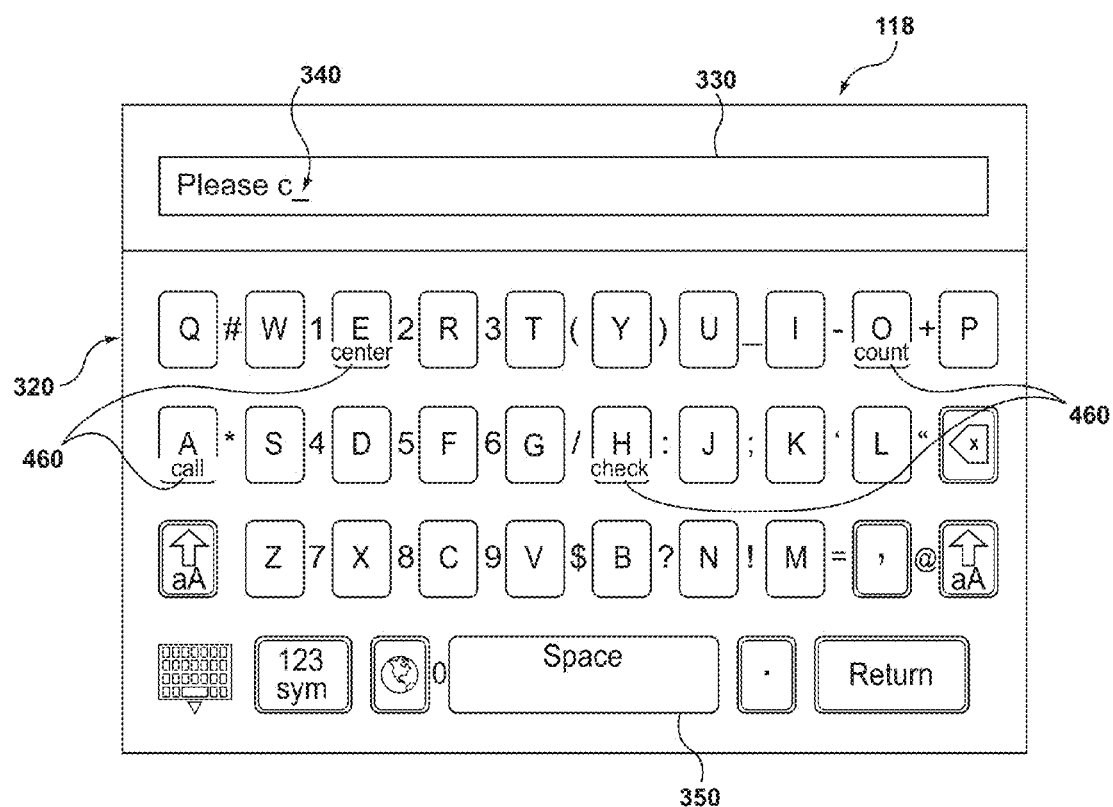
FIGS. 4A and 4B show example front views of a touchscreen, consistent with embodiments disclosed herein.
Figure 4B:
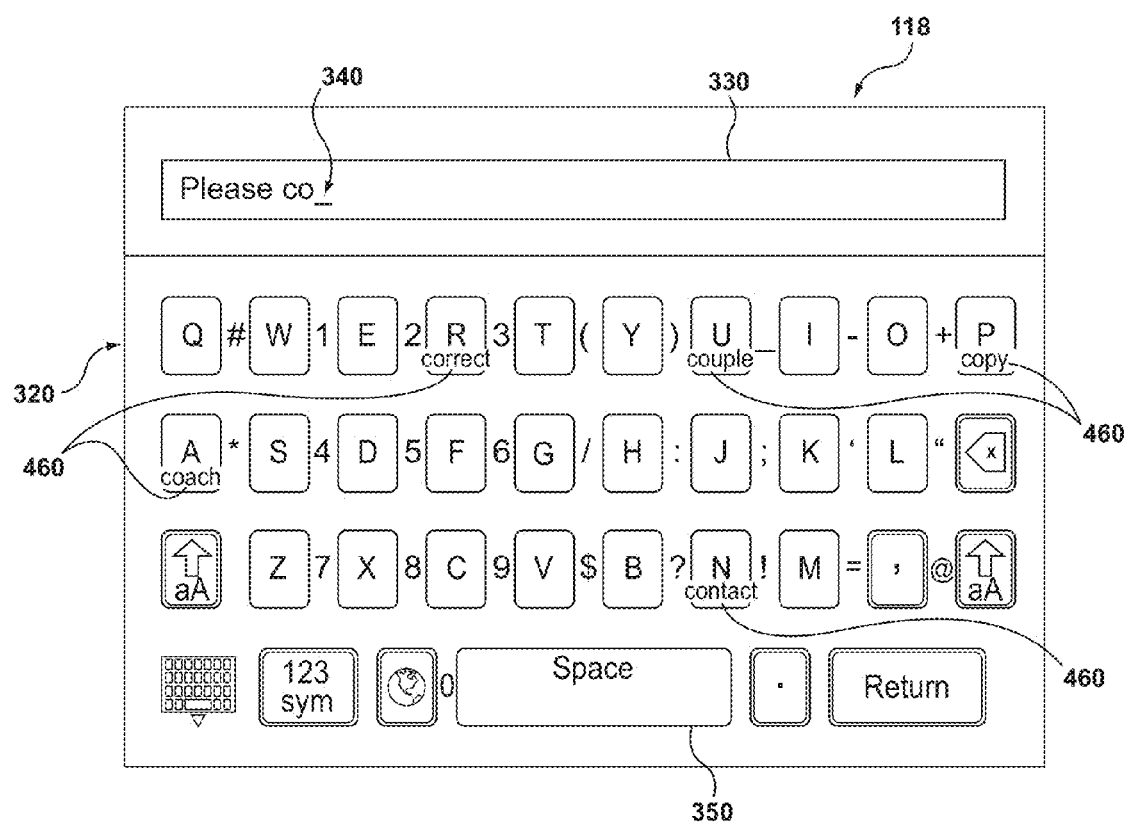

In FIG. 4A, electronic device 100 receives "C" as input from virtual keyboard 320. Again, a predictor determines generated set of characters 460 based in part on the received input. In FIG. 4B, electronic device 100 receives "O" as input from the virtual keyboard and outputs the "O" in input field 330. As shown in FIG. 4A, the set of characters "count" was displayed at the "O" key after the input of the "C" character was received. Since the "O" key was pressed in a manner to only input the "O" character, as shown in FIG. 4B, an "O" is displayed as second character of the currently inputted set of characters, and the set of characters "count" is not inputted by the user. Alternatively, if a user wanted to input the generated set of characters "count," the user can input the "O" key in FIG. 4A in a manner different from a manner of inputting the "O" key, such as by swiping the set of characters "count" or by a long press on the "O" key, as opposed to tapping. Returning to FIG. 4B, after the "O" is inputted, generated set of characters 460 are displayed at the keys corresponding to subsequent candidate input characters, as shown in FIG. 4B.

Figure 5:
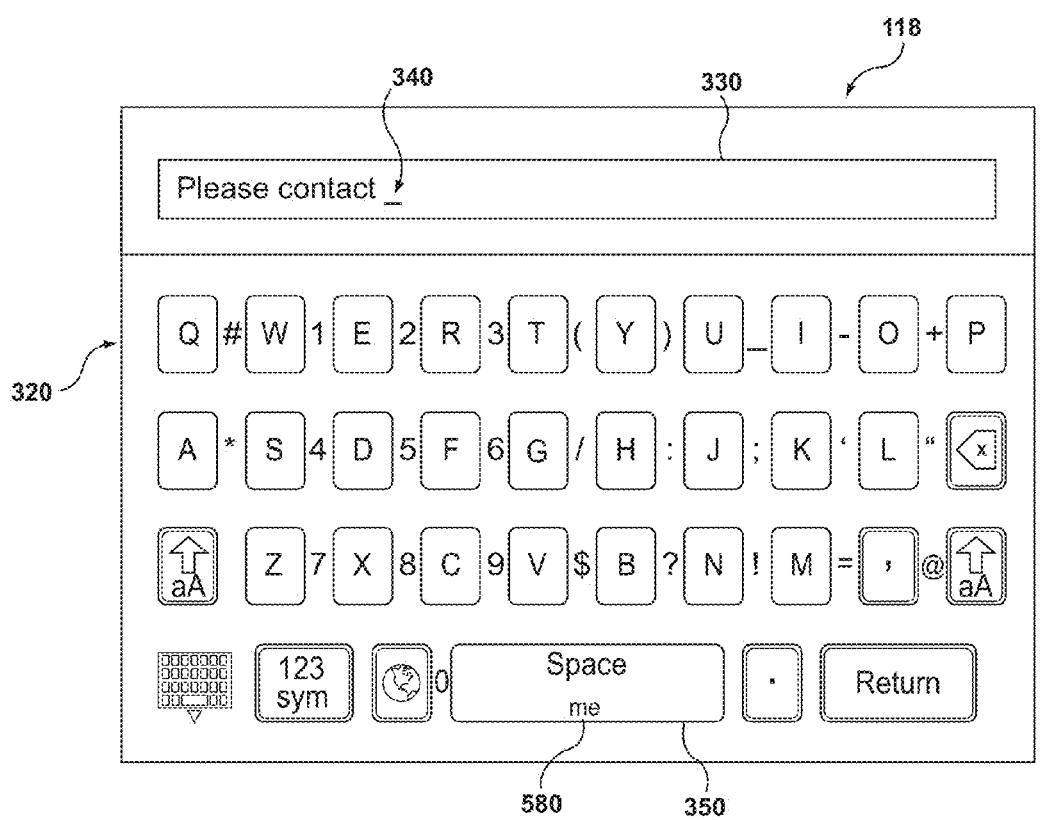
FIG. 5 shows an example front view of a touchscreen, consistent with embodiments disclosed herein.

FIG. 5 shows input field 330 displaying the set of characters "contact" followed by a space. In that instance, the user inputted the generated set of characters "contact" 460 as was shown in FIG. 4B at the "N" key. Referring back to FIG. 5, a <SPACE> character is now automatically inserted after the generated word in the input field. Predicted word "me" 580 is now displayed on space key 350.

Figure 6A:
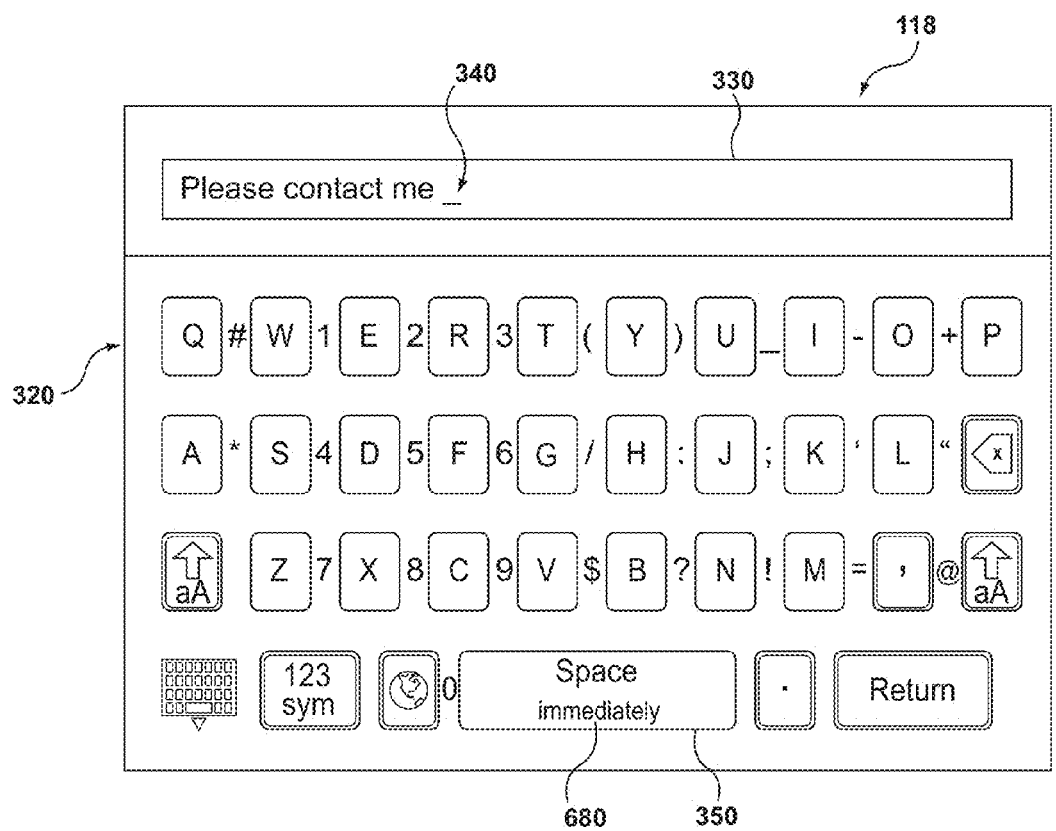
FIGS. 6A, 6B, and 6C show example front views of a touchscreen, consistent with embodiments disclosed herein.

If the predicted word "me" 580 is received as input, the word "me" 580 is then displayed in input field 330 followed by a space as shown in FIG. 6A, which then shows predicted word 680 "immediately" displayed on space key 350. The predicted word is presented after a completed word and space have been displayed in input field 330.

Figure 6B:
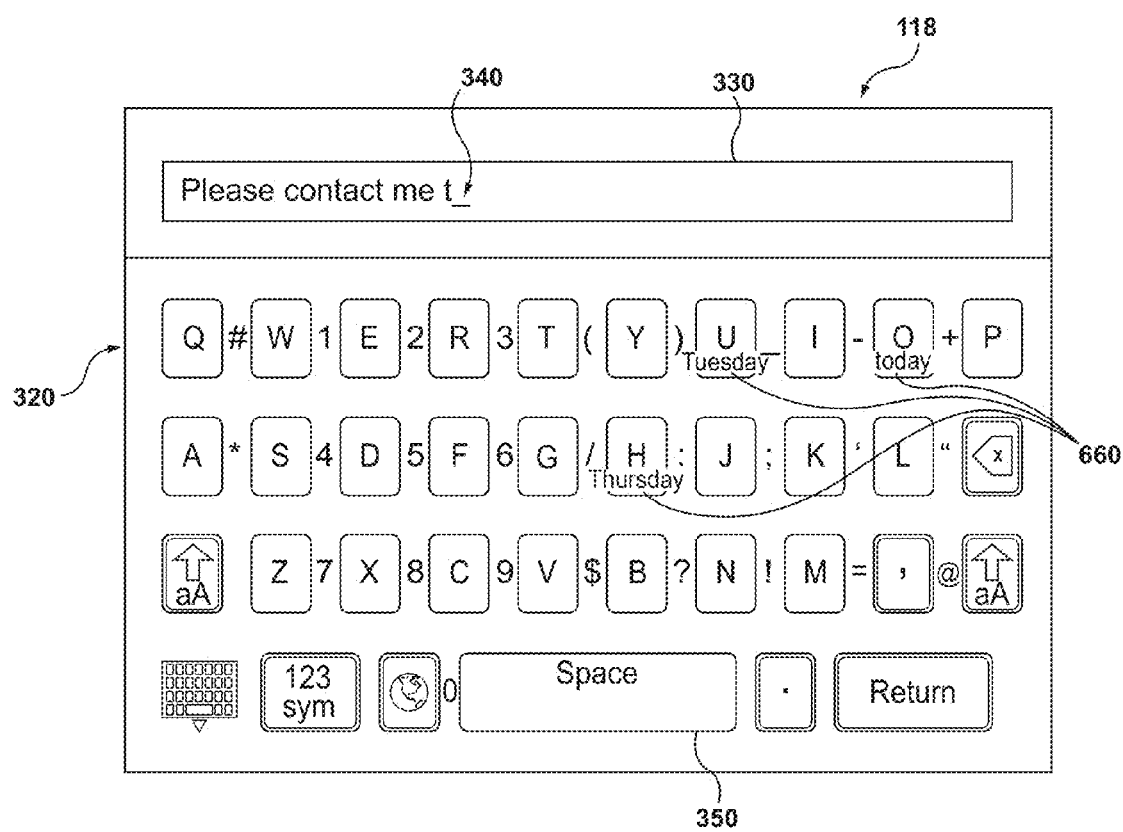
Figure 6C:
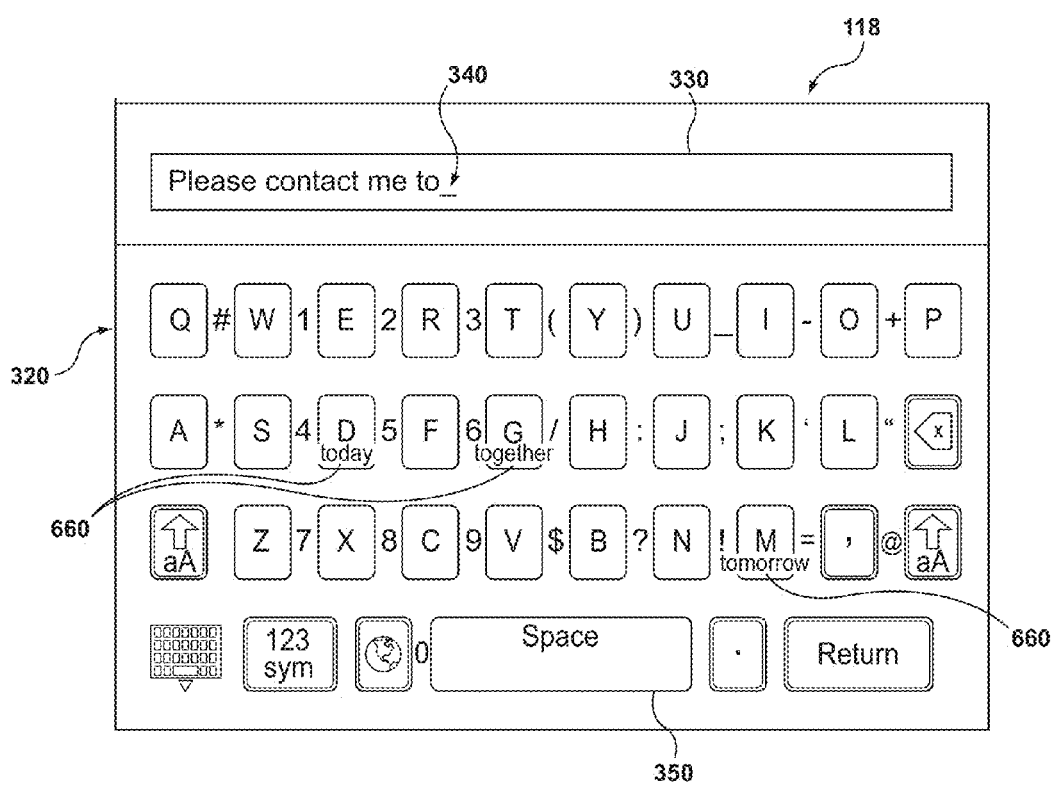

FIG. 6B shows an example where touchscreen 118 has received the "T" character as input after the user has pressed the "T" key. In this scenario, touchscreen 118 displays a "t" in input field 330. Generated set of characters 660 (for example, "Tuesday," "today," and "Thursday") are displayed at the keys of the subsequent candidate input characters. FIG. 6C shows an example where electronic device 100 has received the "o" character as input after the user presses the "O" key instead of inputting generated set of characters 660 "today" as was shown in FIG. 6B. Thus, "o" is now displayed in input field 330.

Figure 7:
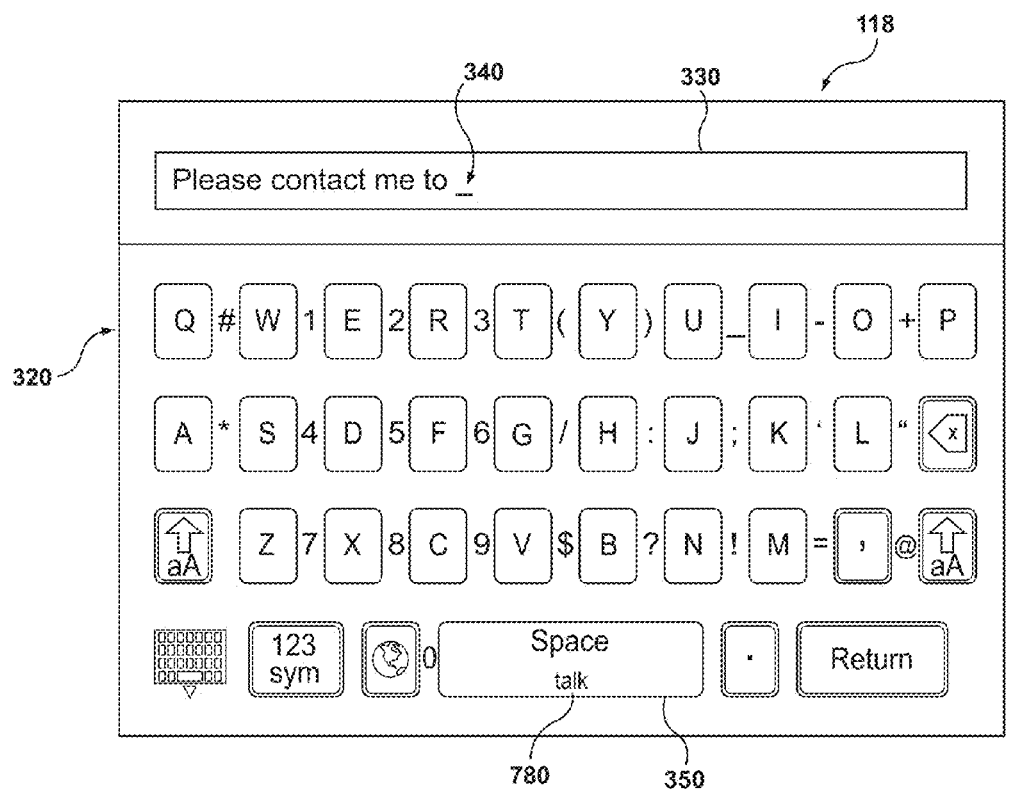
FIG. 7 shows an example front view of a touchscreen, consistent with embodiments disclosed herein.

FIG. 7 shows an example where touchscreen 118 has received the <SPACE> character as input after the user selects the space key. In this scenario, touchscreen 118 inserts a <SPACE> character, and then displays predicted set of characters "talk" 780 at space key 350.

Figure 8A:
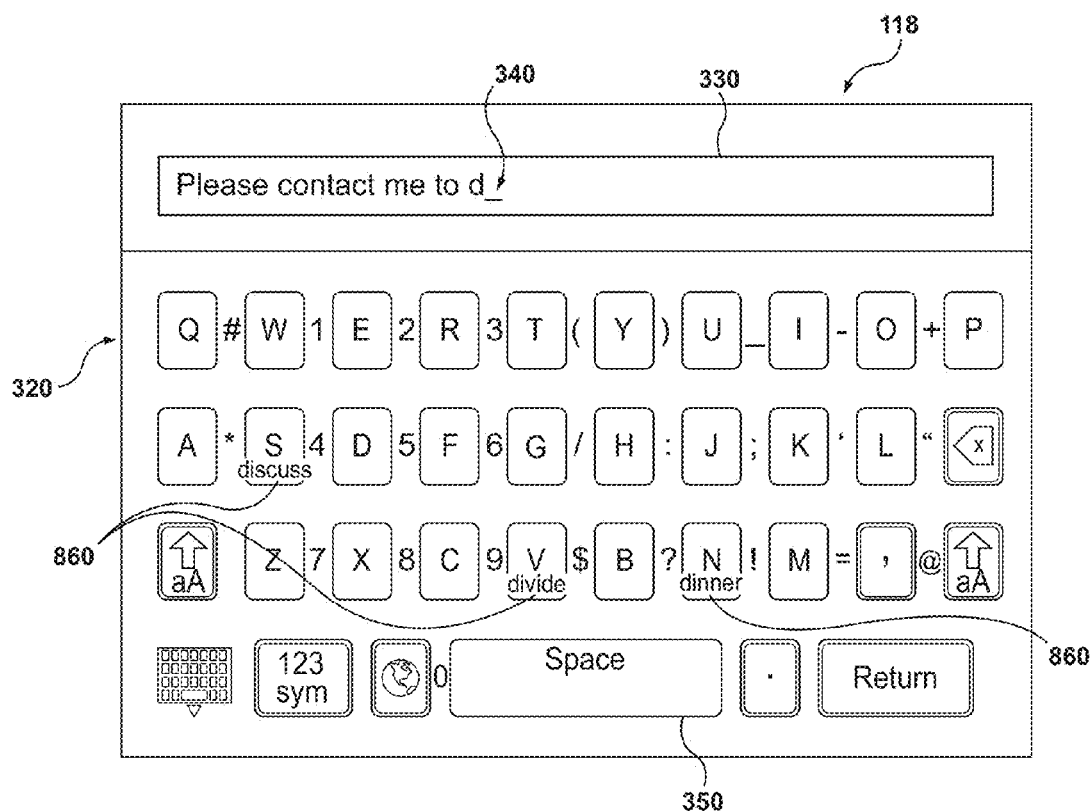
FIGS. 8A and 8B show example front views of a touchscreen, consistent with embodiments disclosed herein.

FIG. 8A shows an example where touchscreen 118 has received the "d" character as input after the user presses the "D" key. In this scenario, touchscreen 118 displays a "d" in the input field 330 and displays generated set of characters "discuss," "divide," and "dinner" 860 on keys corresponding to subsequent candidate input characters. In this example embodiment, while the character "I" was never received as input, electronic device 100 determined that generated set of characters "discuss," "divide," and "dinner" 860 were the set of characters to be displayed on touchscreen. In this embodiment, because each of these set of characters has "i" as its second letter, touchscreen 118 displayed generated set of characters using a further subsequent letter in the set of characters (for example, "discuss" under the "S" key, "divide" under the "V" key, and "dinner" under the "N" key). In other embodiments, generated set of characters "discuss," "divide," and "dinner" 860 can be displayed at or near the "I" key.

Figure 8B:
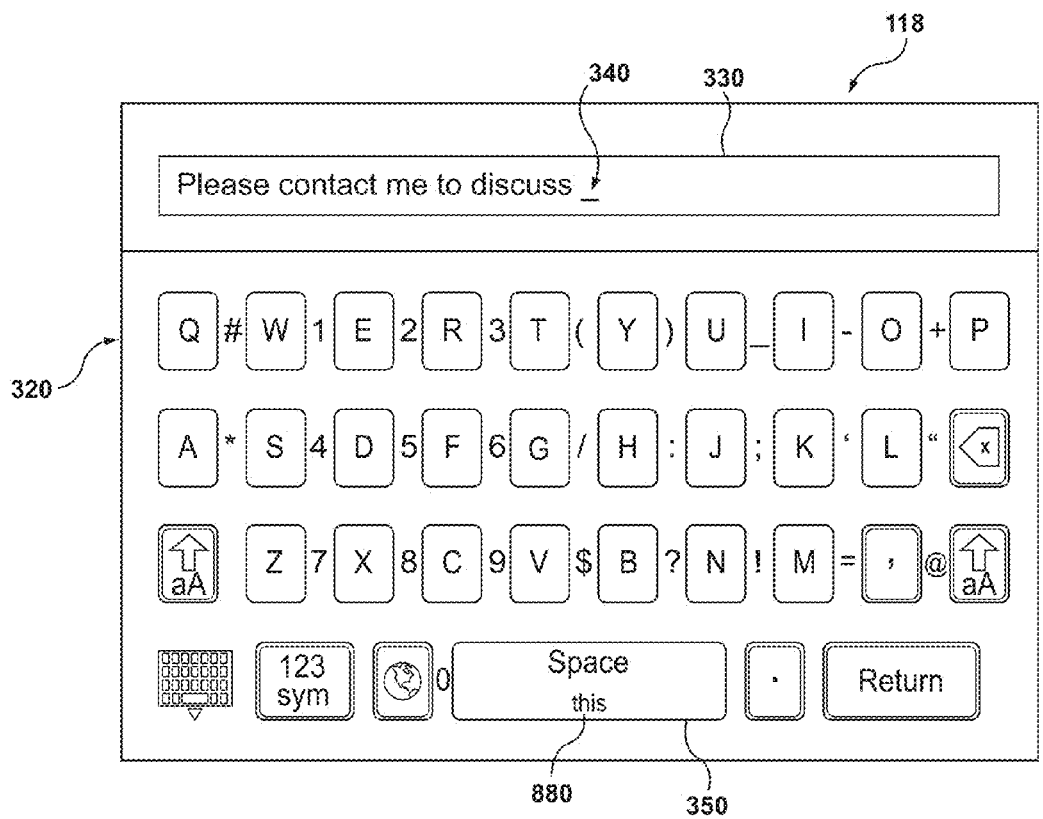

FIG. 8B shows an example where touchscreen 118 has received the set of characters "discuss" as input after the user chooses generated set of characters "discuss" 860. In this example, touchscreen 118 displays predicted set of characters "this" 880 at space key 350.

Figure 9:
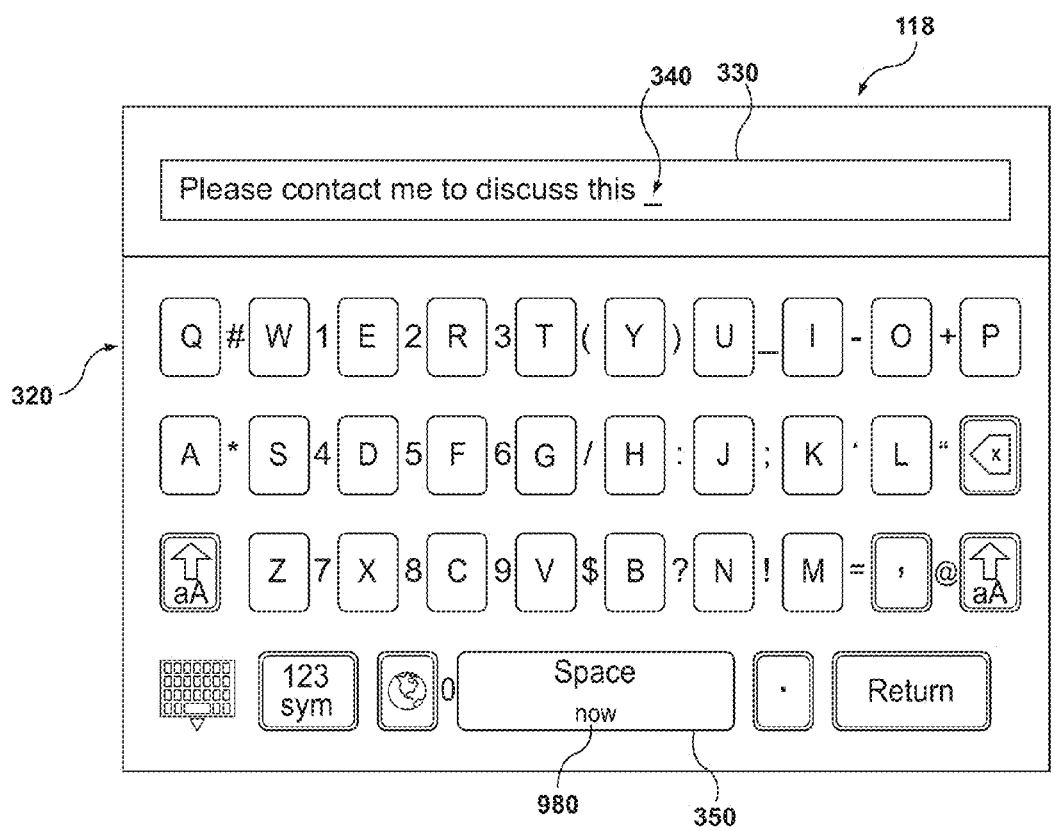
FIG. 9 shows an example front view of a touchscreen, consistent with embodiments disclosed herein.

FIG. 9 shows an example where touchscreen 118 receives the "this" set of characters as input after user selects "this" as a desired predicted set of characters 880. In this example, touchscreen 118 displays predicted set of characters "now" 980 at space key 350.

Touchscreen 118 can also receive punctuation as input at any time during the typing of a message. If a user decides to use punctuation after inputting either a generated set of characters or a predicted set of characters, the <SPACE> character (for example, the <SPACE> character prior to cursor 940 of FIG. 9) is deleted and the inputted punctuation is inserted.

Figure 10A:
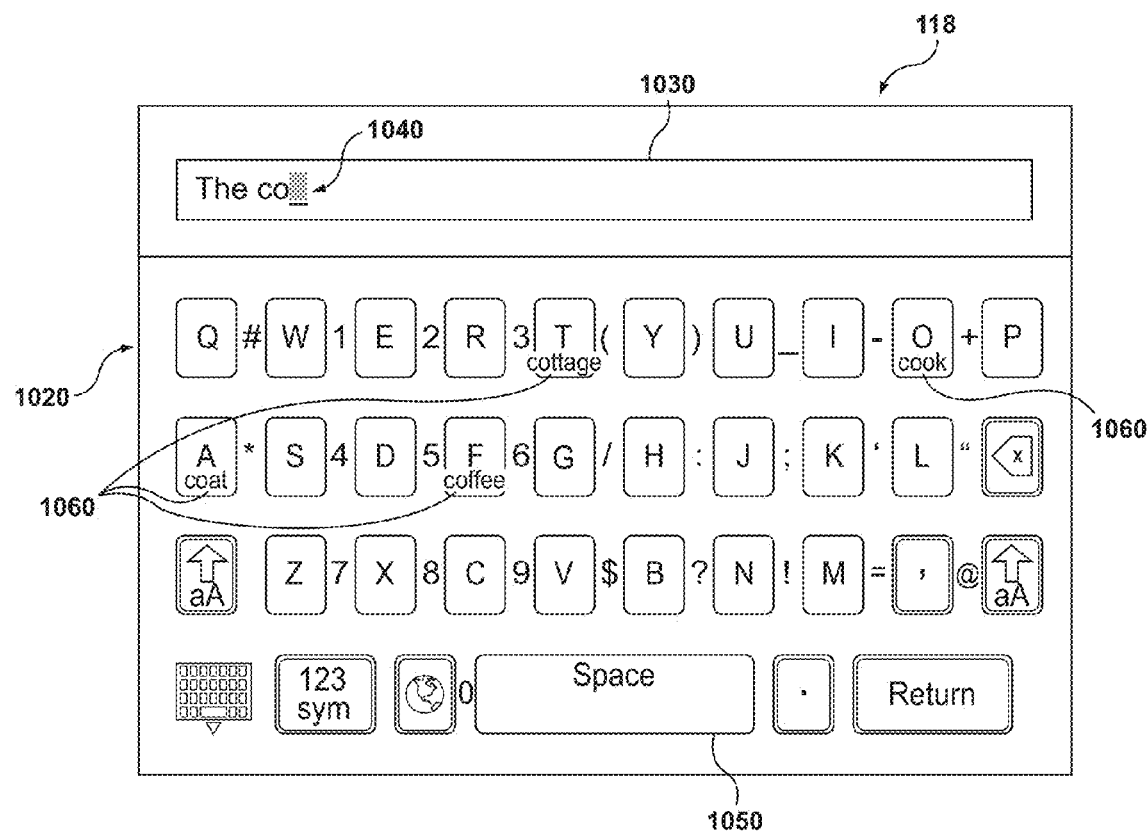
FIGS. 10A and 10B show example front views of a touchscreen, consistent with embodiments disclosed herein.
Figure 10B:
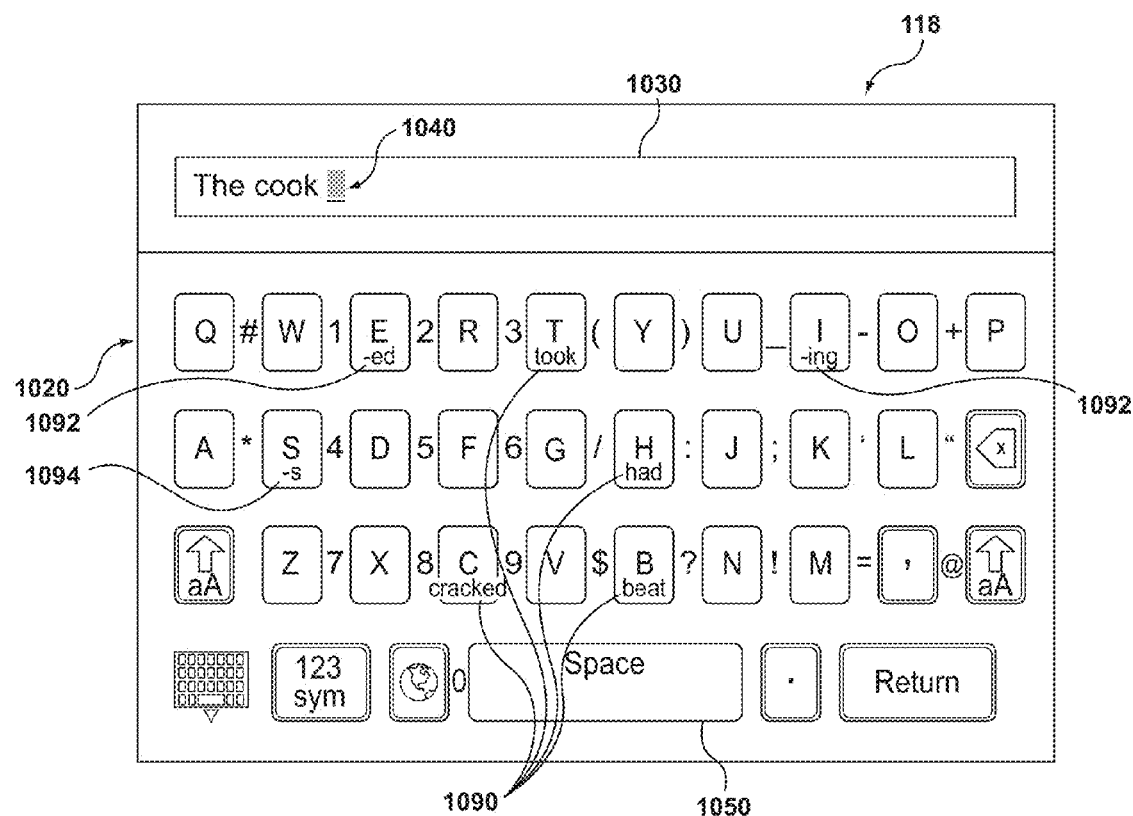

FIGS. 10A and 10B show example front views of a touchscreen, consistent with embodiments disclosed herein. FIG. 10A shows an example where touchscreen 118 displays "The co" in a text bar 1030 and several generated set of characters 1060 are displayed at subsequent candidate input characters. In this example, touchscreen 118 displays generated set of characters "cottage" 1060 under the "T" key, generated set of characters "cook" 1060 under the "O" key, generated set of characters "coat" 1060 under the "A" key, and generated set of characters "coffee" 1060 under the "F" key.

FIG. 10B shows an example where touchscreen 118 receives the set of characters "cook" as input after the user has selected the generated set of characters 1060 "cook." The set of characters "cook" is inserted into input field 1030 along with a <SPACE> character. In this example, set of characters include new predicted set of characters (such as words 1090, affixes 1092 (for example, "-ed" under the "E" key and "-ing" under the "I" key), and plurals 1094 (for example, "-s" under the "S" key)), all of which are displayed at subsequent candidate input characters. Each predicted word 1090, affix 1092, or plural 1094 is located on respective subsequent candidate input characters that match the first letter of the predicted word 1090, affix 1092, or plural 1094. Now the user has the added option of inputting a predicted set of characters 1090, 1092, and 1094. Input is made in the same manner as described above. In some embodiments, when touchscreen 118 receives either affix 1092 or plural 1094 as an input, the <SPACE> character between cursor 1040 and "cook" is deleted and the corresponding inputted affix or plural is added to the end of "cook."

Figure 11A:
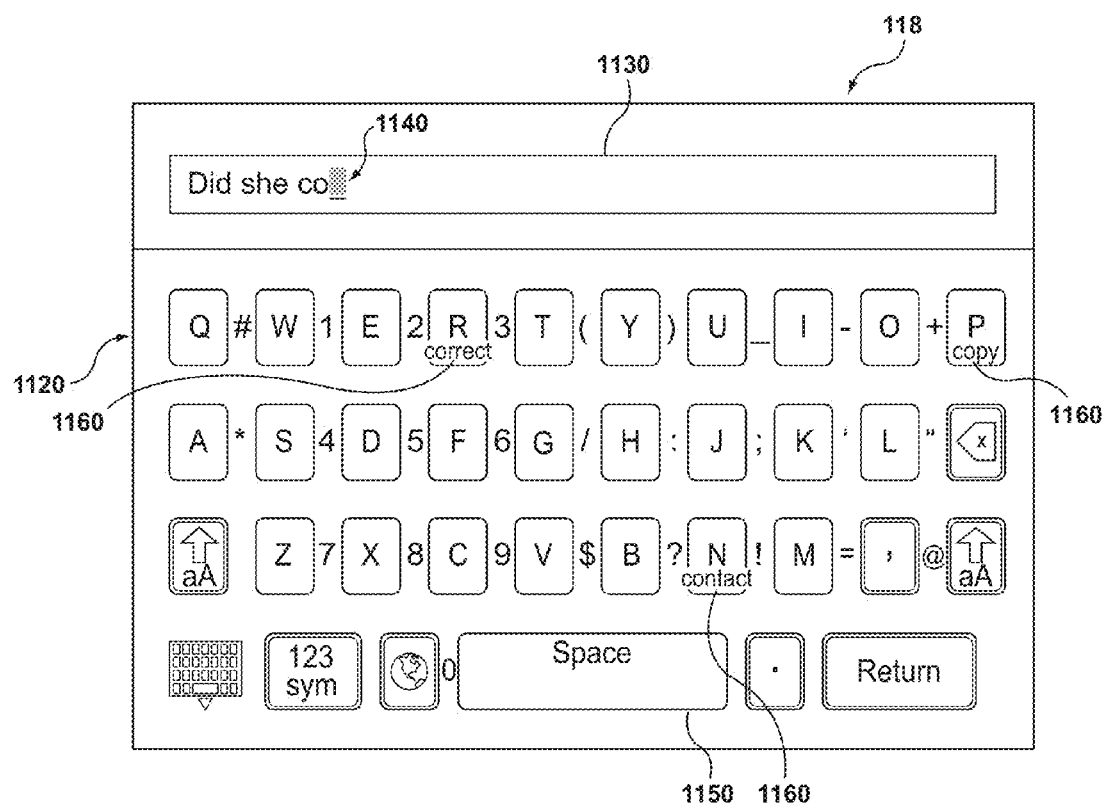
FIGS. 11A and 11B show example front views of a touchscreen, consistent with embodiments disclosed herein.

FIG. 11A shows an example where touchscreen 118 displays "Did she co" in a text bar 1130 and several generated set of characters 1160 are displayed at subsequent candidate input characters. In this example, touchscreen 118 displays generated set of characters "correct" 1160 under the "R" key, generated set of characters "copy" 1160 under the "P" key, and generated set of characters "contact" 1160 under the "N" key. While "co" is provided in the text bars of both FIG. 10A and FIG. 11A, touchscreen displays different generated set of characters based on the context of the characters in their respective text bars 1030 and 1130. For example, in FIG. 10A, the characters "co" follows "The," which implies that a noun beginning with "co" should follow. In FIG. 11A, the characters "co" follow a pronoun, which implies that a verb beginning with "co" should follow. As stated above, contextual data can be used to determine when certain set of characters are more appropriate based on, for example, the set of characters in a text bar or previous actions by a user.

Figure 11B:
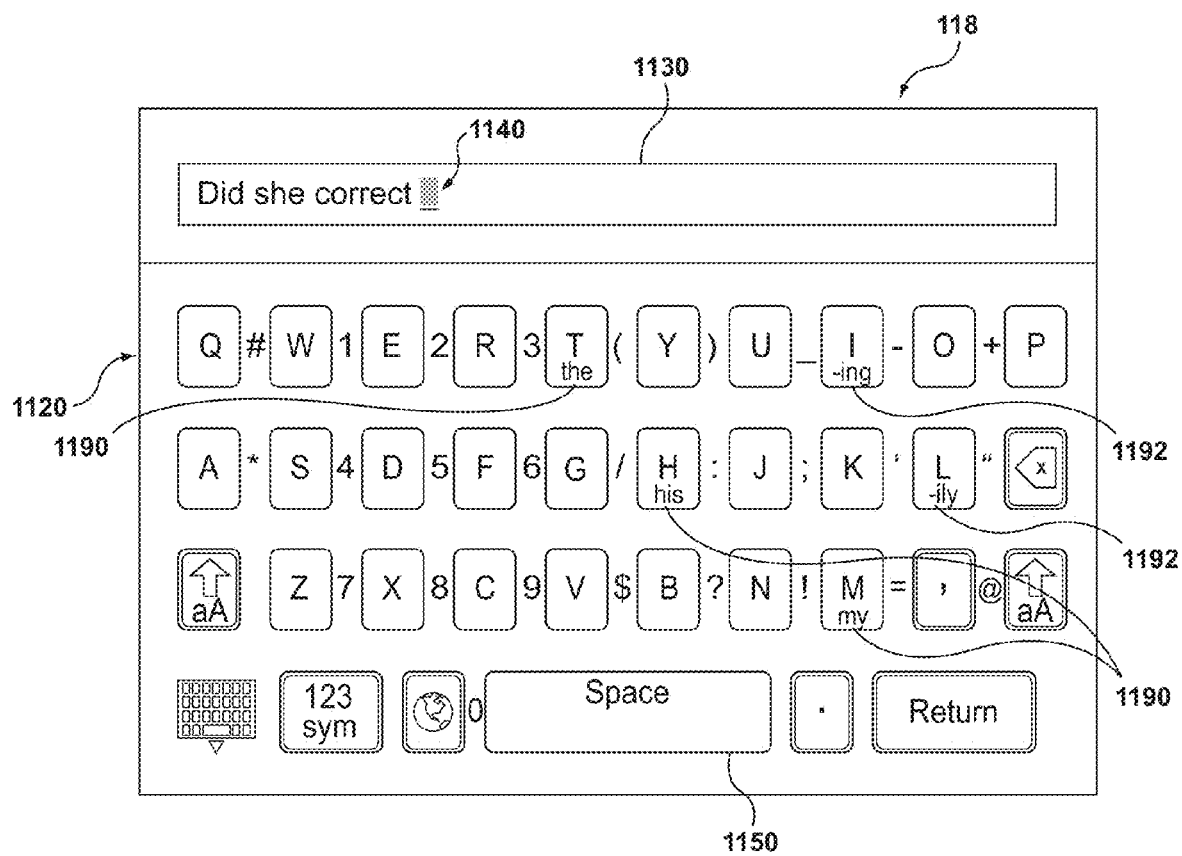

FIG. 11B shows an example where touchscreen 118 receives the set of characters "correct" as input after the user has selected the generated set of characters "correct" 1160. In this example, the set of characters "correct" is inserted in input field 1130 and a <SPACE> character is also inserted. Predicted set of characters (such as words 1190 and affixes 1192) are now displayed at subsequent candidate input characters. In this example, while affixes "-ing" and "-ily" both correspond to the "I" key, touchscreen 118 displays "-ing" with the "I" key and "-ily" with the "L" key. As stated above, the predicted affix may be assigned to a certain key based on a ranking, on contextual data, or a combination of both. In this embodiment, the "-ing" affix may have had a higher ranking than the "-ily" affix and was thus assigned to the "I" key. Accordingly, the "-ily" affix was assigned to the "L" key based on the corresponding "L" character being in the "-ily" affix.

Figure 12A:
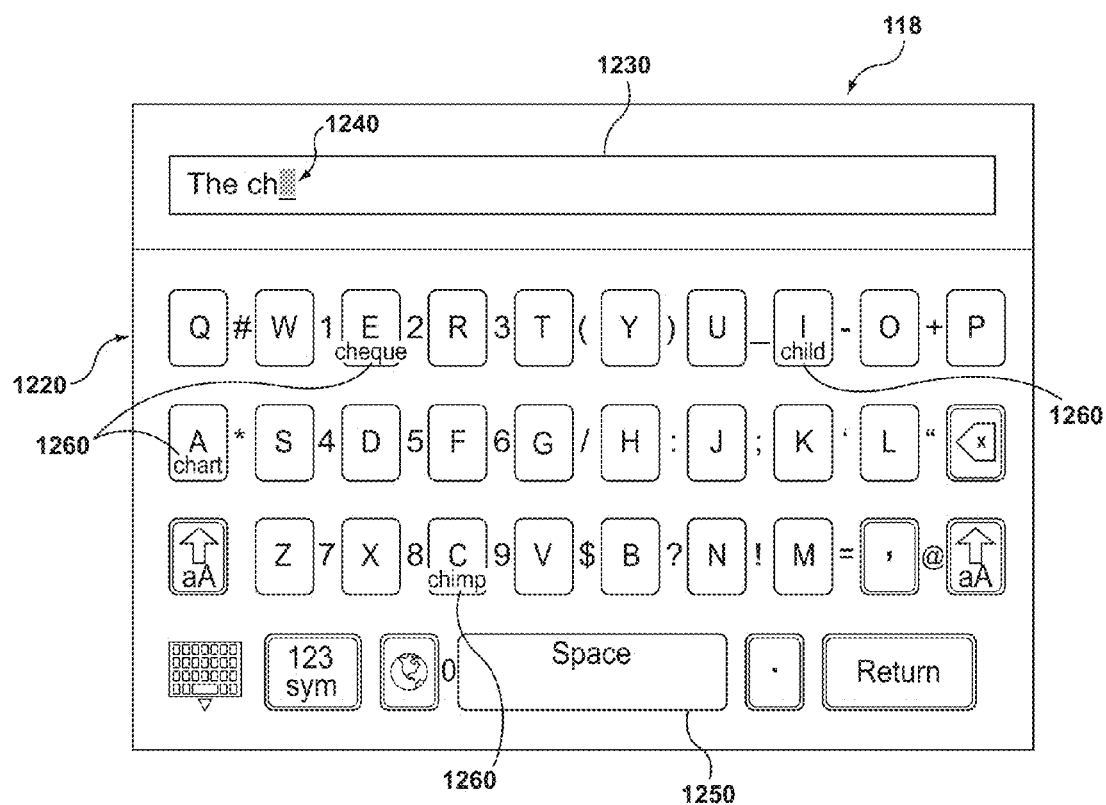
FIGS. 12A and 12B show example front views of a touchscreen, consistent with embodiments disclosed herein.

FIG. 12A shows an example where touchscreen 118 displays "The ch" in a text bar 1230 and several generated set of characters 1260 are displayed at subsequent candidate input characters. In this example, generated set of characters 1260 include both "child" and "chimp." In this embodiment, while the third letter in both "child" and "chimp" are the same, touchscreen displays "child" under the "I" key and displays "chimp" under the "C" key. The determination on which generated set of characters goes under which candidate input key CaO be based on a ranking (as specified above). As illustrated in this embodiment, touchscreen 118 can display a generated set of characters (in this case, "chimp") on a key even though that key may not be associated with any subsequent characters of the characters in text bar 1230.

Figure 12B:
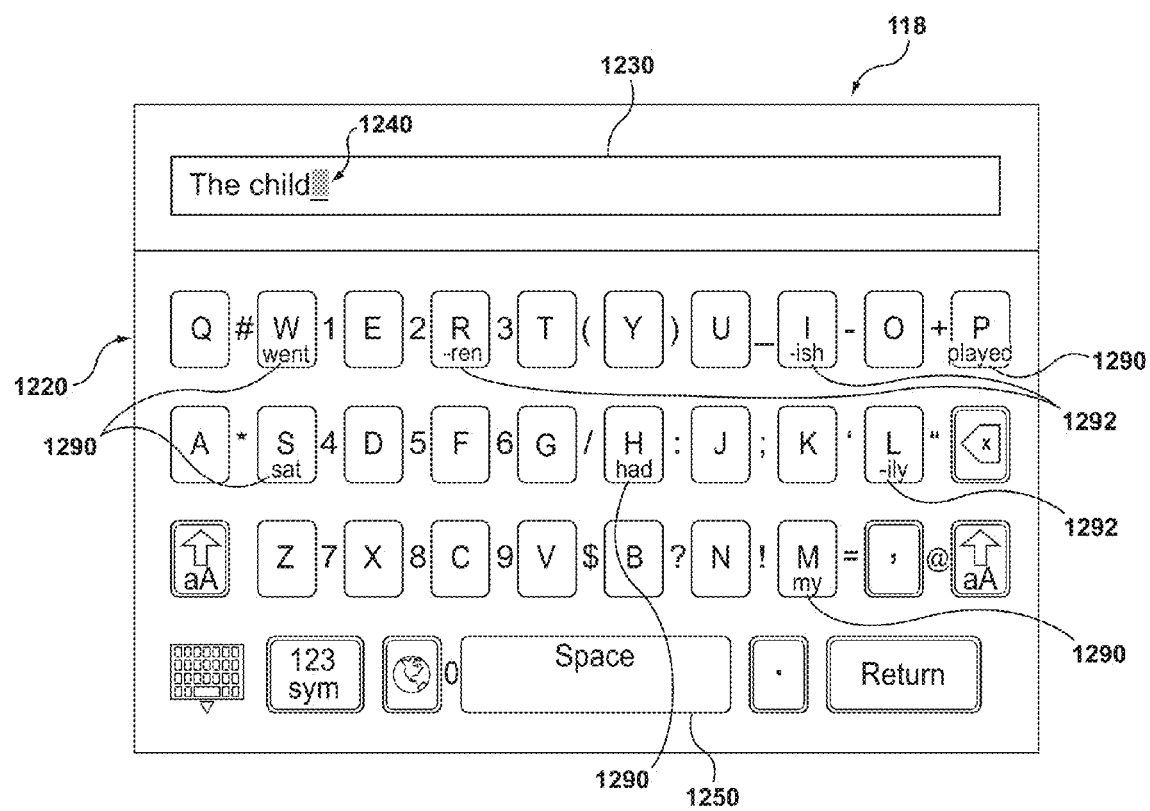

FIG. 12B shows an example where touchscreen 118 receives the set of characters "child" as input after the user has selected the generated set of characters "child" 1260. The set of characters "child" is inserted in input field 1230 and, in this example, a <SPACE> character is not inserted. Predicted set of characters (such as words 1290 and affixes 1292) are now displayed at subsequent candidate input characters. In this example, while affixes "-ish" and "-ily" both correspond to the "I" key, touchscreen 118 displays "-ish" with the "I" key and "-ily" with the "L" key. As stated above, the predicted affix may be assigned to a certain key based on a ranking, on conventional data, or a combination of both. In this embodiment, the "-ish" affix may have had a higher ranking than the "-ily" affix and was thus assigned to the "I" key. Accordingly, the "-ily" affix was assigned to the "L" key based on the corresponding "L" character being in the "-ily" affix.

Figure 13A:
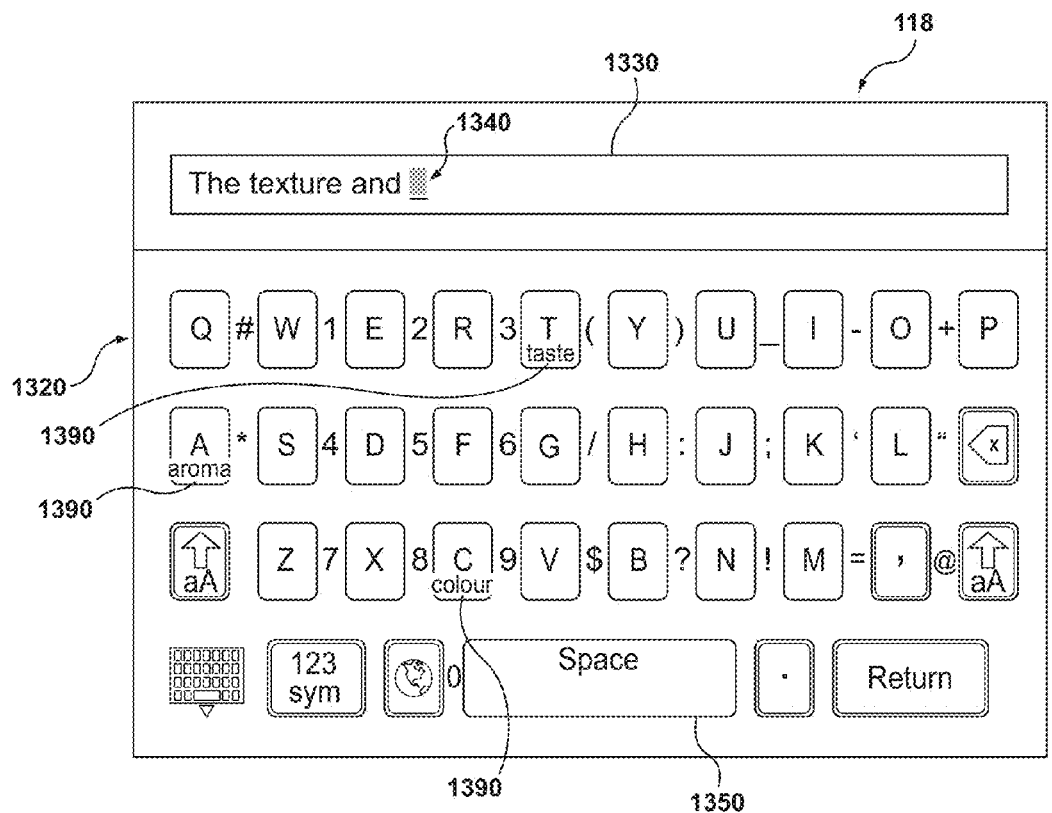
FIGS. 13A and 13B show example front views of a touchscreen, consistent with embodiments disclosed herein.
Figure 13B:
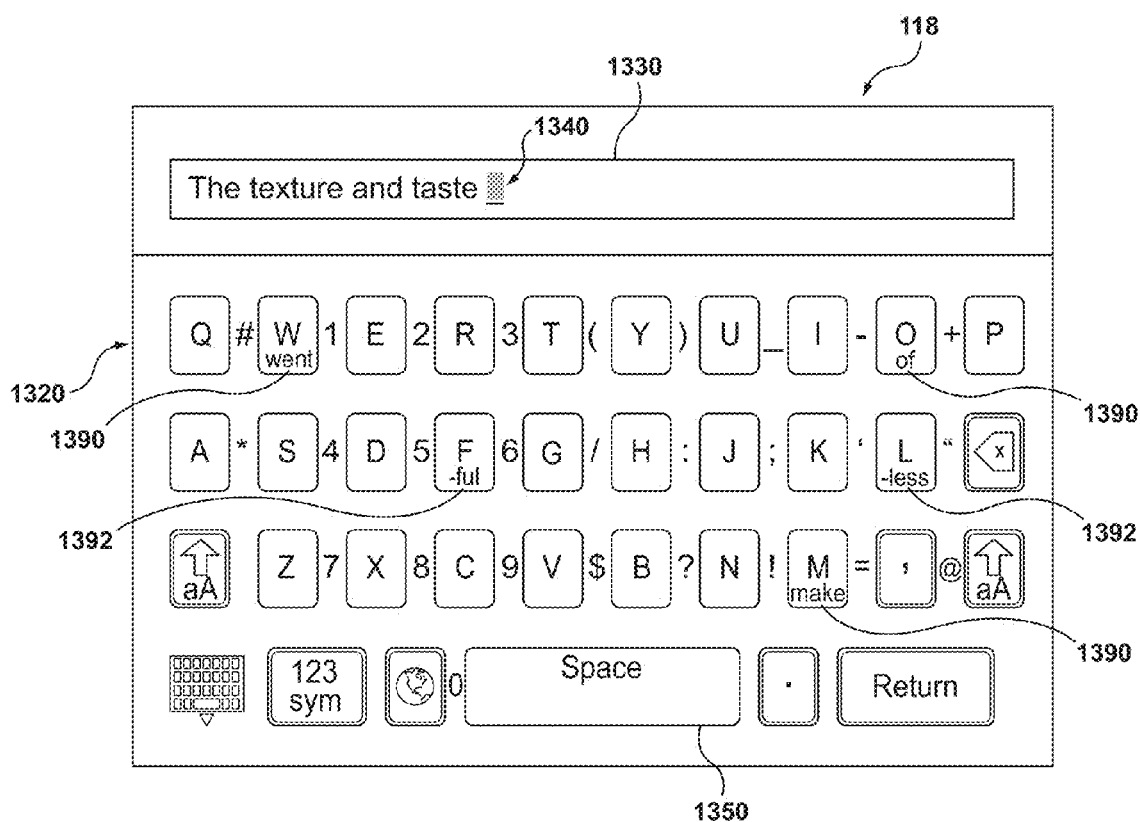

FIG. 13A shows an example where touchscreen 118 displays "The texture and" in a text bar 1330 and several predicted set of characters (for example, words 1390) are displayed at subsequent candidate input characters. FIG. 13B shows an example where touchscreen 118 received the set of characters "taste" as input after the user had selected the predicted set of characters "taste." In this example, a <SPACE> character was inserted after "taste." Consequently, predicted set of characters (such as, words 1390 and affixes 1392) are displayed at subsequent candidate input characters.

Figure 14A:
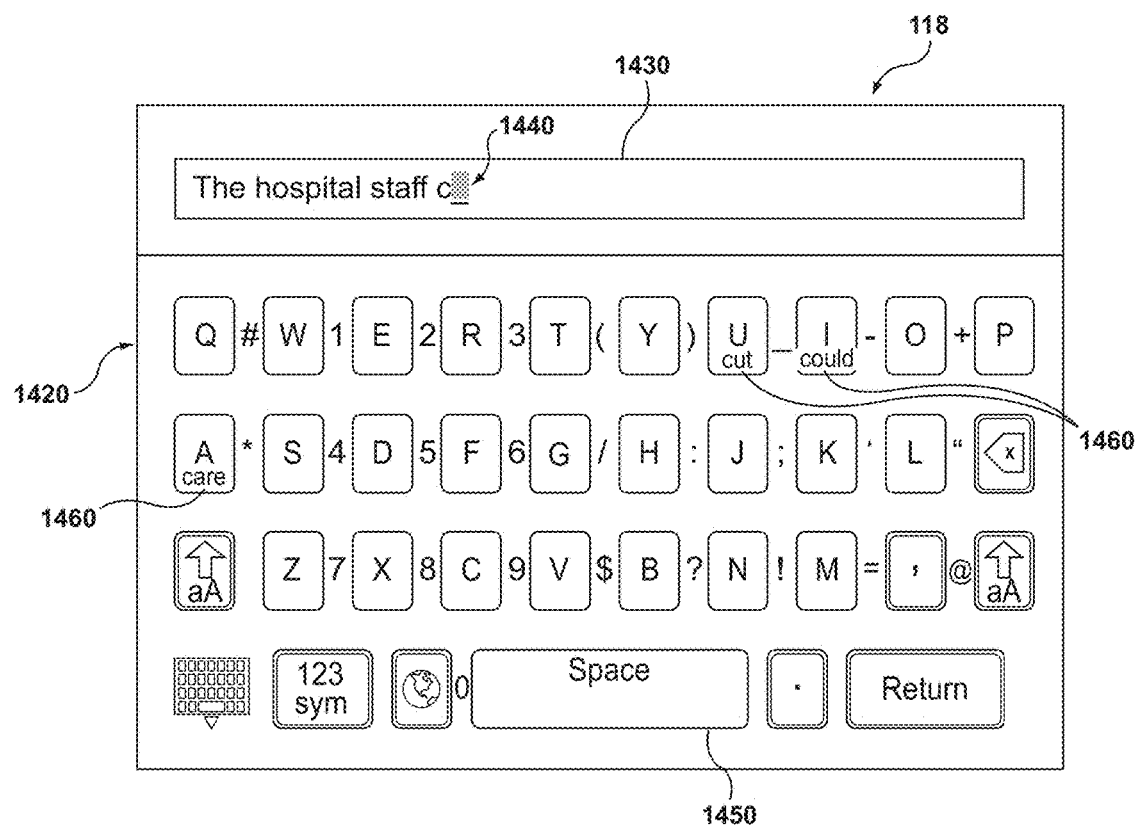
FIGS. 14A, 14B, and 14C show example front views of a touchscreen, consistent with embodiments disclosed herein.
Figure 14B:
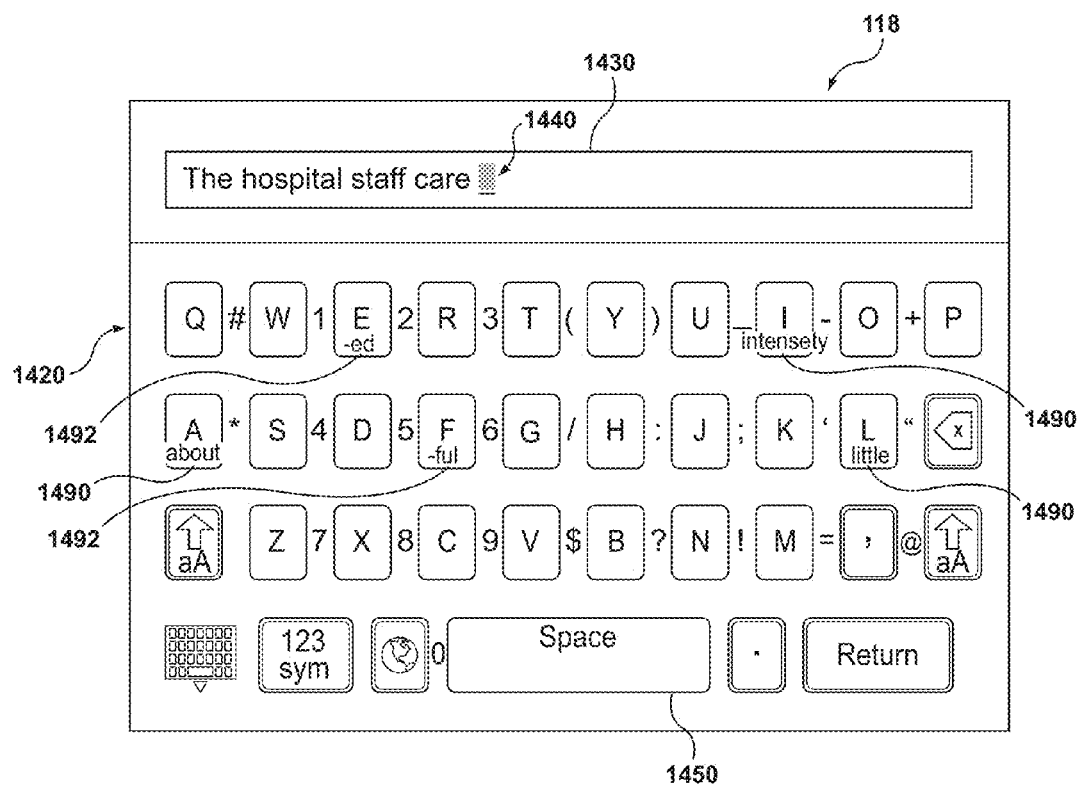
Figure 14C:
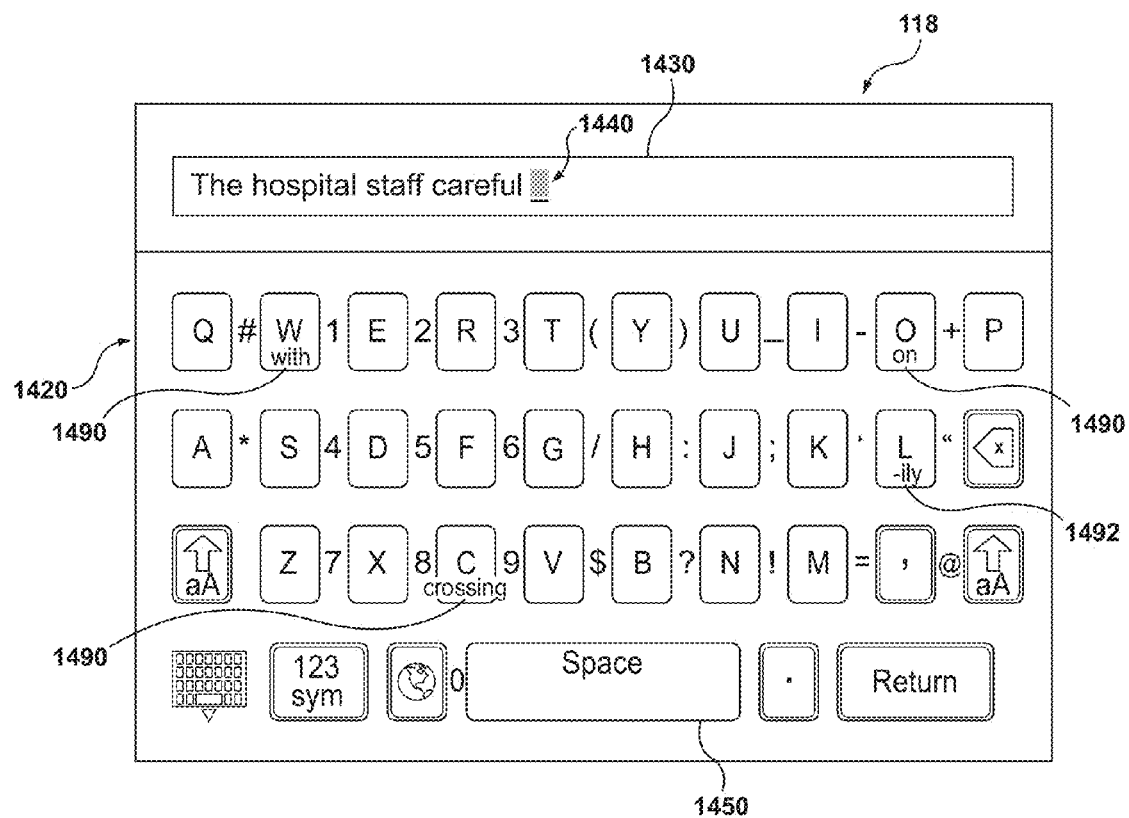

FIG. 14A shows an example where touchscreen 118 displays "The hospital staff c" in a text bar 1430 and several generated set of characters 1460 are displayed at subsequent candidate input characters. FIG. 14B shows an example where touchscreen 118 received the set of characters "care" as input after the user had chosen the generated set of characters "care." Generated set of characters "care" is now placed in input field 1430 along with a <SPACE> and predicted set of characters (such as, words 1490 and affixes 1492) are displayed at subsequent candidate input characters. FIG. 14C shows an example where touchscreen 118 received the affix "-ful" as input (thereby modifying the set of characters "care" to "careful") after the user had chosen the predicted affix "-ful." Thus, the set of characters "careful" is now inserted into input field 1430. Note, in some embodiments, inputting a word or affix can modify the input word or word fragment. For example, if "spicy" was input by a user, and "ness" is a predicted affix and is inputted, "spicy" would change to "spiciness," dropping the "y" and adding "iness". In other embodiments, "happy" could change to "happiness" or "conceive" could change to "conceivable".

Figure 15:
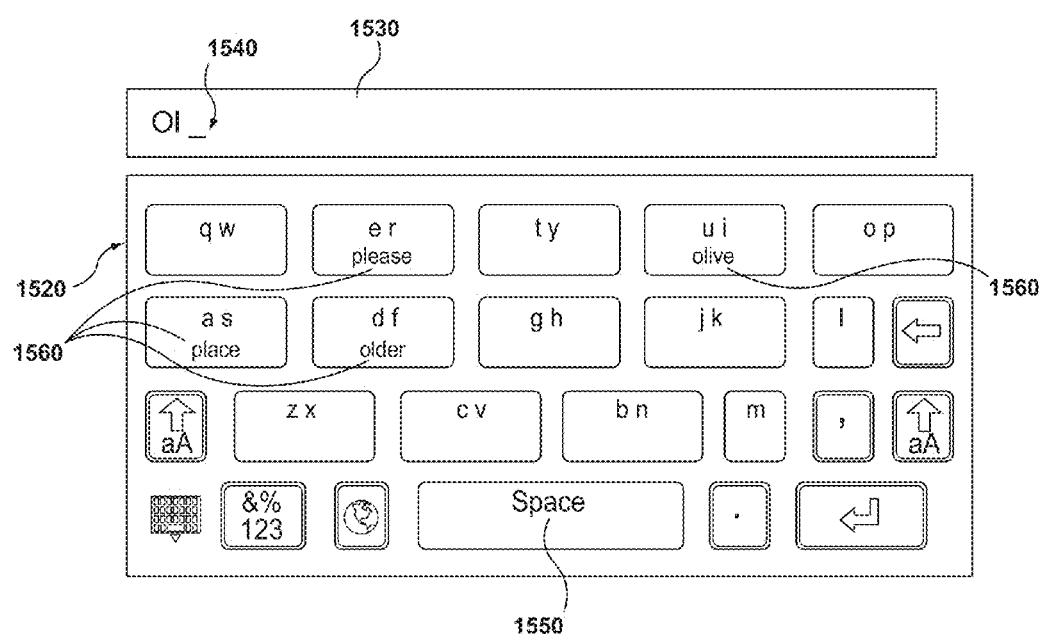
FIG. 15 shows an example front view of a touchscreen, consistent with embodiments disclosed herein.

FIG. 15 shows an example of an ambiguous keyboard 1520, which can have multiple characters assigned to a key (for example, such as a telephone keypad where "A", "B" and "C" are assigned to key 2; "D", "E" and "F" are assigned to key 3, and so on). For example, the characters "Q" and "W" can be assigned one key, and the characters "E" and "R" assigned to another key. In this example, the user has input the characters "Ol" by pressing the "op" key followed by the "L" key. Using a predictor, generated set of characters 1560 are displayed at subsequent candidate input characters. Since the first pressed key can input either an "O" or a "P" and the second pressed key inputs an "L", generated set of characters 1560 will begin with "OL" or "PL", such as shown by generated set of characters 1560 in FIG. 15.

Figure 16:
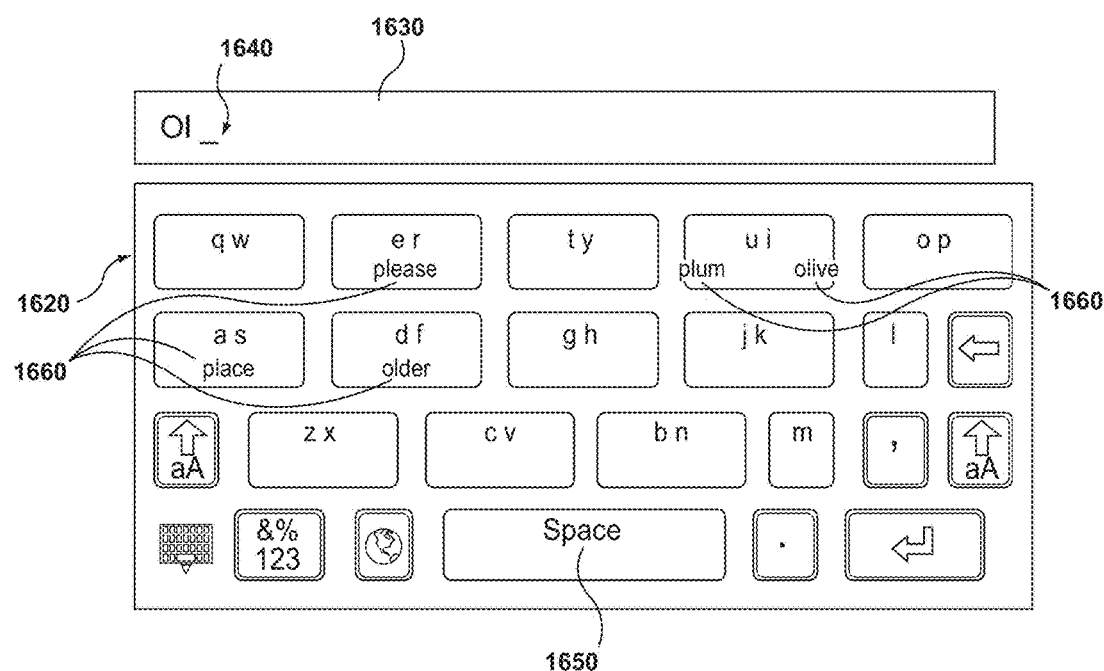
FIG. 16 shows an example front view of a touchscreen, consistent with embodiments disclosed herein.

FIG. 16 shows another example of an ambiguous keyboard 1620. In this example, generated sets of characters "plum" and "olive" 1660 are displayed near the "ui" key. The sets of characters could also have been displayed at or on the "ui" key. Here, both sets of characters correspond to a particular input corresponding to a key, namely the third letter of plum is a "u" and the third letter of olive is an "i." Touchscreen 118 (via main processor 102) can differentiate between the input of either set of characters based on the user's action. For example, the user can swipe at or near the right of the "ui" key to input "olive", or swipe at or near the left of the "ui" key to input "plum".

Figure 17:
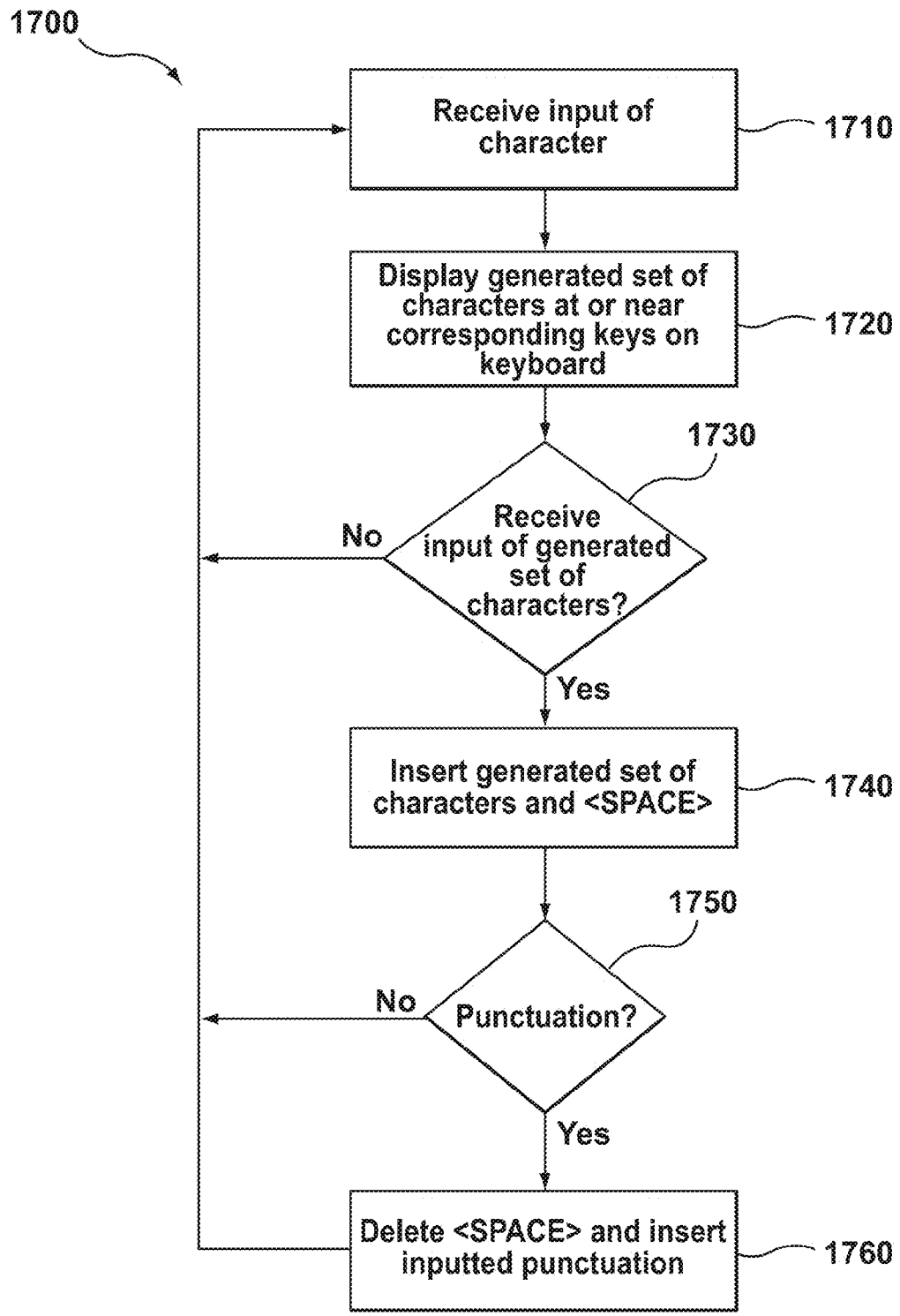
FIG. 17 is a flowchart illustrating an example method, consistent with embodiments disclosed herein.
Figure 18:
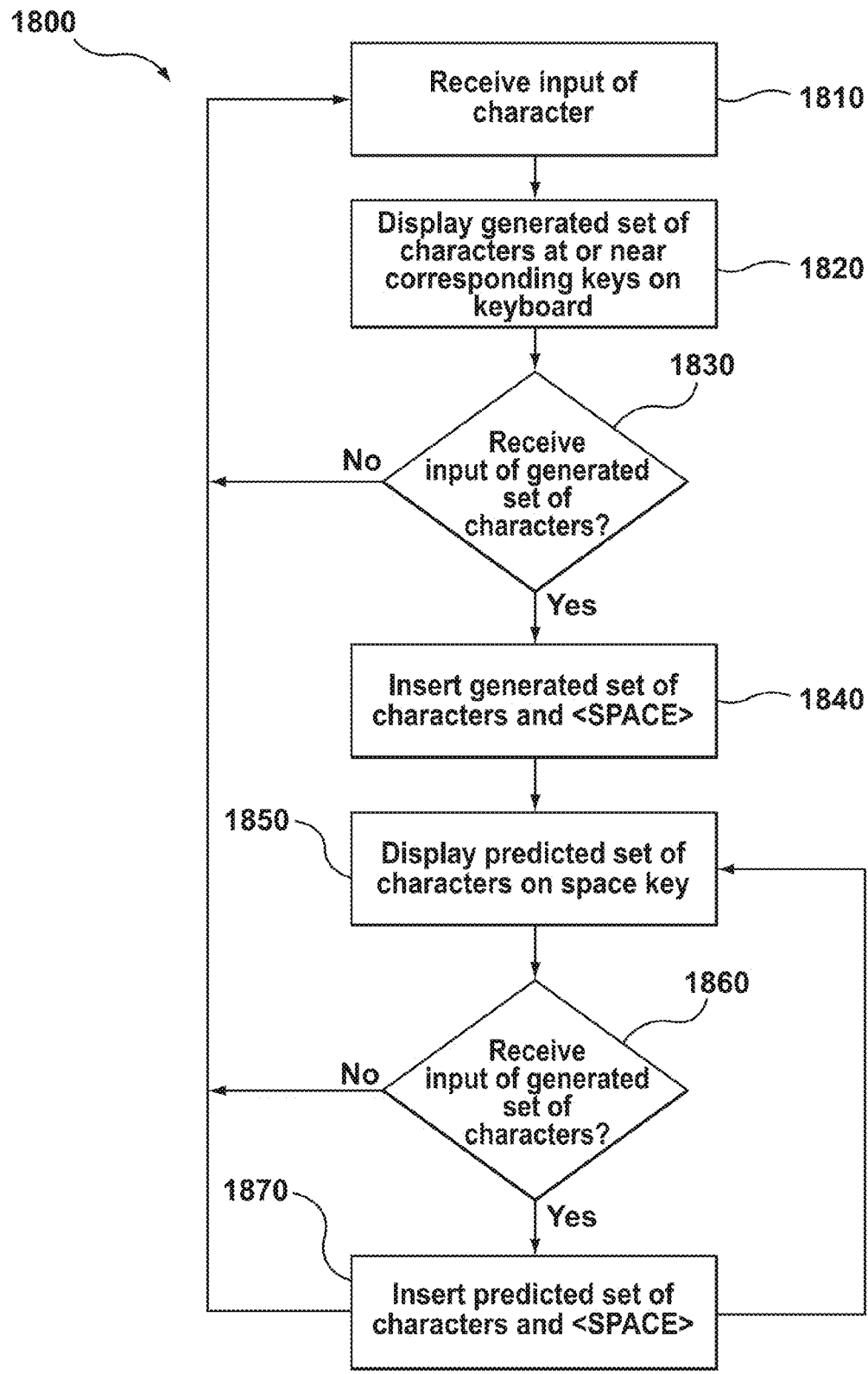
FIG. 18 is a flowchart illustrating an example method, consistent with embodiments disclosed herein.
Figure 19:
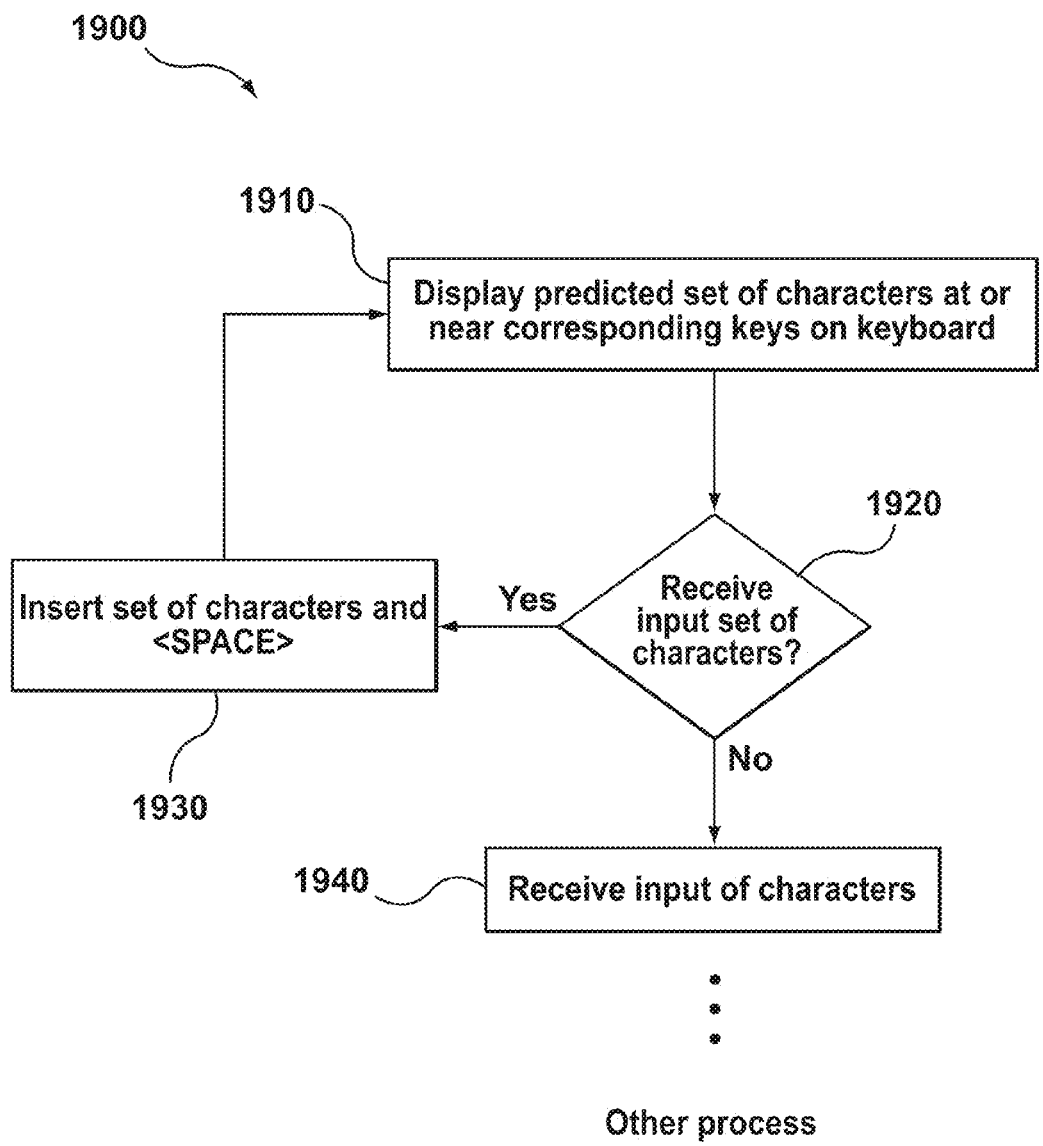
FIG. 19 is a flowchart illustrating an example method, consistent with embodiments disclosed herein.

The examples and embodiments illustrated in FIGS. 17, 18, and 19 can be implemented with any set of characters such as words, phrases, acronyms, names, slang, colloquialisms, abbreviations, or any combination thereof.

FIG. 17 shows in flowchart form a method 1700 in accordance with some embodiments. Method 1700 can be implemented with a processor, such as main processor 102, and stored on a tangible computer readable medium, such as hard drives, CDs, DVDs, flash memory, and the like. At block 1710, the processor receives an input of a character. At block 1720, the processor displays a generated set of characters at or near keys of subsequent candidate input characters on the touchscreen, such as described above.

At block 1730, the processor receives an input of the generated set of characters chosen by a user. If the user does not choose a generated set of characters displayed at or near keys of subsequent candidate input characters, the method restarts at block 1710, where the touchscreen can receive an input of another character. If a generated set of characters is received as input, at block 1740 the generated set of characters and a <SPACE> character is inserted in an input field (for example, input field 330 of FIGS. 3-9). As mentioned previously, the user can choose the generated set of characters, for example, by swiping at or near it or by long pressing a key corresponding to the subsequent candidate input character.

Continuing at block 1750, if the processor detects that punctuation is not to be inserted, the method restarts at block 1710. If punctuation is to be inserted, the method continues to block 1760 where the <SPACE> character is deleted and the appropriate punctuation is added to the input field. After block 1760, the method starts over at block 1710.

FIG. 18 is a flowchart illustrating example method 1800 in accordance with some embodiments. Method 1800 can be implemented with a processor, such as main processor 102, and stored on a tangible computer readable medium, such as hard drives, CDs, DVDs, flash memory, and the like. At block 1810, the processor receives an input of a character.

At block 1820, the processor displays a generated set of characters at or near a location on the keyboard corresponding to a subsequent candidate input character on a touchscreen. At block 1830, the processor receives an input of a generated set of characters chosen by a user. If the user does not choose a generated set of characters displayed at or near keys of subsequent candidate input characters, the method restarts at block 1810, where the processor can receive an input of another character. If a generated set of characters is received as input, at block 1840 the generated set of characters and a <SPACE> character is inserted in an input field (for example, input field 330 of FIGS. 3-9). As mentioned previously, the user can choose the generated set of characters, for example, by swiping at or near it or by pressing a key corresponding to the subsequent candidate input character for a predetermined period of time.

At block 1850, a predicted set of characters, different from the generated set(s) of characters, is displayed on a space key of the keyboard after the input of the generated set of characters in block 1830. The predicted set of characters displayed in block 1850 is determined by using a predictor.

In some embodiments, the one or more predicted sets of characters can be placed on one or more keys other than the space key.

At block 1860, the processor can determine whether it has received an input of the predicted set of characters based on a user input. If the touchscreen has not received an input of the predicted set of characters because the user has not chosen the predicted set of characters, the method restarts at block 1810. If the processor has received the input of the predicted set of characters, the method continues to block 1870, where the chosen predicted set of characters and a <SPACE> character is inserted in the input field. From here, method 1800 can return to either block 1810 or block 1850.

Even though method 1800 does not display the punctuation illustration as shown in method 1700, the punctuation illustration, as shown in blocks 1750 and 1760, can likewise be applied to method 1800.

FIG. 19 is a flowchart illustrating an example method 1900 in accordance with some embodiments. At box 1910, predicted set of characters is displayed at corresponding subsequent candidate input characters. In these embodiments, an input has not been received or a delimiter has been activated, such as inputting a <SPACE>. Here, one or more predicted set of characters (such as, words, affixes, or a combination thereof) are placed on subsequent candidate input characters that correspond to the first letter of the generated set of characters. Moving to box 1920, it is determined whether the touchscreen receives an input of the set of characters (such as, word or affix) based on a user's selection. If an input is received, the method moves to block 1930 where the predicted set of characters and a <SPACE> character are inserted into an input field. Then the method starts over at block 1910. If the touchscreen does not receive an input of the set of characters, the touchscreen is available to receive an input of a character (as described by block 1710 of FIG. 17 or block 1810 of FIG. 18) and proceed through methods (such as methods 1700 of FIG. 17 or 1800 of FIG. 18 or even method 1900 of FIG. 19).

Figure 20:
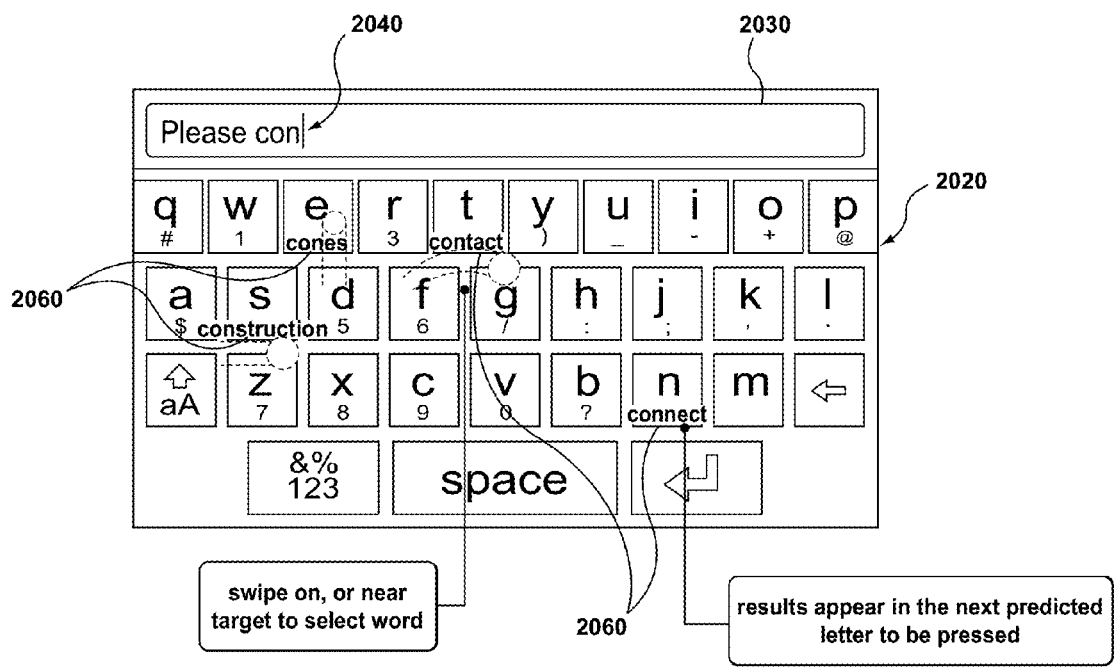
FIG. 20 shows an example front view of a virtual keyboard for display on a touchscreen, consistent with embodiments disclosed herein.

FIG. 20 shows another example of a virtual keyboard 2020 having an input field 2030. The set of characters "Please con" are received as input by the touchscreen and displayed in the input field 2030 followed by a cursor 2040, which can be a vertical line (as shown) or any other shape, such as an underscore as mentioned previously. A predictor determines one or more generated set of characters 2060 based in part on the received input for the current position of cursor 2040 within the current word, which is in the fourth character position of the current word, as shown in input field 2030. The current word is the word in which the cursor is currently located. In the shown example, generated set of characters 2060 "cones", "contact", "construction" and "connect" are displayed. Each generated set of characters 2060 is displayed at a key corresponding to a subsequent candidate input character (for example, under the E, T, S and N keys of the virtual keyboard 2020, respectively), for the current position of cursor 2040, which is in the third character position, as shown in input field 2030.

In the shown example, each generated set of characters 2060 is displayed at or near keys on the virtual keyboard 2020 associated with the subsequent candidate input characters. The display of a generated set of characters 2060 at or near a key corresponding to a subsequent candidate input character depends, for instance, on the size of the generated set of characters 2060 and the size of generated set of characters associated with nearby keys of other subsequent candidate input characters. When the generated set of characters associated with nearby keys in the same row of keys in the virtual keyboard 2020 are too large to be displayed at the same time without overlapping with each other or without a predetermined distance between the generated sets of characters, the processor 102 limits the generated set of characters which are displayed. The processor 102 may limit the generated set of characters which are displayed using one or any combination of the rank of each generated set of characters, the size of each generated set of characters, and a distance between each generated set of characters which are displayed so that a predetermined distance between the generated set of characters is maintained. This may result in the display of one or more generated sets of characters which are larger than the associated key in the virtual keyboard 2020.

In some examples, if two generated sets of characters are both ranked high, and these sets of characters would otherwise be displayed at nearby keys but cannot be displayed and still maintain a predetermined distance between the generated sets of characters at the display text size, the electronic device could be configured to display only the highest ranked generated set of characters. This results in the display of the most likely generated set of characters. In other examples, only the longest of the generated set of characters is displayed. This may be beneficial in that allowing faster entry of longer words saves time and processing cycles, thereby leveraging the predictive text input solution. In yet other examples, only the shortest generated set of characters is displayed. This may be beneficial in that shorter words can be more common, at least for some users, thereby allowing faster entry of words which saves time and processing cycles, thereby leveraging the predictive text input solution.

In some examples, the processor 102 may only limit the generated set of characters which are displayed in neighboring/adjacent keys in the same row of keys in the virtual keyboard 2020. In some examples, the processor 102 may limit the generated set of characters which are displayed in neighboring/adjacent keys in the same row of keys in the virtual keyboard 2020 so that a generated set of characters is never displayed in neighboring/adjacent keys irrespective of the size of the generated set of characters or distance between each generated set of characters. In such examples, the processor 102 uses the rank to determine which generated set of characters are displayed.

In other examples, the processor 102 can limit the generated set of characters which are displayed when the generated set of characters associated with nearby keys in different rows of keys in the virtual keyboard 2020 are too large to be displayed at the same time without overlapping with each other or without a predetermined distance between the generated sets of characters. In other examples, the processor 102 can limit the generated set of characters which are displayed when the generated set of characters associated with nearby keys in the same or different columns of keys in the virtual keyboard 2020 are too large to be displayed at the same time without overlapping with each other or without a predetermined distance between the generated sets of characters As mentioned previously, a user can use a finger or stylus to swipe a generated set of characters to input that generated set of characters. An individual letter, in contrast, can be input by tapping a respective key in the virtual keyboard 2020 using a finger or stylus. The touchscreen differentiates between tap and swipe events using movement and duration of touch events, the details of which are known in the art and need not be described herein. Each key in the virtual keyboard 2020 and each generated set of characters 2060 which is displayed has an associated target area on the touchscreen. The target area associated with each generated set of characters can be larger than and/or overlap with the target area of the key corresponding to the subsequent candidate input character with which it is associated and possibly nearby keys, such as neighboring keys in the same row. A user need only swipe on or nearby a displayed generated set of characters to input the generated set of characters. This permits faster input of a generated set of characters by creating larger and more accessible target areas, thereby saving time and processing cycles. In some examples, a generated set of characters can be input by detecting a swipe in any direction at or near the displayed generated set of characters. In other examples, a generated set of characters can only be input by detecting a swipe in a particular direction at or near the displayed generated set of characters. The particular direction may be associated with a direction in which the particular direction displayed generated set of characters (e.g., left or right in the shown example). In some examples, the swipe is at or near the displayed generated set of characters when the swipe has an initial contact point within the target area associated with the displayed generated set of characters (which may be the same or larger than the displayed generated set of characters).

Word Predictions in Partitions of the Touchscreen Keyboard

Figure 21:
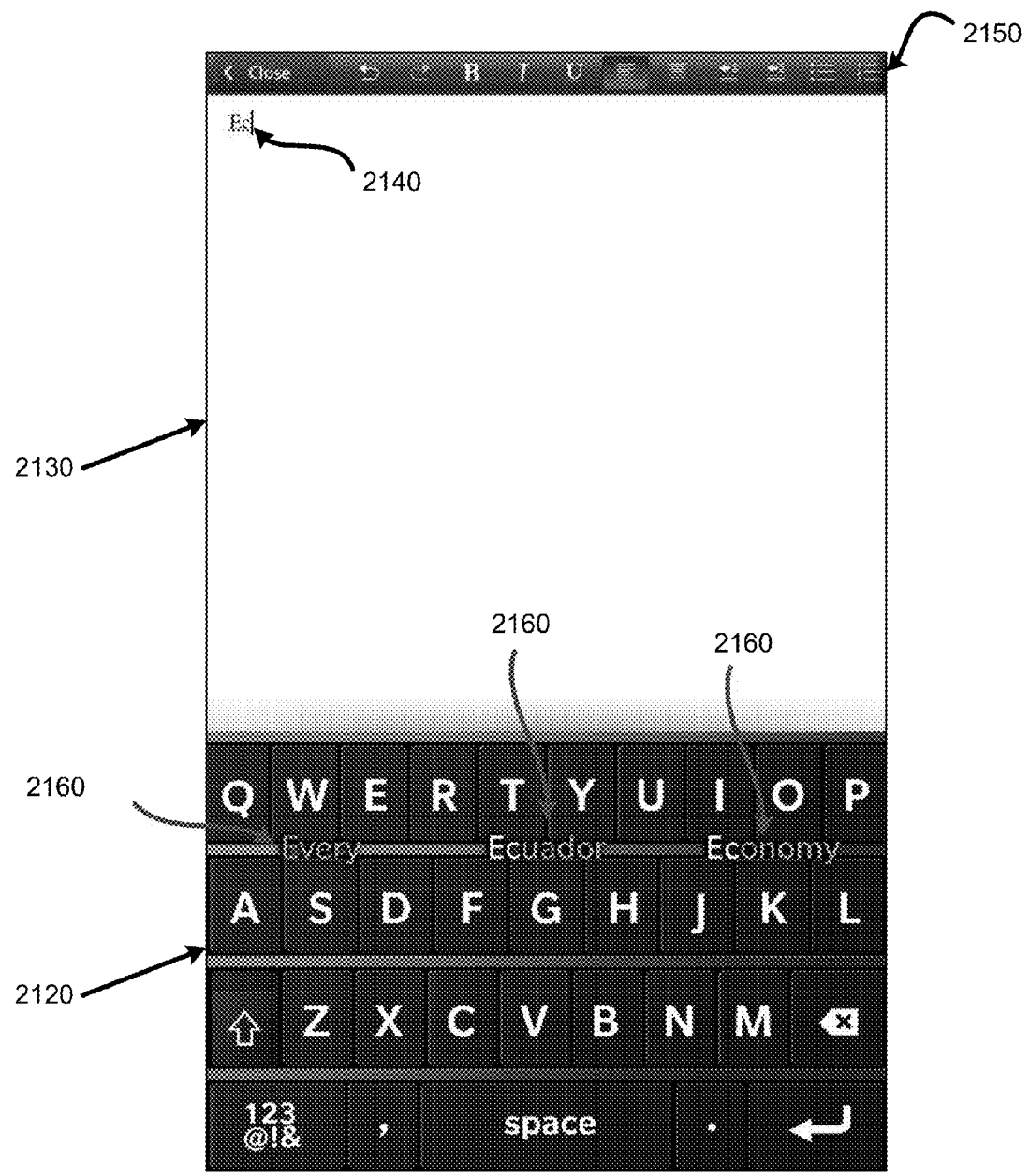
FIGS. 21 to 24 show example front views of a virtual keyboard for display on a touchscreen, consistent with embodiments disclosed herein.

FIG. 21 shows another example of a user interface screen having a virtual keyboard 2120 and an input field 2130. The set of characters "Ec" are received as input by the touchscreen and displayed in the input field 2130 followed by a cursor 2140, which can be a vertical line (as shown) or any other shape, such as an underscore as mentioned previously. A text entry toolbar 2150 is displayed at the top of the user interface screen, above the input field 2130. A predictor determines one or more generated set of characters 2160 based in part on the received input for the current position of cursor 2140 within the current word, which is in the third character position of the current word, as shown in input field 2130. The current word is the word in which the cursor is currently located. In the shown example, generated set of characters 2160 "Every", "Ecuador" and "Economy" are displayed. The generated set of characters 2160 are displayed at set positions within the virtual keyboard 2120 rather than at a key corresponding to a subsequent candidate input character in the examples described above. The set positions in the virtual keyboard 2120 in the described embodiments are defined by partitions (or regions) of the virtual keyboard 2120. The partitions, in at least some embodiments, are defined by dividing the virtual keyboard 2120. The virtual keyboard 2120 may be divided into equal or unequal partitions. The partitions may occupy substantially all of the virtual keyboard 2120 or less than all of the virtual keyboard 2120. In some examples, the partitions may occupy other parts of the user interface screen such as the input field 2130. In FIGS. 21 to 24, the partitions of the virtual keyboard 2120 are defined by three columns (e.g., left, centre and right columns). A different number of columns could be used in other embodiments. The columns could be defined by dividing the virtual keyboard 2120 into equal portions, i.e. by dividing the virtual keyboard 2120 into three equally sized columns.

In the shown example, the displayed sets of characters are aligned horizontally (or substantially horizontally) to facilitate the use and selection of predictions as input by making the displayed generated sets of characters more readily visible. In the shown example, the generated sets of characters are displayed in a horizontal "spacer" bar separating two rows of keys, in particular, a horizontal bar separating the top row of keys from the second row of keys below the top row. This avoids occluding the keys of the virtual keyboard 2120, thereby facilitating the input of individual keys while increasing the visibility of the displayed predictions. The displayed generated sets of characters could be located elsewhere, for example, within a horizontal bar separating two different rows of keys.

The processor 102 determines the partition in which a generated set of characters is displayed using the rank of each generated set of characters. The generated set of characters having the highest rank is displayed in the partition associated with the subsequent candidate input character of the generated set of characters having the highest rank. The partition associated with the subsequent candidate input character is typically the partition (i.e., column in the presently described embodiment) in which the subsequent candidate input character of the generated set of characters is located. In the shown example, the generated set of characters "Economy" has the highest rank and the subsequent candidate input character of the generated set of characters is the letter "o". Accordingly, the generated set of characters "Economy" is located in the right column in which the letter "o" is located.

The processor 102 then determines the partition associated with the subsequent candidate input character of a generated set of characters having the next highest rank (i.e., second highest rank). If this partition is already allocated to a generated set of characters (e.g., the highest ranked generated set of characters, which in the shown example is allocated to the right column), the generated set of characters is discarded. For example, if the generated set of characters "Economics" has the second highest rank, the prediction of "Economics" would be discarded since the associated partition is the same as the partition allocated to the generated set of characters having the highest rank, "Economy". The processor 102 then determines the partition associated with the subsequent candidate input character of a generated set of characters having the next highest rank (i.e., third highest rank). If this partition is already allocated to a generated set of characters (e.g., the highest ranked generated set of characters), the generated set of characters is discarded. This process is repeated until a second partition is associated with a generated set of characters or no generated set of characters remain. In the shown example, the second partition to be associated with a generated set of characters is the left column and the generated set of characters associated with the second partition (e.g., left column) is "Every". The set of characters "Every" is predicted even though the set of characters "Ec" are received as input which is not a root for the word "Every".

The processor 102 then determines the partition associated with the subsequent candidate input character of a generated set of characters having the next highest rank. If this partition is already allocated to a generated set of characters (e.g., in the shown example the left and right columns are already allocated to a generated set of characters), the generated set of characters is discarded. For example, if the generated set of characters "Everyone" has the next highest rank, the prediction of "Everyone" would be discarded since the associated partition is the left column which is already allocated to the generated set of characters "Every". The processor 102 then determines the partition associated with the subsequent candidate input character of a generated set of characters having the next highest rank. If this partition is already allocated to a generated set of characters, the generated set of characters is discarded. This process is repeated until a third partition is associated with a generated set of characters (e.g., until the centre column is allocated) or no generated set of characters remain. In the shown example, the third partition to be associated with a generated set of characters is the centre column and the generated set of characters associated with the third partition (e.g., centre column) is "Ecuador".

In the shown example, the virtual keyboard 2120 has three partitions. If more partitions are used, this process would continue until all partitions are associated with a generated set of characters or no generated set of characters remain.

Figure 22:
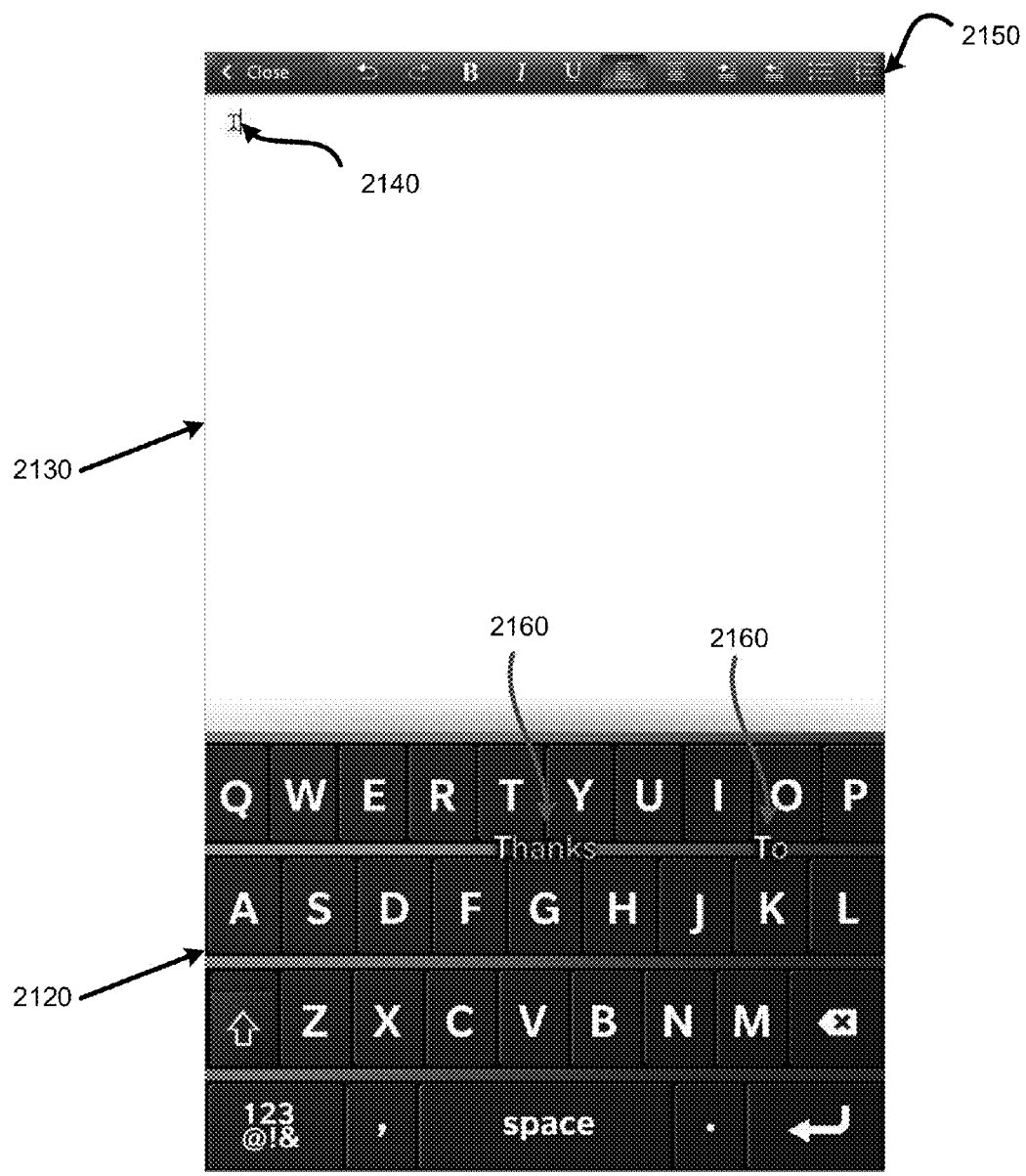

FIG. 22 shows another example of a user interface screen having a virtual keyboard 2120 and an input field 2130. The character "T" is received as input by the touchscreen and displayed in the input field 2130 followed by a cursor 2140, which can be a vertical line (as shown) or any other shape, such as an underscore as mentioned previously. The predictor determines one or more generated set of characters 2160 based in part on the received input for the current position of cursor 2140 within the current word, which is in the second character position of the current word, as shown in input field 2130. In the shown example, the generated set of characters 2160 "Thanks" and "To" are displayed. Fewer generated sets of characters than partitions are displayed, meaning that only two predictions exists or the predictions were exhausted by conflicts seeking to associated a generated sets of character with a partition already allocated to another generated set of characters.

Figure 23:
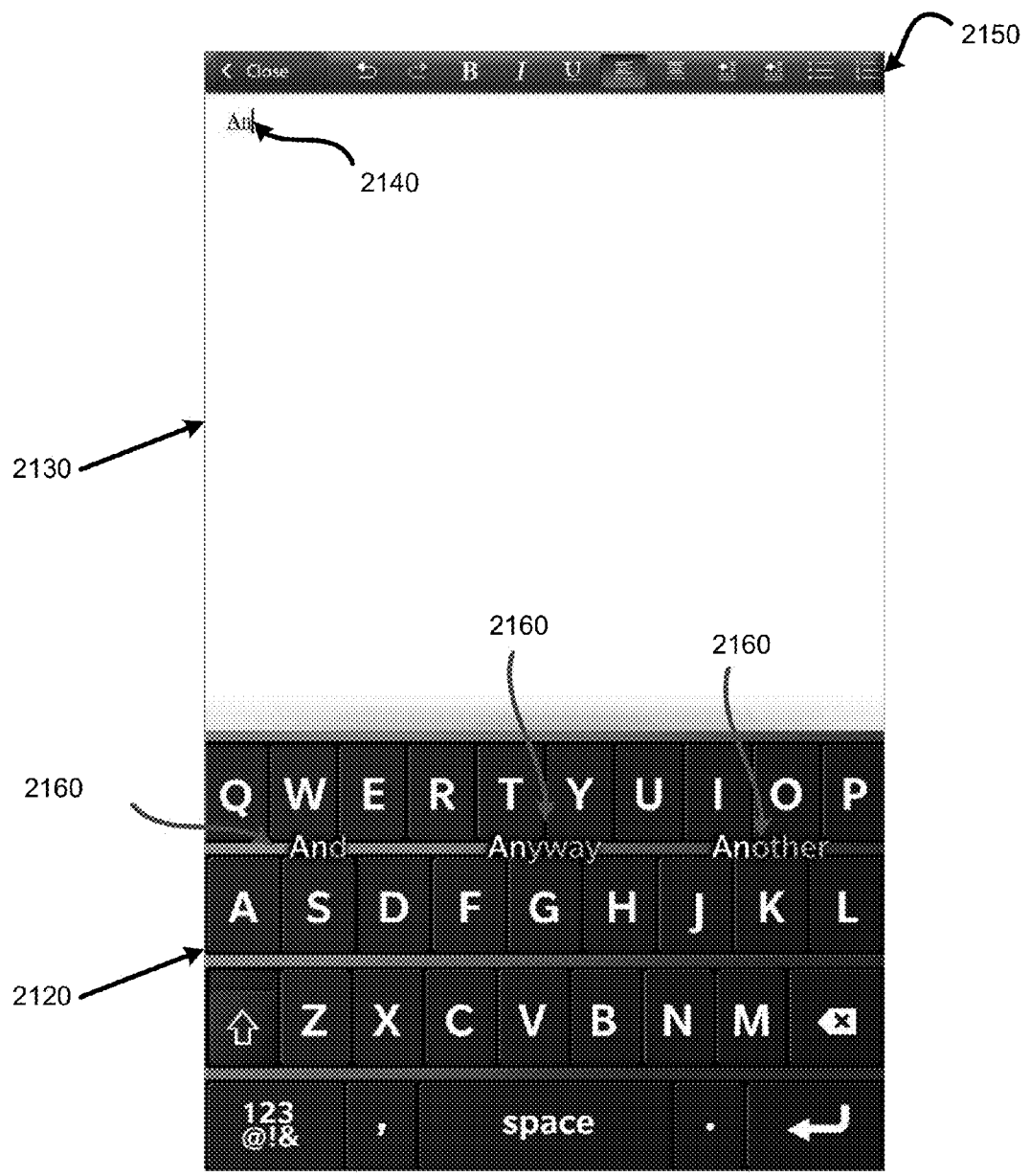

FIG. 23 shows another example of a user interface screen having a virtual keyboard 2120 and an input field 2130. The set of characters "An" are received as input by the touchscreen and displayed in the input field 2130 followed by a cursor 2140, which can be a vertical line (as shown) or any other shape, such as an underscore as mentioned previously. The predictor determines one or more generated set of characters 2160 based in part on the received input for the current position of cursor 2140 within the current word, which is in the third character position of the current word, as shown in input field 2130. In the shown example, the generated set of characters 2160 "And", "Anyway" and "Another" are displayed.

Figure 24:
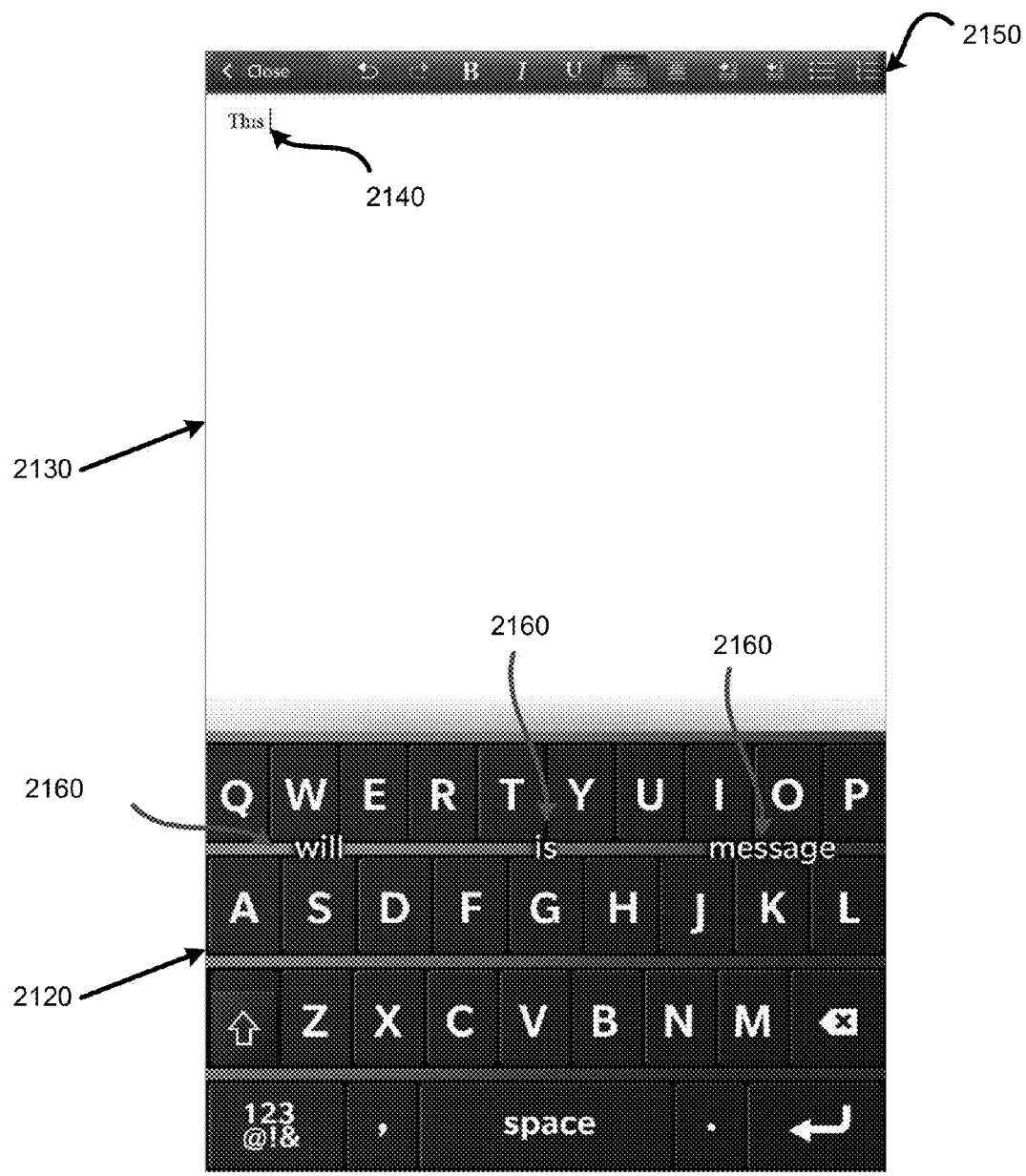

FIG. 24 shows another example of a user interface screen having a virtual keyboard 2120 and an input field 2130. The set of characters "This" are received as input by the touchscreen and displayed in the input field 2130 followed by a cursor 2140, which can be a vertical line (as shown) or any other shape, such as an underscore as mentioned previously. The predictor determines one or more generated set of characters 2160 based in part on the received input for the current position of cursor 2140 within the current word, which is in the first character position of the current word, as shown in input field 2130. In the shown example, the predictor predicts the next words in the sentence being input with the generated set of characters 2160 "will", "is" and "message" being displayed.

Figure 25:
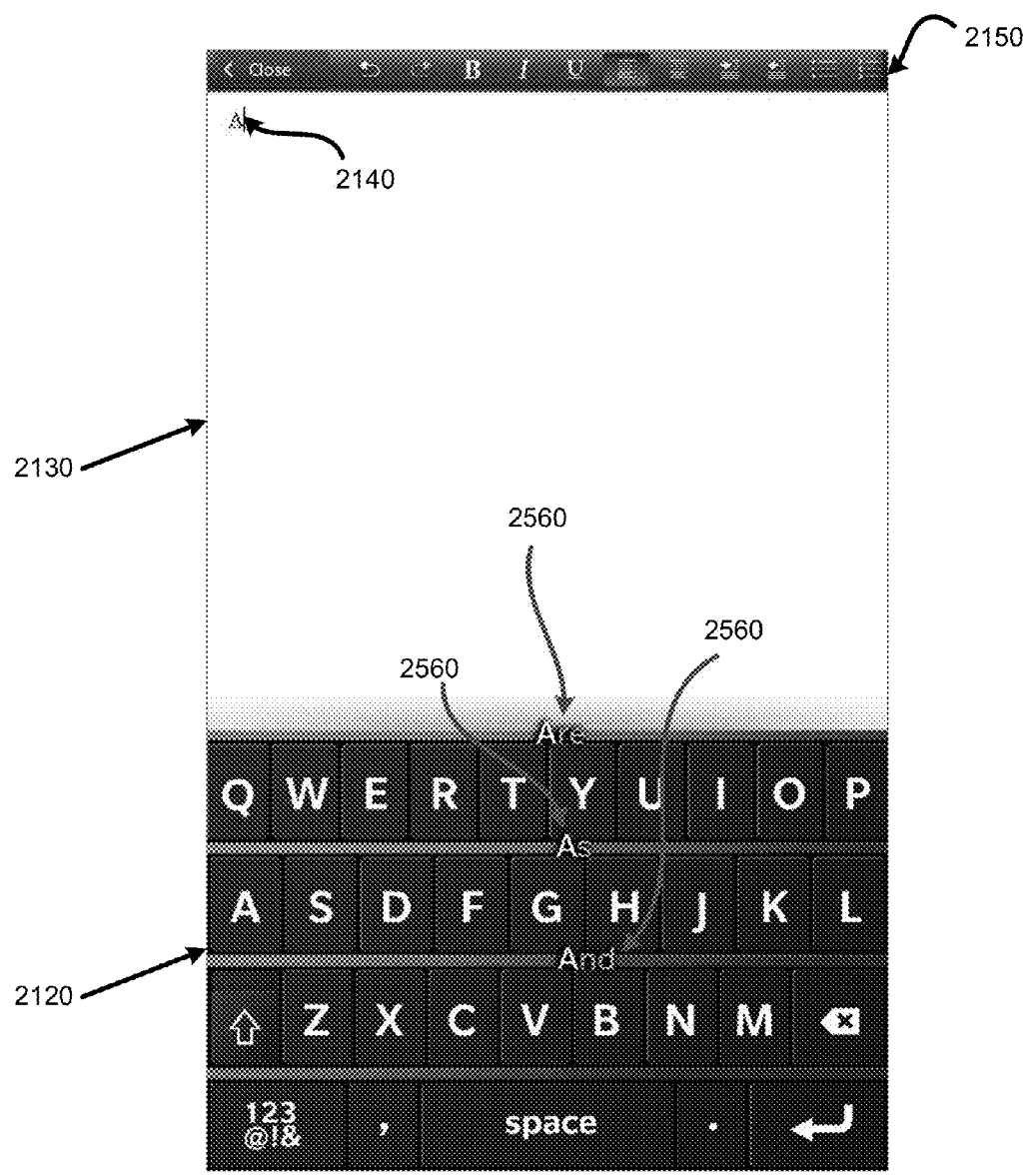
FIGS. 25 to 28 show example front views of a virtual keyboard for display on a touchscreen, consistent with embodiments disclosed herein.

FIG. 25 shows another example of a user interface screen having a virtual keyboard 2120 and an input field 2130. The character "A" is received as input by the touchscreen and displayed in the input field 2130 followed by a cursor 2140, which can be a vertical line (as shown) or any other shape, such as an underscore as mentioned previously. A text entry toolbar 2150 is displayed at the top of the user interface screen, above the input field 2130. A predictor determines one or more generated set of characters 2560 based in part on the received input for the current position of cursor 2140 within the current word, which is in the second character position of the current word, as shown in input field 2130.

The current word is the word in which the cursor is currently located. In the shown example, generated set of characters 2560 "Are", "As" and "And" are displayed. The generated set of characters 2560 are displayed at set positions within the virtual keyboard 2120 rather than at a key corresponding to a subsequent candidate input character in earlier examples. The set positions in the virtual keyboard 2120 in the described embodiments are defined by partitions of the virtual keyboard 2120. The virtual keyboard 2120 may be divided into equal or unequal partitions. The partitions may occupy substantially all of the virtual keyboard 2120 or less than all of the virtual keyboard 2120. In some examples, the partitions may occupy other parts of the user interface screen such as the input field 2130. In FIGS. 25 to 28, the partitions of the virtual keyboard 2120 are defined by three rows (e.g., top, middle and bottom rows) rather than columns as in FIGS. 21 to 24. A different number of rows could be used in other embodiments. The rows could be defined by dividing the virtual keyboard 2120 into equal portions, i.e. by dividing the virtual keyboard 2120 into three equally sized rows.

In the shown example, the display sets of characters are aligned vertically (or substantially vertically) to facilitate the use and selection of predictions as input by making the displayed generated sets of characters more readily visible. In the shown example, the generated sets of characters are displayed in horizontal "spacer" bars separating the rows of keys, each of the displayed sets of characters being located in a different spacer bar. This avoids occluding the keys of the virtual keyboard 2120 thereby facilitating the input of individual keys while increasing the visibility of the displayed predictions. The displayed generated sets of characters could be located elsewhere.

The processor 102 determines the partition in which a generated set of characters is displayed using the rank of each generated set of characters. The generated set of characters having the highest rank is displayed in the partition associated with the subsequent candidate input character of the generated set of characters having the highest rank. The partition associated with the subsequent candidate input character is typically the partition (i.e., row in the presently described embodiment) in which the subsequent candidate input character of the generated set of characters is located. In the shown example, the generated set of characters "Are" has the highest rank and the subsequent candidate input character of the generated set of characters is the letter "r". Accordingly, the generated set of characters "Are" is located in the top row in which the letter "r" is located.

The processor 102 then determines the partition associated with the subsequent candidate input character of a generated set of characters having the next highest rank (i.e., second highest rank). If this partition is already allocated to a generated set of characters (e.g., the highest ranked generated set of characters, which in the shown example is allocated to the top row), the generated set of characters is discarded. For example, if the generated set of characters "Array" has the second highest rank, the prediction of "Array" would be discarded since the associated partition is the same as the partition allocated to the generated set of characters having the highest rank, "Are". The processor 102 then determines the partition associated with the subsequent candidate input character of a generated set of characters having the next highest rank (i.e., third highest rank). If this partition is already allocated to a generated set of characters (e.g., the highest ranked generated set of characters), the generated set of characters is discarded. This process is repeated until a second partition is associated with a generated set of characters or no generated set of characters remain. In the shown example, the second partition to be associated with a generated set of characters is the middle row and the generated set of characters associated with the second partition (e.g., left column) is "As".

The processor 102 then determines the partition associated with the subsequent candidate input character of a generated set of characters having the next highest rank. If this partition is already allocated to a generated set of characters (e.g., in the shown example the top and middle columns are already allocated to a generated set of characters), the generated set of characters is discarded. For example, if the generated set of characters "Assume" has the next highest rank, the prediction of "Assume" would be discarded since the associated partition is the left column which is already allocated to the generated set of characters "As". The processor 102 then determines the partition associated with the subsequent candidate input character of a generated set of characters having the next highest rank. If this partition is already allocated to a generated set of characters, the generated set of characters is discarded. This process is repeated until a third partition is associated with a generated set of characters (e.g., until the bottom row is allocated) or no generated set of characters remain. In the shown example, the third partition to be associated with a generated set of characters is the bottom row and the generated set of characters associated with the third partition (e.g., centre column) is "And".

In the shown example, the virtual keyboard 2120 has three partitions. If more partitions are used, this process would continue until all partitions are associated with a generated set of characters or no generated set of characters remain.

Figure 26:
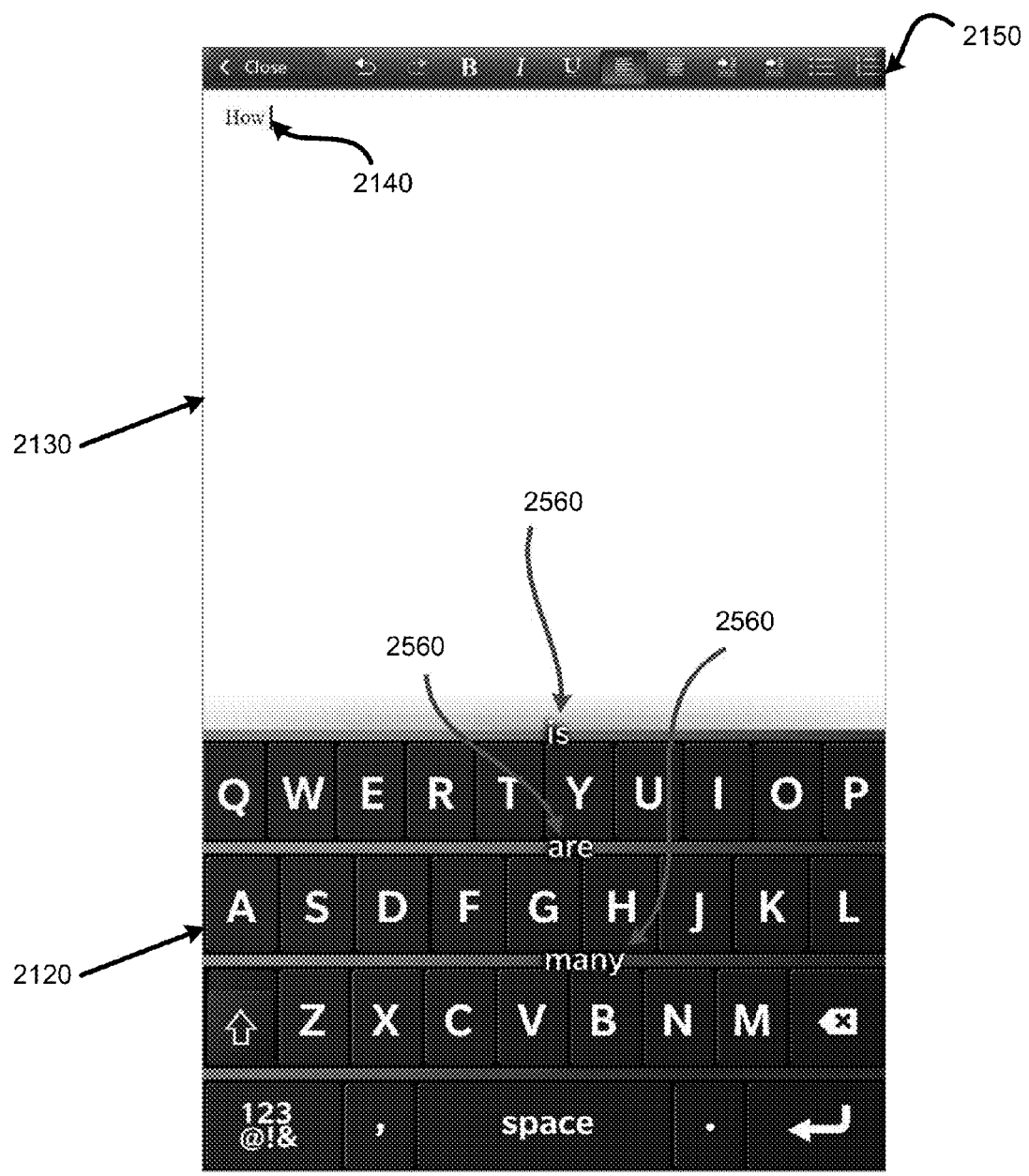

FIG. 26 shows another example of a user interface screen having a virtual keyboard 2120 and an input field 2130. The set of characters "How" are received as input by the touchscreen and displayed in the input field 2130 followed by a cursor 2140, which can be a vertical line (as shown) or any other shape, such as an underscore as mentioned previously. The predictor determines one or more generated set of characters 2560 based in part on the received input for the current position of cursor 2140 within the current word, which is in the first character position of the current word, as shown in input field 2130. In the shown example, the predictor predicts the next words in the sentence being input with the generated set of characters 2560 "is", "are" and "many" being displayed.

Figure 27:
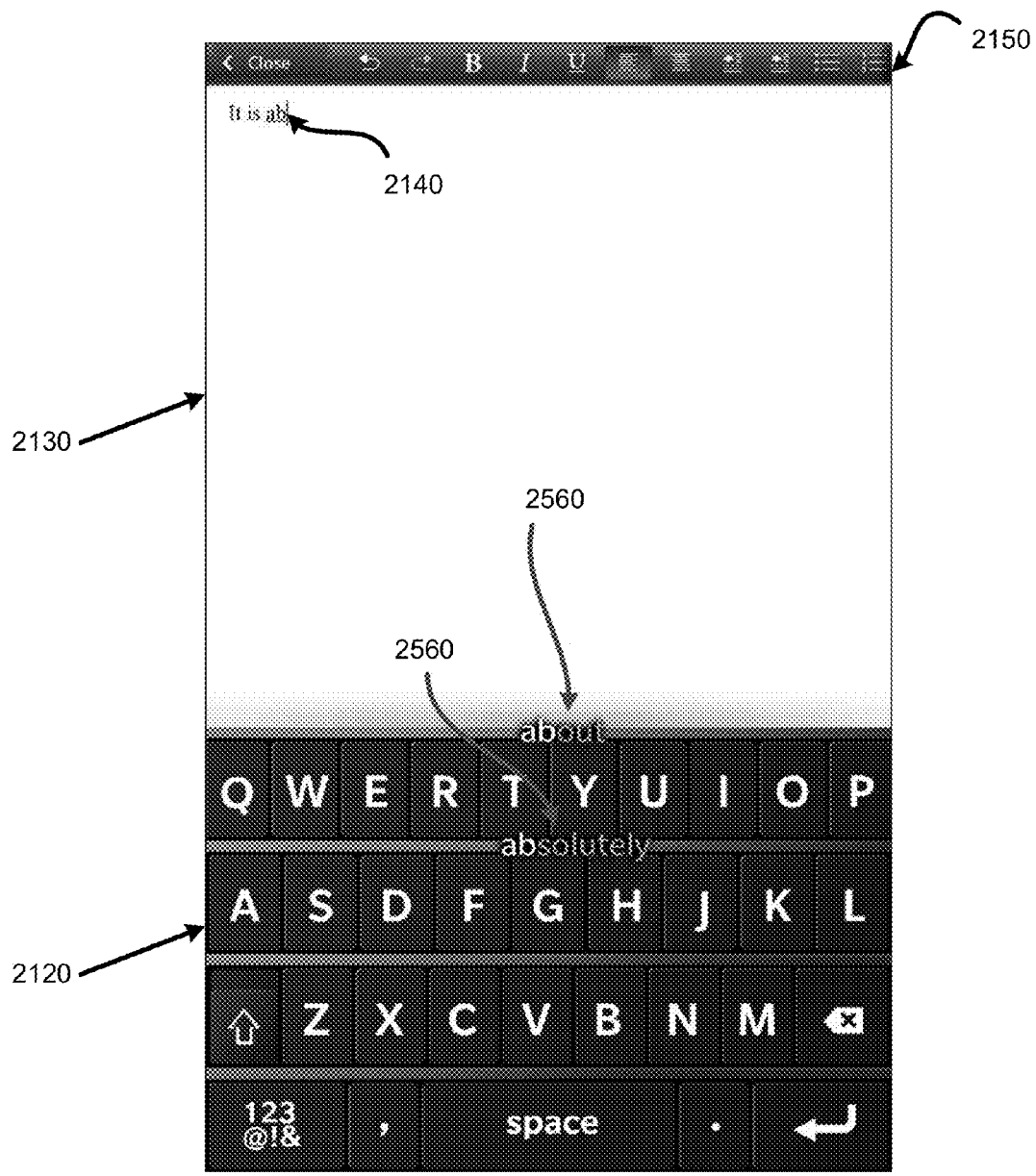

FIG. 27 shows another example of a user interface screen having a virtual keyboard 2120 and an input field 2130. The set of characters "It is ab" are received as input by the touchscreen and displayed in the input field 2130 followed by a cursor 2140, which can be a vertical line (as shown) or any other shape, such as an underscore as mentioned previously. The predictor determines one or more generated set of characters 2560 based in part on the received input for the current position of cursor 2140 within the current word, which is in the third character position of the current word, as shown in input field 2130. In the shown example, the generated set of characters 2560 "about" and "absolutely" are displayed. Fewer generated sets of characters than partitions are displayed, meaning that only two predictions exists or the predictions were exhausted by conflicts seeking to associated a generated sets of character with a partition already allocated to another generated set of characters.

Figure 28:
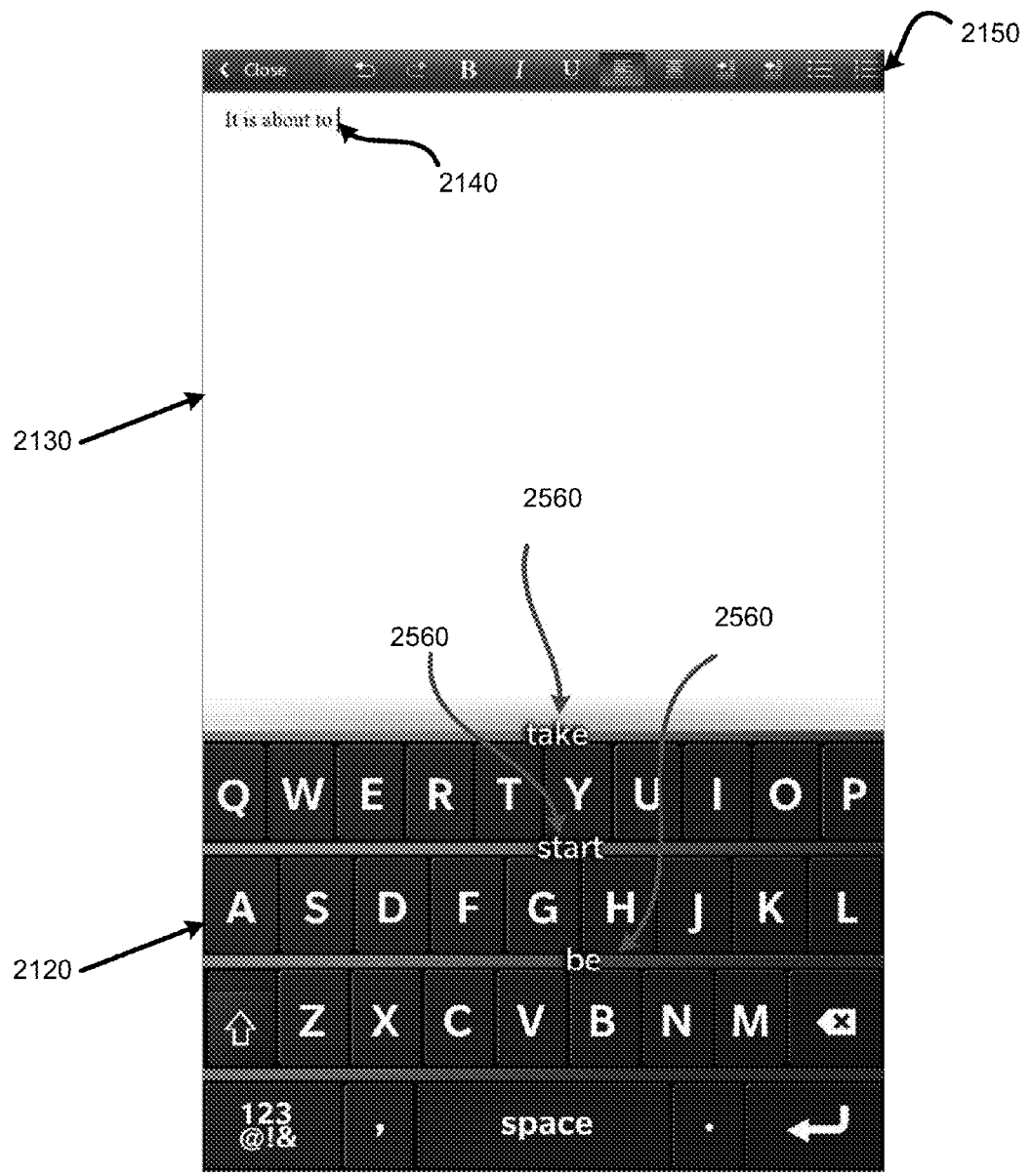

FIG. 28 shows another example of a user interface screen having a virtual keyboard 2120 and an input field 2130. The set of characters "It is about to" are received as input by the touchscreen and displayed in the input field 2130 followed by a cursor 2140, which can be a vertical line (as shown) or any other shape, such as an underscore as mentioned previously. The predictor determines one or more generated set of characters 2560 based in part on the received input for the current position of cursor 2140 within the current word, which is in the first character position of the current word, as shown in input field 2130. In the shown example, the predictor predicts the next words in the sentence being input with the generated set of characters 2560 "take", "start" and "be" being displayed.

It will be appreciated that the embodiments of FIGS. 21 to 28 present a compromise between displaying the most highly ranked predictions and displaying the predictions in a manner which facilitates the use and selection of predictions as input. While the most highly ranked prediction will always be displayed, other displayed predictions may not represent the next most highly ranked predictions. While less ranked predictions may not be the most highly ranked predictions, the predictions are still highly ranked predictions and the displayed predictions are located at set positions with the virtual keyboard 2120 rather than moving around the virtual keyboard 2120 based on the subsequent candidate input character. This facilitates the use and selection of predictions as input rather than the user typing out the entire word and ignoring predictions, thereby saving time and processing cycles and leveraging the predictive text input solution.

As mentioned previously, a user can use a finger or stylus to swipe a generated set of characters to input that generated set of characters. An individual letter, in contrast, can be input by tapping a respective key in the virtual keyboard 2120 using a finger or stylus. The touchscreen differentiates between tap and swipe events using movement and duration of touch events, the details of which are known in the art and need not be described herein. Each key in the virtual keyboard 2120 and each generated set of characters 2560 which is displayed has an associated target area on the touchscreen. The target area associated with each generated set of characters is typically the same size or larger than the displayed generated set of characters. A user need only swipe on or nearby a displayed generated set of characters to input the generated set of characters. This permits relatively fast input of a generated set of characters by creating relatively large and accessible target areas, thereby saving time and processing cycles. In some examples, a generated set of characters can only be input by detecting a swipe in a particular direction at or near the displayed generated set of characters. In some examples, the particular direction is "up" such that only an up" swipe can input a generated set of characters. In some examples, the swipe is at or near the displayed generated set of characters when the swipe has an initial contact point within the target area associated with the displayed generated set of characters (which may be the same or larger than the displayed generated set of characters) (e.g., within displayed word "Every", "Ecuador" or "Economy" in FIG. 21).

It will be appreciated that the partitions of the virtual keyboard 2120 in the above-described embodiments, whether defined by rows or columns, are not coincident with the rows and columns of keys of the virtual keyboard 2120. In other embodiments, the partitions of the virtual keyboard 2120 could be coincident with the rows and columns of keys of the virtual keyboard 2120 although this is typically not preferred as it may reduce the visibility of the keys of the virtual keyboard 2120 and/or the visibility of the predictions by cluttering the user interface.

While the above-described embodiments teach partitions of the virtual keyboard 2120 defined by rows or columns, other configurations are possible. For example, the partitions could be arranged in a two-dimensional array such as a rectilinear array of rows of columns. While this may increase the number of predictions which may be displayed within the virtual keyboard 2120, it may reduce the visibility of the keys of the virtual keyboard 2120 and/or the visibility of the predictions by cluttering the user interface.

Figure 29:
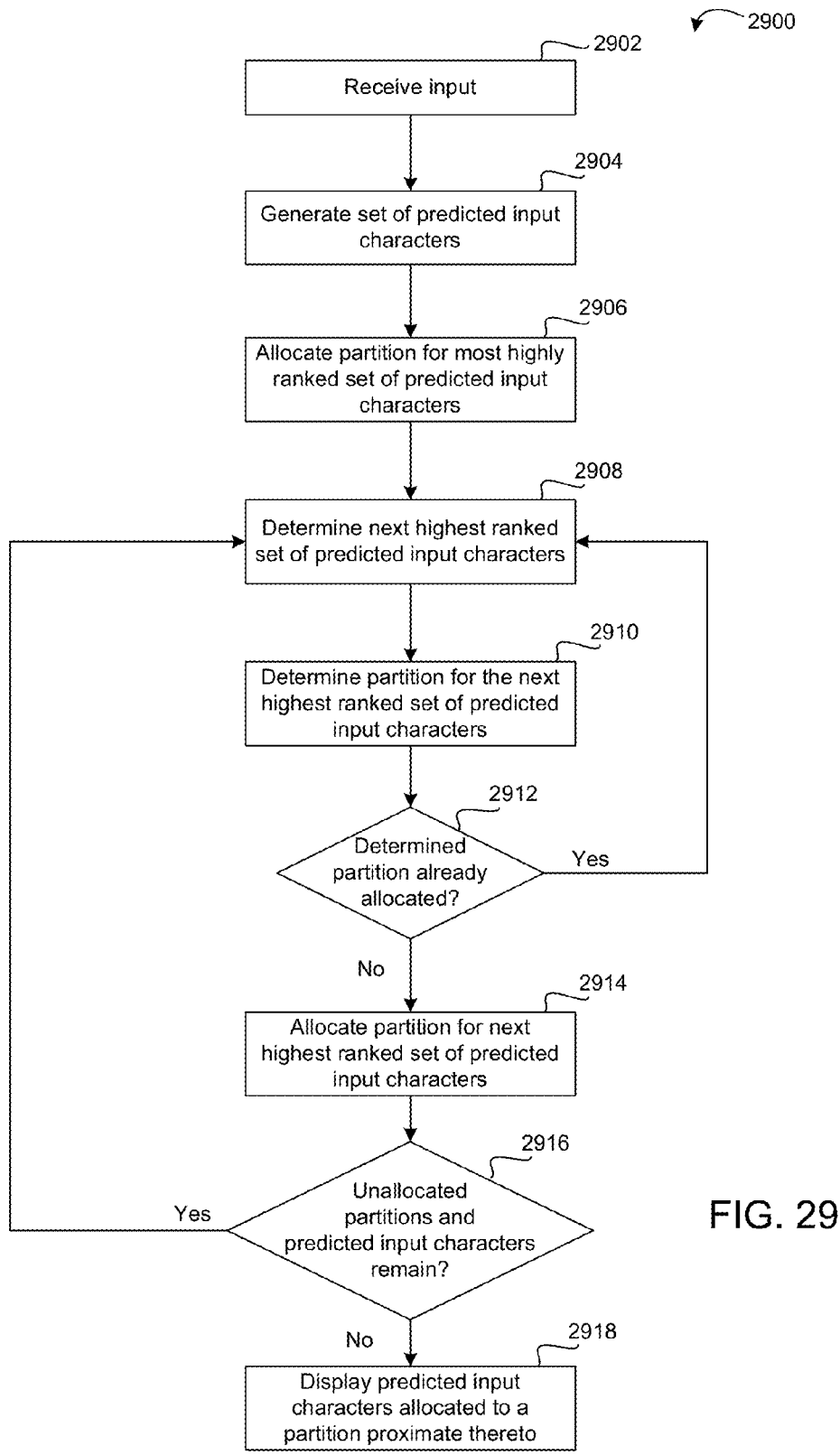
FIG. 29 is a flowchart illustrating an example method, consistent with embodiments disclosed herein.

FIG. 29 shows in flowchart form a method 2900 in accordance with some embodiments. The method 2900 can be implemented with a processor, such as main processor 102, and stored on a tangible computer readable medium, such as hard drives, CDs, DVDs, flash memory, and the like. At block 2902, the processor receives an input of a character. At block 2904, the processor generates a set of predicted input characters. The set of predicted input characters correspond to subsequent candidate input characters.

At block 2906, the highest ranked set of predicted input characters is allocated to a partition in the virtual keyboard 2120 associated with the subsequent candidate input character of the generated set of characters having the highest rank. As mentioned previously, the partition associated with the subsequent candidate input character is typically the partition (i.e., row in the presently described embodiment) in which the subsequent candidate input character of the generated set of characters is located. The set of predicted input characters correspond to subsequent candidate input characters.

At block 2908, the next highest ranked set of characters is determined. At block 2910, a partition associated with the next highest ranked set of characters is determined. If the determined partition is not already allocated to a generated set of characters (decision block 2912), the determined partition is allocated to the next highest ranked set of characters (block 2914). If the determined partition is already allocated to a generated set of characters (decision block 2912), the next highest ranked set of characters is determined (block 2908).

At decision block 2916, it is determined whether any partitions in the virtual keyboard 2120 remain unallocated, and if so, whether any predicted set of input characters remain. If so, at least one partitions in the virtual keyboard 2120 is unallocated or a next highest rank set of predicted input characters exists. The next highest ranked set of characters is then determined (block 2908). If not, all partitions in the virtual keyboard 2120 have been allocated or no next highest rank set of predicted input characters exists. Then, the predicted sets of input characters allocated to partitions in the virtual keyboard 2120 are displayed at a location proximate to the subsequent candidate input character in the sets of predicted input characters, i.e., in the areas of the virtual keyboard 2120 allocated to the partitions of the virtual keyboard 2120.

While not shown in FIG. 29, a user can use a finger or stylus to swipe a generated set of characters to input that generated set of characters as discussed previously. An individual letter, in contrast, can be input by tapping a respective key in the virtual keyboard 2120 using a finger or stylus. In some examples, the method continues with operations of block 1750 and 1760 (not shown) as mentioned previously in connection with the method 1700 and FIG. 17. Continuing at block 1750, if the processor detects that punctuation is not to be inserted, the method restarts at block 2110. If punctuation is to be inserted, the method continues to block 1760 where the <SPACE> character is deleted and the appropriate punctuation is added to the input field. After block 1760, the method starts over at block 2110.

While the method 2900 is described in the context of predicting the next letter in a word, the method could be adapted to predicting the next letter in the next word.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method, comprising:
   receiving an input of a character from a virtual keyboard displayed on a display;
   generating two or more sets of predicted input characters based on the input character;
   displaying two or more of the generated sets of predicted input characters at two or more set positions within the virtual keyboard rather than at a key corresponding to a subsequent candidate input character, wherein the two or more set positions are defined by two or more partitions of the virtual keyboard, and a highest ranked set of predicted input characters is displayed in a partition associated with a subsequent candidate input character of the highest ranked set of predicted input characters;
   determining a candidate partition of a next highest rank set of predicted input characters, wherein the candidate partition of the next highest rank set of predicted input characters is to be associated with a subsequent candidate input character of the next highest ranked set of predicted input characters; and
   in response to determining that the candidate partition of the next highest rank set of predicted input characters is allocated, discarding the next highest rank set of predicted input characters from displaying.

2. The method of claim 1, further comprising:
   in response to determining that the candidate partition of the next highest rank set of predicted input characters is unallocated, allocating the next highest rank set of predicted input characters to the candidate partition.

3. The method of claim 2, further comprising:
   in response to determining that the candidate partition of the next highest rank set of predicted input characters is allocated, determining a further next highest rank set of predicted input characters;
   determining a further candidate partition of the further next highest rank set of predicted input characters; and
   in response to determining that the further candidate partition of the further next highest rank set of predicted input characters is unallocated, allocating the further next highest rank set of predicted input characters to the further candidate partition of the further next highest rank set of predicted input characters.

4. The method of claim 2, wherein the sets of predicted input characters are displayed within a partition allocated thereto.

5. The method of claim 2, wherein the sets of predicted input characters are displayed within a partition allocated thereto only when all partitions in the virtual keyboard have been allocated or no further next highest rank set of predicted input characters exists.

6. The method of claim 2, wherein the partitions are defined by a number of columns in an area of the virtual keyboard.

7. The method of claim 6, wherein the horizontal area is a horizontal "spacer" bar displayed between two rows of keys in the virtual keyboard.

8. The method of claim 2, wherein the partitions occupy substantially all of the virtual keyboard.

9. The method of claim 1, wherein a displayed set of predicted input characters is input by detecting a swipe in one of the two or more partitions.

10. The method of claim 9, wherein the swipe is an "up" swipe.

11. The method of claim 1, wherein the two or more partitions are defined by two or more columns of the virtual keyboard.

12. The method of claim 1, wherein the virtual keyboard includes a plurality of rows of keys, and wherein subsequent candidate input characters of two or more of the displayed sets of predicted input characters are associated with different keys located on different rows of keys.

13. An electronic device, comprising:
a processor;
a display coupled to the processor;
wherein the processor is configured to:
receive an input of a character from a virtual keyboard displayed on the display;
generate two or more sets of predicted input characters based on the input character;
display two or more of the generated sets of predicted input characters at two or more set positions within the virtual keyboard rather than at a key corresponding to a subsequent candidate input character, wherein the two or more set positions are defined by two or more partitions of the virtual keyboard, and a highest ranked set of predicted input characters is displayed in a partition associated with a subsequent candidate input character of the highest ranked set of predicted input characters;
determine a candidate partition of a next highest rank set of predicted input characters, wherein the candidate partition of the next highest rank set of predicted input characters is to be associated with a subsequent candidate input character of the next highest ranked set of predicted input characters; and
in response to determining that the candidate partition of the next highest rank set of predicted input characters is allocated, discard the next highest rank set of predicted input characters from displaying.

14. The electronic device of claim 13, wherein the processor is configured to:
in response to determining that the candidate partition of the next highest rank set of predicted input characters is unallocated, allocate the next highest rank set of predicted input characters to the candidate partition.

15. The electronic device of claim 14, wherein the processor is configured to:
in response to determining that the candidate partition of the next highest rank set of predicted input characters is allocated, determine a further next highest rank set of predicted input characters;
determine a further candidate partition of the further next highest rank set of predicted input characters; and
in response to determining that the further candidate partition of the further next highest rank set of predicted input characters is unallocated, allocate the further next highest rank set of predicted input characters to the further candidate partition of the further next highest rank set of predicted input characters.

16. The electronic device of claim 14, wherein the sets of predicted input characters are displayed within a partition allocated thereto.

17. The electronic device of claim 14, wherein the sets of predicted input characters are displayed within a partition allocated thereto only when all partitions in the virtual keyboard have been allocated or no further next highest rank set of predicted input characters exists.

18. The electronic device of claim 13, wherein the two or more partitions are equal.

19. A non-transitory computer readable medium comprising instructions which when executed by one or more processors of an electronic device cause the electronic device to display a virtual keyboard, the virtual keyboard comprising:
a plurality of keys, each key corresponding to one or more different characters of a plurality of characters,
wherein in response to receiving an input of a character, the virtual keyboard is configured to display two or more sets of predicted input characters at two or more set positions within the virtual keyboard rather than at a key corresponding to a subsequent candidate input character, wherein the two or more set positions are defined by two or more partitions of the virtual keyboard, and a highest ranked set of predicted input characters is displayed in a partition associated with a subsequent candidate input character of the highest ranked set of predicted input characters; and
in response to determining that a candidate partition of a next highest rank set of predicted input characters is allocated, the virtual keyboard is configured to discard the next highest rank set of predicted input characters from displaying, wherein the candidate partition of the next highest rank set of predicted input characters is to be associated with a subsequent candidate input character of the next highest ranked set of predicted input characters.

* * * * *

UNITED STATES PATENT AND TRADEMARK OFFICE
CERTIFICATE OF CORRECTION

PATENT NO. : 9,910,588 B2
APPLICATION NO. : 13/525576
DATED : March 6, 2018
INVENTOR(S) : Jerome Pasquero, Donald Somerset McCulloch Mckenzie and Jason Tyler Griffin Page 1 of 1

It is certified that error appears in the above-identified patent and that said Letters Patent is hereby corrected as shown below:

On the Title Page

Column 2 (Other Publications), Line 1, After "Office" insert -- Action --.

Signed and Sealed this
Twenty-fourth Day of July, 2018

Andrei Iancu
*Director of the United States Patent and Trademark Office*